US009662950B2

(12) United States Patent
Rarey et al.

(10) Patent No.: US 9,662,950 B2
(45) Date of Patent: May 30, 2017

(54) MULTI-TAPERED SUSPENSION COMPONENT

(71) Applicant: Hendrickson USA, L.L.C., Itasca, IL (US)

(72) Inventors: Andrew X. Rarey, North Aurora, IL (US); Randy Zimmerman, Spencerville, IN (US); Carmen D. Cardillo, Plainfield, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/571,435

(22) Filed: Dec. 16, 2014

(65) Prior Publication Data

US 2015/0097322 A1 Apr. 9, 2015

Related U.S. Application Data

(62) Division of application No. 13/738,656, filed on Jan. 10, 2013, now abandoned.

(51) Int. Cl.
 *B60G 11/12* (2006.01)
 *F16F 1/18* (2006.01)
 (Continued)

(52) U.S. Cl.
 CPC .............. *B60G 11/12* (2013.01); *B60G 7/001* (2013.01); *B60G 11/04* (2013.01); *B60G 11/465* (2013.01);
 (Continued)

(58) Field of Classification Search
 CPC ......... B60G 11/04; B60G 11/12; B60G 11/20; B60G 11/18; F16F 1/38; F16F 1/3856; F16F 1/3863
 See application file for complete search history.

(56) References Cited

U.S. PATENT DOCUMENTS 2,533,511 A 12/1950 Rowland et al.
2,849,226 A 8/1958 Maruhn
(Continued)

FOREIGN PATENT DOCUMENTS

CN 101561023 A 10/2009
CN 101977785 A 2/2011
(Continued)

OTHER PUBLICATIONS

ISR and WO for PCT/US2014/010098 dated Jul. 17, 2014.
Chinese Office Action on related application CN201480009566.9 (with translation of relevant portions).

*Primary Examiner* — Bradley King
*Assistant Examiner* — James Hsiao
(74) *Attorney, Agent, or Firm* — Cook Alex Ltd.

(57) ABSTRACT

Energy storing suspension components for use in suspension systems for wheeled vehicles and trailers are disclosed. The energy storing suspension components include an axle seat portion, an end, and a limb extending between the axle seat portion and the end. The limb includes a first taper wherein the limb decreases in width as the limb extends toward the end, a second taper wherein the limb decreases in thickness as the limb extends toward the end, wherein along the limb there is at least a portion where both the first taper and second taper are present, and a third taper that is further from the axle seat portion than the first taper and wherein the limb increases in width as the limb extends toward the end. Also disclosed are combinations of bushings and energy storing suspension components having an end configured to include an eye.

18 Claims, 28 Drawing Sheets

(51) Int. Cl.
*B60G 7/00* (2006.01)
*B60G 11/04* (2006.01)
*B60G 11/46* (2006.01)
*F16F 1/26* (2006.01)
*F16F 1/38* (2006.01)
*B21H 7/00* (2006.01)

(52) U.S. Cl.
CPC ............... *F16F 1/185* (2013.01); *F16F 1/26* (2013.01); *F16F 1/3863* (2013.01); *B21H 7/007* (2013.01); *B60G 2202/112* (2013.01); *B60G 2204/121* (2013.01); *B60G 2204/41* (2013.01); *B60G 2204/4104* (2013.01); *B60G 2206/428* (2013.01); *B60G 2206/81* (2013.01); *B60G 2206/8109* (2013.01); *B60G 2206/81022* (2013.01); *F16F 2228/08* (2013.01)

(56) References Cited

U.S. PATENT DOCUMENTS

| | | | |
|---|---|---|---|
| 3,079,139 A | 2/1963 | Greene et al. | |
| 3,145,984 A | 8/1964 | Hallam | |
| 3,339,908 A | 9/1967 | Komarnitsky | |
| 3,439,400 A | 4/1969 | Brownyer | |
| 3,441,999 A | 5/1969 | Perdue et al. | |
| 3,445,911 A | 5/1969 | Stamm | |
| 3,452,974 A | 7/1969 | Dixon | |
| 3,534,951 A * | 10/1970 | Brownyer | B60G 5/053 267/47 |
| 3,585,086 A | 6/1971 | Hrusovsky | |
| 3,666,301 A * | 5/1972 | Jorn | F16F 1/387 267/282 |
| 3,705,718 A | 12/1972 | Fukui et al. | |
| 3,844,583 A * | 10/1974 | Sakow | B60G 11/20 267/273 |
| 3,853,310 A | 12/1974 | Poulos | |
| 4,266,418 A | 5/1981 | Sakai et al. | |
| 4,468,014 A * | 8/1984 | Strong | F16F 1/368 188/268 |
| 4,475,723 A | 10/1984 | Meyer | |
| 4,546,958 A | 10/1985 | Ohno et al. | |
| 4,575,057 A | 3/1986 | Robertson | |
| 4,637,594 A | 1/1987 | Saito et al. | |
| 4,707,317 A | 11/1987 | Epel et al. | |
| 4,749,534 A * | 6/1988 | Robertson | B29C 53/564 156/172 |
| 4,772,044 A * | 9/1988 | Booher | B29C 70/52 267/149 |
| 4,802,659 A | 2/1989 | Hope | |
| 5,305,847 A * | 4/1994 | Mefford | B60K 5/1216 180/291 |
| 5,518,819 A * | 5/1996 | Shibahara | B60G 7/02 174/152 R |
| 5,938,221 A | 8/1999 | Wilson | |
| 6,363,613 B1 * | 4/2002 | Wolf | F16F 1/3856 267/141.2 |
| 6,406,007 B1 | 6/2002 | Wilson | |
| 6,422,540 B1 | 7/2002 | Pfletschinger et al. | |
| 6,530,562 B1 * | 3/2003 | Sutton | F16F 1/185 267/36.1 |
| 6,991,223 B2 | 1/2006 | Planter et al. | |
| 7,017,888 B2 | 3/2006 | Planter et al. | |
| 7,052,001 B2 | 5/2006 | Hitt et al. | |
| 7,210,673 B2 | 5/2007 | Planter et al. | |
| 7,419,146 B2 | 9/2008 | Planter et al. | |
| 7,441,759 B2 * | 10/2008 | Franke | F16F 1/3842 267/279 |
| 7,712,754 B2 * | 5/2010 | Penzotti | B60G 11/12 267/260 |
| 7,744,105 B2 | 6/2010 | Dudding et al. | |
| 7,861,413 B2 * | 1/2011 | Michael | B62D 55/0842 180/9.54 |
| 7,931,287 B2 | 4/2011 | Dudding et al. | |
| 8,100,423 B2 * | 1/2012 | Kruse | B60G 7/001 280/124.134 |
| 2003/0085497 A1 | 5/2003 | Wilson | |
| 2005/0077665 A1 | 4/2005 | Planter et al. | |
| 2006/0103103 A1 * | 5/2006 | Land | B60G 7/02 280/124.163 |
| 2006/0231993 A1 * | 10/2006 | Collyer | B60G 11/12 267/270 |
| 2007/0040309 A1 | 2/2007 | Tolani | |
| 2007/0267790 A1 | 11/2007 | Furman et al. | |
| 2008/0164645 A1 * | 7/2008 | Bost | F16F 1/3814 267/140.12 |
| 2008/0284069 A1 | 11/2008 | Aulich et al. | |
| 2009/0202184 A1 | 8/2009 | Franke et al. | |
| 2009/0249581 A1 * | 10/2009 | Bost, Jr. | B60G 3/20 16/2.1 |
| 2009/0256296 A1 | 10/2009 | Aulich et al. | |
| 2011/0018217 A1 | 1/2011 | Bramer et al. | |
| 2011/0222803 A1 * | 9/2011 | Noble | F16F 1/3842 384/428 |
| 2011/0266408 A1 * | 11/2011 | Koczar | B60G 7/02 248/309.1 |
| 2011/0291380 A1 | 12/2011 | Gerrard et al. | |
| 2012/0068429 A1 * | 3/2012 | Hartel | B60G 21/0551 280/124.106 |
| 2012/0098226 A1 * | 4/2012 | Rodecker | B60G 21/0551 280/124.106 |
| 2012/0211931 A1 | 8/2012 | Fane De Salis | |
| 2014/0265073 A1 * | 9/2014 | Johnston | F16F 1/3863 267/140.4 |
| 2014/0353936 A1 * | 12/2014 | Preijert | B60G 9/003 280/124.116 |

FOREIGN PATENT DOCUMENTS

| | | |
|---|---|---|
| CN | 202274030 U | 6/2012 |
| DE | 31 47 629 | 6/1983 |
| EP | 0 496 044 | 7/1992 |
| EP | 1 138 432 | 10/2001 |
| EP | 1 632 370 | 3/2006 |
| EP | 1 691 104 | 8/2006 |
| EP | 1 980 425 | 10/2008 |
| EP | 2 660 083 | 11/2013 |
| GB | 1 205 850 | 9/1970 |
| JP | 56-36308 | 4/1981 |
| JP | 56-167938 | 12/1981 |
| JP | 58-37332 | 3/1983 |
| JP | 63-251638 | 10/1988 |
| JP | 07-100569 | 4/1995 |

\* cited by examiner

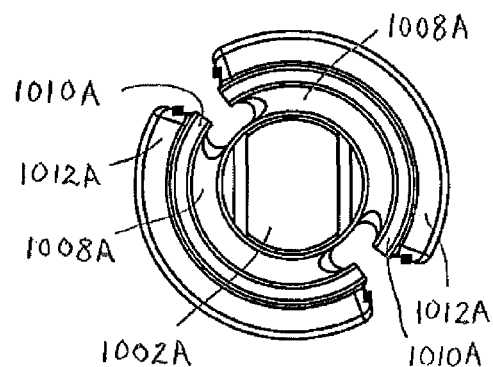
FIG. 11D
FIG. 11E
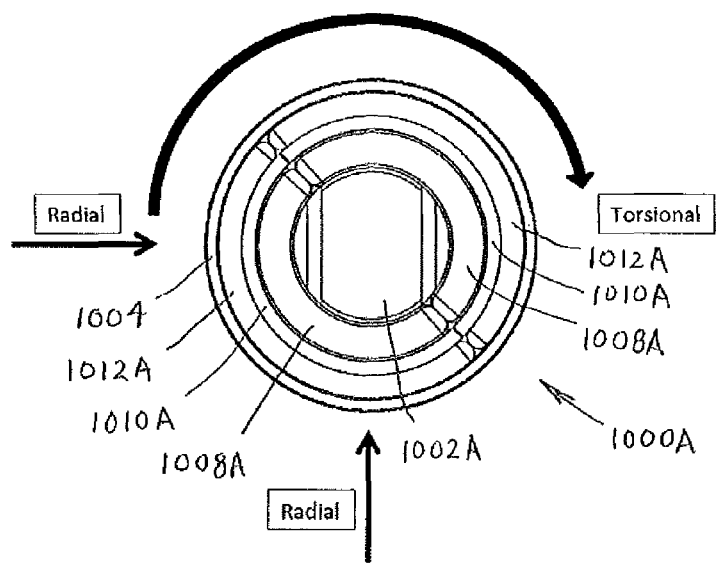
FIG. 11F
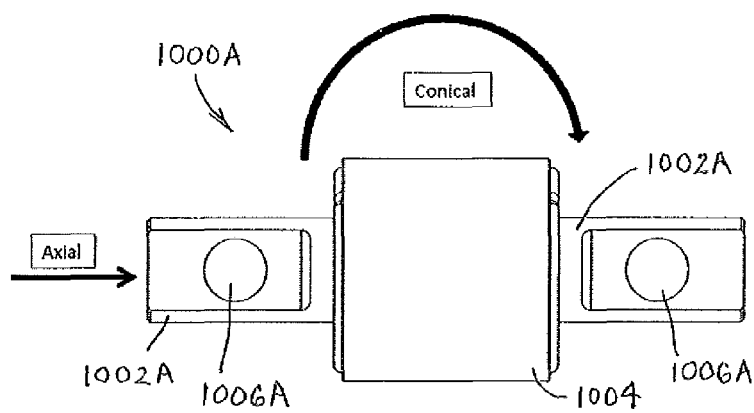

MULTI-TAPERED SUSPENSION COMPONENT

CROSS-REFERENCE TO RELATED APPLICATION

This application is a divisional application of copending application Ser. No. 13/738,656, which was filed Jan.10, 2013 and which is incorporated by reference herein in its entirety.

BACKGROUND OF THE INVENTION

Field of the Invention

The present invention generally relates to energy storing suspension components for use in suspension systems for wheeled vehicles and trailers, and more particularly to energy storing suspension components having multiple tapers along their length, including support members, spring members, and the like, and to combinations of such energy storing suspension components with bushings. This disclosure presents several example embodiments that are representative of suspension components that may be utilized for particular purposes.

Discussion of the Prior Art

Wheeled vehicles and trailers commonly have suspension systems that utilize suspension components, such as support members, spring members, and the like, in suspending a vehicle or trailer frame and/or body assembly above and connecting to the axles to which wheels are rotatably connected. In this context, the frame and/or body assembly generally are referred to as the sprung portion of the vehicle or trailer and the wheels and respective axles, whether dealing with independent suspensions or solid axle suspensions, generally are referred to as the unsprung portions of the vehicle or trailer. For ease of reference, the suspension systems may be said to be a part of a chassis of a wheeled vehicle or trailer, with an understanding that the chassis may include a frame assembly or may be integrally constructed with a body assembly, such as in a so-called unibody construction.

Suspension systems typically include active components designed to isolate from the sprung portion the disturbances encountered by the unsprung portions, such as occur during acceleration and deceleration, or during jounce and rebound of the axle when traversing bumps in a road surface and the like, and to withstand lateral and roll forces, such as are encountered when cornering. Such suspension systems also typically are designed with an intended relative positioning of the unsprung portions to the sprung portion at rest and during normal operation of the vehicle or trailer. This relative positioning of the sprung portion to the unsprung portions can be influenced by component configurations and the way in which particular components are operatively coupled together, and generally results in what is commonly referred to as the ride height of a vehicle or trailer, which is associated with the height of a vehicle or trailer when the suspension system is at rest and in a normal condition ready to isolate disturbances.

Over time, a variety of different components and entire suspension systems have been developed to alter the capacity, ride height, ride comfort and handling characteristics of vehicles and trailers. The desire to alter these features with respect to suspensions may be prompted by a variety factors. However, suspension components, such as support members, spring members, and the like, play a dynamic role within a suspension system and their spring rates, both vertically and laterally, as well as stress levels and the ability to transfer loads to adjacent structures, present complex challenges.

For instance, a vehicle may utilize a traditional leaf spring member that is relatively thicker in an axle seat portion where the axle is coupled to the spring member. The spring member then may include a taper that decreases the thickness of the spring member at an end, to permit the end to be formed into an upturned eye. Such a spring member typically will have an axle seat portion that has a greater width than thickness and will be configured to have an adequate vertical spring rate to handle vertical loads and disturbances encountered on roads. Thus, this type of suspension component typically has a largest cross-sectional area in an axle seat portion, often with the axle seat portion having a greater width than thickness, and may taper to decrease in thickness and taper to increase in width at the spring member ends. In this manner, the spring member may maintain a somewhat similar or continuously decreasing cross-sectional area along its length.

However, such common prior art designs can lead to production of heavy spring members having an adequate vertical spring rate but a significantly higher lateral spring rate than otherwise would be necessary. This can result in unacceptable stress concentrations in the spring member near the axle seat portion under lateral bending, and in the transfer of excessive and potentially damaging loads to the coupling assemblies that are used to operatively couple the spring member to the chassis and to the axle. However, if a spring member and its coupling assemblies are configured with a combined bushing and lateral spring rate that is too low, then the lateral loads induced during articulation of the spring member will not be adequately transferred to the coupling components. In such instances, the loads are transferred to the vertical direction, resulting in higher and potentially unacceptable vertical stresses.

The present disclosure addresses shortcomings found in prior art suspension components for wheeled vehicles and trailers and in energy storing suspension components and bushings utilized therein.

SUMMARY OF THE INVENTION

The present disclosure generally provides energy storing suspension components and bushings for wheeled vehicles and trailers that have features that can provide support members, spring members, and the like, with enhanced performance characteristics. The components may be used in suspension systems in front or rear suspensions of chassis for motored vehicles, as well as trailers. By changing the section inertia in what is commonly referred to as a front or first limb, or in the rear or second limb (also commonly referred to as a cantilever) of a support member, spring member, or the like, specifically by modifying the width and thickness of the material simultaneously along at least a portion thereof, and changing the tapers along the length thereof, one is able to maintain relatively constant stress in both vertical bending and lateral bending. This, in turn, allows for more lateral bending deflection before failure, and better fatigue life under larger deflections when compared to prior art support members, spring members, and the like. The greater lateral compliance also reduces the loads pushed off to the coupling assemblies for the energy storing suspension component, reducing the stresses therein, and reducing the roll stiffness. In addition, such energy storing suspension components may be particularly advantageously utilized when used in combination with low axial rate bushings, and particularly bushings having high radial to axial rate ratios.

The changes in section inertia in a limb of an energy storing suspension component, such as a support member, spring member, or the like, may be achieved in various configurations. Preferably such changes include tapers in a first or second limb wherein the limb decreases in width and in thickness as the limb extends from an axle seat portion toward an end, and then a reversal in taper at least such that the limb then increases in width when continuing to extend toward the respective end of the energy storing suspension component. While tapers having a varying linear width or thickness are preferred, other taper configurations may be utilized. The energy storing suspension component may include multiple tapers in width and/or thickness, as well. Moreover, further enhancements, such as in mass reduction or stress reduction, may be gained by not just utilizing such tapers in one limb, but in some configurations by also including at least one taper in width and/or thickness in the axle seat portion and/or in both a first and a second limb, if the energy storing suspension component includes both limbs.

Unlike prior art devices having tapers, the energy storing suspension components disclosed herein include support members, spring members, and the like, that include a first and/or second limb having tapers that decrease both the width and thickness within a portion of the limb as the limb extends from an axle seat portion and toward an end, with a reversal in at least the width taper so as to increase in width as the limb further extends toward the end of the energy storing suspension component. This disclosure also includes examples of limbs that have multiple tapers that change in magnitude, stop and reverse as the limb extends from an axle seat portion and toward an end. These potential variations also may be employed in a first and/or second limb of an energy storing suspension component, such as a support member, spring member, or the like.

There are numerous additional variations in suspension components, including energy storing suspension components and bushings, including but not limited to low axial rate bushings, that are contemplated and considered to be within the scope of this disclosure, including for instance that an axle seat portion of a suspension component may include, for locating and/or mounting purposes, one or more vertical or lateral holes therethrough, a locating stud, or no hole or stud. Further, the axle seat portion of the energy storing suspension component may have a greater thickness than width, may have a greater width than thickness, or may have a square cross-section, and the axle seat portion may include one or more tapers in width or in thickness, or no taper at all.

Depending on the mounting configuration and desired location of the suspension components relative to the sprung portion of the wheeled vehicle or trailer, a first and/or second end of an energy storing suspension component may be formed with a configuration to be operatively coupled to a frame member. For instance, a first or second frame member coupling assembly may engage a first or second end of an energy storing suspension component that is bent into a coupling portion, such as an eye. Such an eye may be in the form of an upturned eye, a Berlin eye, a downturned eye, or other shapes, and may be used in combination with various bushings, with particularly advantageous results being achieved with low axial rate bushings. The end also may be formed as a straight end having parallel or tapered upper and lower surfaces, such as may be configured to be operatively coupled to a frame member coupling that is configured with a wear plate that may be in the form of a slipper pad or a cam. The suspension components also may be configured to include components to operatively couple a damper or shock absorber to a frame member and to an axle, or a support member, spring member, or the like.

In a first aspect, disclosed herein is an energy storing suspension component that includes an axle seat portion, an end, and a limb extending between the axle seat portion and the end. The limb includes a first taper wherein the limb decreases in width as the limb extends toward the end, a second taper wherein the limb decreases in thickness as the limb extends toward the end, wherein along the limb there is at least a portion where both the first taper and second taper are present, and a third taper that is further from the axles seat portion than the first taper and wherein the limb increases in width as the limb extends toward the end.

In a second aspect, disclosed herein is an energy storing suspension component having the features set forth above with respect to the first aspect, and wherein the end is a first end and the limb is a first limb, and further including a second end, and a second limb extending between the axle seat portion and the second end. The second limb includes a first taper wherein the second limb decreases in width as the second limb extends toward the second end, a second taper wherein the second limb decreases in thickness as the second limb extends toward the second end, wherein along the second limb there is at least a portion where both the first taper and second taper are present, and a third taper that is rearward of the first taper and wherein the second limb increases in width as the second limb extends toward the second end.

In a third aspect, disclosed herein is an energy storing suspension component in combination with a bushing that includes an energy storing suspension component having an axle seat portion, an end configured to include an eye, and a limb extending between the axle seat portion and the end, wherein the limb comprises a first taper wherein the limb decreases in width as the limb extends toward the end, a second taper wherein the limb decreases in thickness as the limb extends toward the end, wherein along the limb there is at least a portion where both the first taper and second taper are present, and a third taper that is further from the axle seat portion than the first taper and wherein the limb increases in width as the limb extends toward the end, and further includes a low axial rate bushing configured to be received by the eye of the energy storing suspension component.

Thus, the present disclosure presents examples of energy storing suspension components and combinations of such components with bushings to be advantageously used in suspension systems for the chassis of wheeled vehicles and trailers.

It is to be understood that both the foregoing general description and the following detailed description are exemplary and provided for purposes of explanation only, and are not restrictive of the subject matter claimed. Further features and objects of the present disclosure will become more fully apparent in the following description of example embodiments and from the appended claims.

BRIEF DESCRIPTION OF THE DRAWINGS

In describing the preferred examples, reference is made to the accompanying drawing figures wherein like parts have like reference numerals, and wherein:

FIGS. 11A-11F are perspective, end and side views of example bushings that may be used with any of the example energy storing suspension components having an end configured to include an eye, in a first configuration shown in FIG. 11A with an outer can or in a second configuration shown in FIG. 11C without an outer can.

Figure 1A:
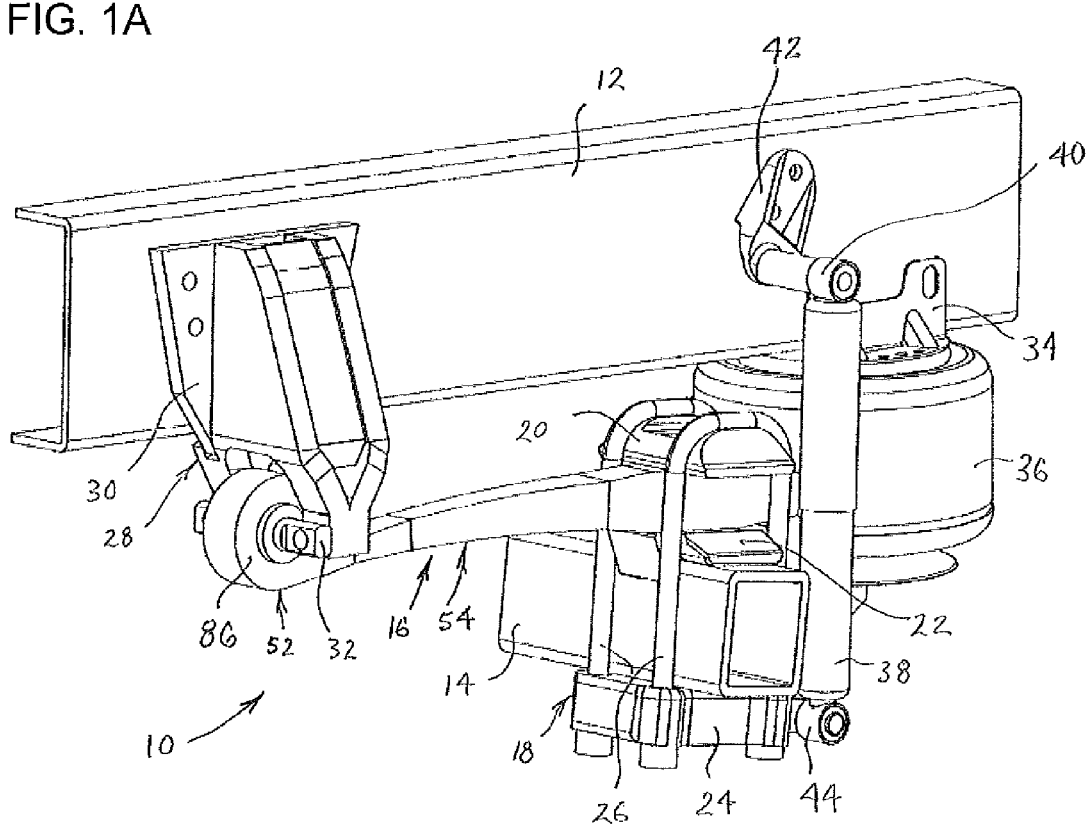
FIGS. 1A-1D are front perspective, top, side and end views, respectively, of a first example of a portion of a suspension system utilizing an energy storing suspension component and bushing that is located along a frame member of a wheeled vehicle or trailer.
Figure 1B:
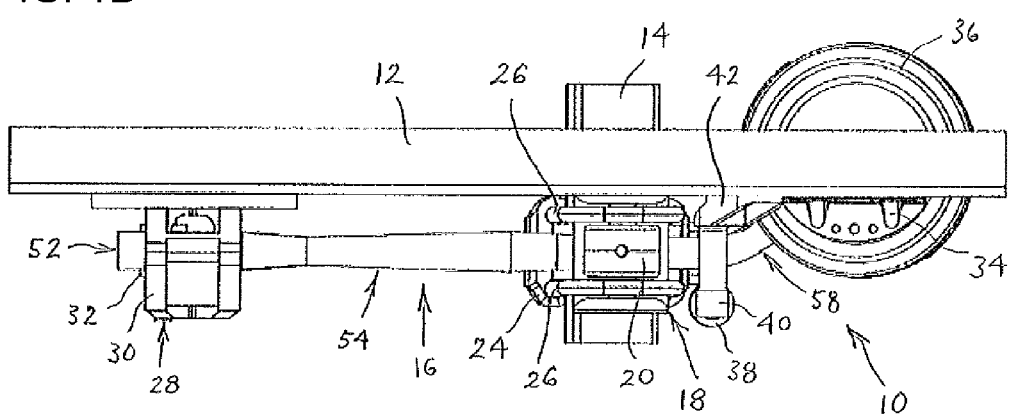
Figure 1C:
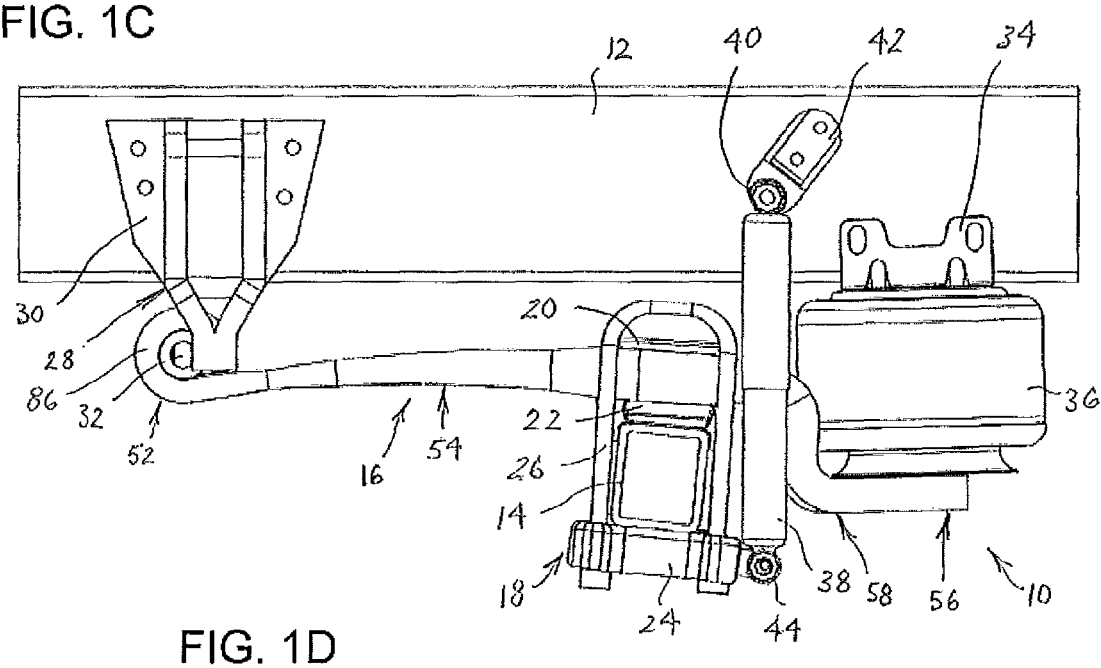
Figure 1D:
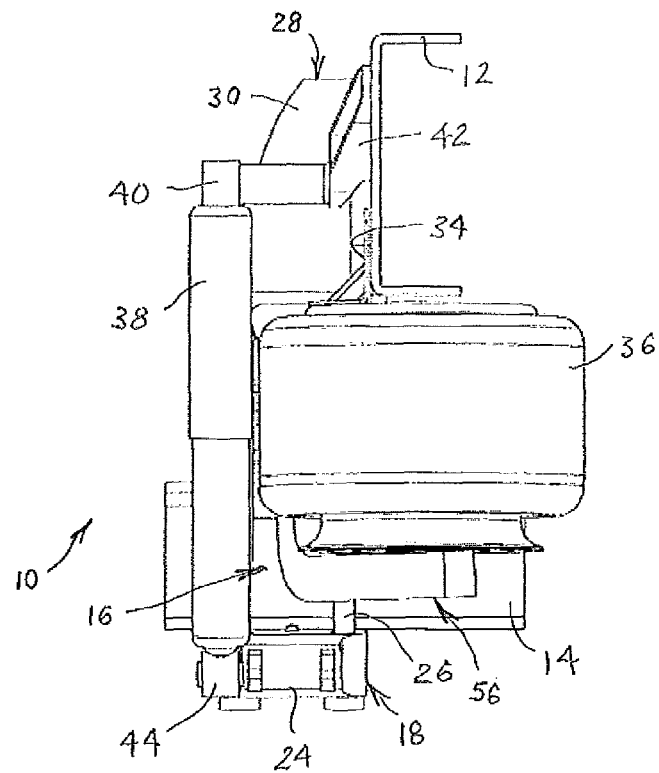

It should be understood that the drawings are not to scale. While some mechanical details of energy storing suspension components and bushings used therewith, including details of fastening means, connection to well known vehicle components, and other plan and section views of the particular components, have been omitted, such details were removed for better viewing of the main components and are considered within the comprehension of those skilled in the art in light of the present disclosure. It also should be understood that the present disclosure is not limited to the examples illustrated.

DETAILED DESCRIPTION

This disclosure presents energy storing suspension components, such as support members, spring members, and the like, that may be used in suspension systems on chassis, on the front or rear of wheeled vehicles or trailers. Several example energy storing suspension components for use in the suspension systems are disclosed herein, as well as a particularly advantageous bushings for use in combination with one of the example energy storing suspension components having an end configured to include an eye. It will be apparent that each example energy storing suspension component includes an axle seat portion, an end, and a limb extending between the axle seat portion and the end, with the limb including a first taper wherein the limb decreases in width as the limb extends toward the end, a second taper wherein the limb decreases in thickness as the limb extends toward the end, wherein along the limb there is at least a portion where both the first taper and second taper are present, and a third taper that is further from the axle seat portion than the first taper and wherein the limb increases in width as the limb extends toward the end. It will be appreciated that the end and limb of the energy storing suspension components may be referring to a front or first end and front or first limb, a rear or second end and rear or second limb, or may be referring to an energy storing suspension component having both first and second ends and first and second limbs that include the aforementioned configuration, and that numerous additional configurations and uses are contemplated.

Turning to FIGS. 1A-1D, a first example suspension system 10 is illustrated for coupling a longitudinally extending frame member 12 on one side of a chassis of a wheeled vehicle or trailer to a laterally extending axle 14 that is disposed below the frame member 12. As with the other drawings in this disclosure, it will be appreciated that the figures show a system for one side of a wheeled vehicle or trailer and a similar system would be provided on the opposite side to form a full suspension system. The first example suspension system 10 includes an energy storing suspension component 16, which in this first example is shown in a configuration of a support member. A general description of the suspension system 10 first will be provided, followed by a more detailed description of the first example energy storing suspension component 16.

In the first example suspension system 10, the axle 14 is operatively coupled to the energy storing suspension component 16 by an axle coupling assembly 18 that is configured to connect the axle 14 to the energy storing suspension component 16. In this example, the energy storing suspension component 16 is in an overslung configuration, extending over the axle 14. From the top of the axle coupling assembly 18 downward, the axle coupling assembly includes a first mounting pad 20, also known as a first guide plate or clamp plate, which in this configuration rests on the energy storing suspension component 16, an optional caster wedge 22 is disposed between the energy storing suspension component 16 and the axle 14, a second mounting pad 24, also known as a second guide plate or clamp plate, is located in this example below the axle 14. A pair of U-shaped bolts 26 are used to clamp together the aforementioned components between the first and second mounting pads 20 and 24.

As will be appreciated by those skilled in the art, vehicles often have a biased, fixed caster for each axle and different axles often have different desirable biased, fixed caster angles. Accordingly, if it is desired to include a fixed caster angle of the axle 14 in a suspension system, then a caster wedge 22 may be positioned between the axle seat portion of the energy storing suspension component 16 and the axle 14. It will be appreciated that, while this type of axle coupling assembly is illustrated, the scope of this disclosure is not to be limited to such an assembly, as other configurations and components may be utilized to couple an energy storing suspension component 16 to an axle 14, and a caster angle optionally may be provided and, depending on the axle assembly coupling utilized, a caster angle may be incorporated into a component other than a caster wedge.

As will be discussed in more detail below, the energy storing suspension component 16 is operatively coupled to the frame member 12 by a first frame member coupling assembly 28, which in this example is at the front, and which is in the form of a mounting bracket 30, and which in this example includes a bushing 32 connected thereto. The bushing 32 in this example is a shown in simplified form, but may be of various constructions, although examples of particularly advantageous low axial rate bushings are discussed below in more detail and in reference to FIGS. 11A-11F, 12A-12B, 13 and 14.

The example energy storing suspension component 16 shown in FIGS. 1A-1G also is operatively coupled to the frame member 12 by a second frame member coupling assembly 34 at the rear, which in this example is in the form of an upper air spring mounting bracket, because this suspension system 10 includes an air spring 36 disposed between the energy storing suspension component 16 and the frame member 12.

To provide damping, the suspension system 10 includes a shock absorber 38 that is operatively coupled at an upper end 40 to a frame member shock coupling 42, which is shown in the form of a mounting bracket, and at a lower end 44 to the second mounting pad 24, in a conventional manner, such as by a suitable fastener. It will be appreciated that some components, for example, fasteners for fastening together various components are not shown, so as to provide a better view of the more major components. Nevertheless, it will be recognized that various methods of fastening together components may be utilized without departing from the scope of the present disclosure, including, for example, nuts and bolts, lag screws, rivets, welding of various types, or any other suitable types of fasteners or fastening means.

Figure 1E:
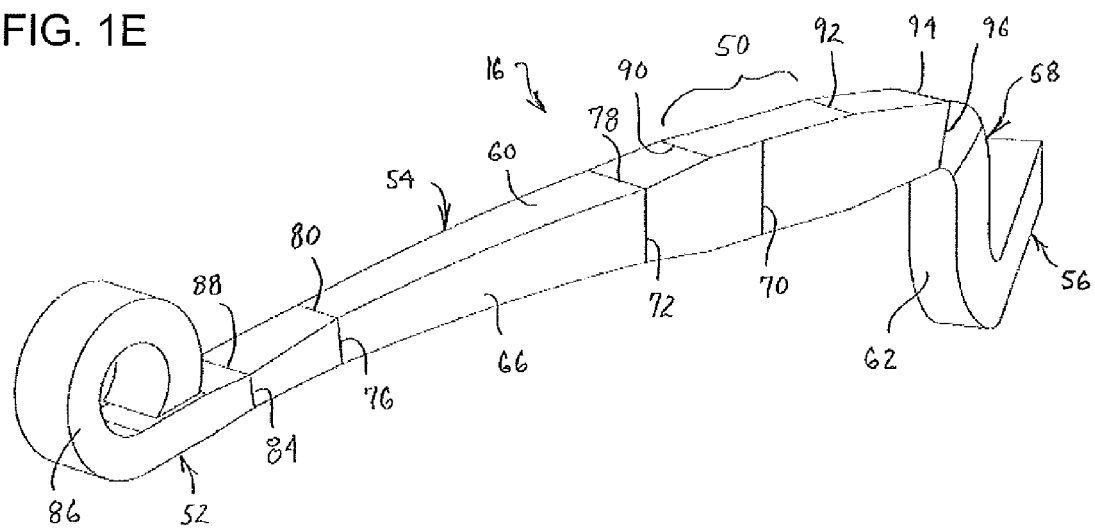
FIGS. 1E-1G are front perspective, top and side views, respectively, of the first example energy storing suspension component that is shown in FIGS. 1A-1D.
Figure 1F:
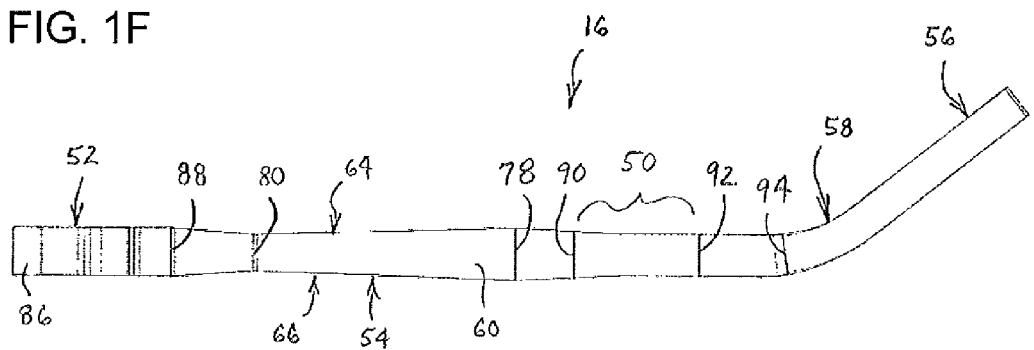
Figure 1G:
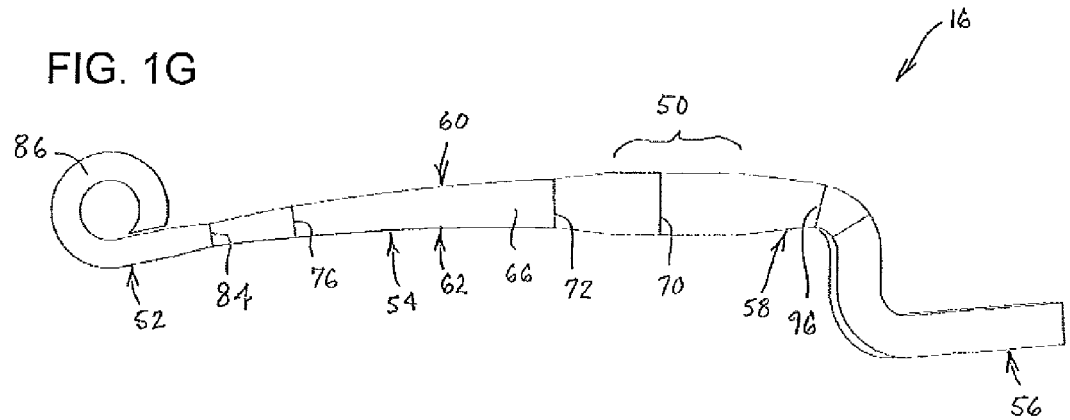

Having provided a general description of the suspension system 10 shown in FIGS. 1A-1D, attention is turned to the isolated views in FIGS. 1E-1G of the energy storing suspension component 16 of this first example. As may be seen in FIGS. 1E-1G, in this example, the energy storing suspension component 16 includes an axle seat portion 50, a first end 52 that in this example is at the front, and therefore, is forward of the axle seat portion 50, and a first limb 54 that extends between the axle seat portion 50 and the first end 52, which can be considered a front limb and which includes a slight reverse arch. Also included in this example is a second end 56 that is at the rear and therefore is rearward of the axle seat portion 50, and a second limb 58 that extends between the axle seat portion 50 and the second end 56, which can be considered a second limb.

The axle seat portion 50 is not defined with exactness, but is a portion along the energy storing suspension component 16 where the axle is coupled thereto. Somewhat similarly, the first end 52 and second end 56 are not intended to refer to a distal most surface at the ends of the respective first limb 54 and second limb 58, but rather should be considered those regions near to and including the distal ends of the energy storing suspension component 16. The axle seat portion 50 of the first example is not shown with locating holes or embedded studs, so as to better show the main components, but it will be appreciated that such features could be included if desired for a particular configuration.

The energy storing suspension component 16 generally has an upper surface 60 and a lower surface 62, and a thickness of the energy storing suspension component 16 can be determined at any selected position along its length, by measuring the distance between the upper surface 60 and lower surface 62 at the selected position. Similarly, the energy storing suspension component 16 has a right side surface 64 and a left side surface 66, as viewed in this example from above and looking in a forward direction of the component. Accordingly, a width of the energy storing suspension component 16 can be determined at any selected position along the length of the energy storing suspension component 16, by measuring the distance between the right side surface 64 and the left side surface 66 at the selected position.

It will be appreciated that throughout this disclosure, with respect to the descriptions of all of the examples provided, terms such as upper, lower, top, bottom, left, right, front and rear, all are relative terms and are not intended to be limiting because they depend on the context in which they are used and the relative position of the device at the time.

Given the focus on changes in thickness and width within an energy storing suspension component within this disclosure, the drawings include lines on the upper, lower, right side and left side surfaces, 60, 62, 64, 66, respectively, that are intended to indicate where a dimensional change occurs, which assists the viewer in determining where tapers in thickness and width are occurring. Tapers and their changes in thickness and width may be appreciated by comparing the respective isolated views of the energy storing suspension component, such as when viewing the first example energy storing suspension component 16 in FIGS. 1E-1G. For instance, the significance of the vertical line 70 that is shown in FIGS. 1E and 1G on the left side surface 66 of the axle seat portion 50, is apparent in FIG. 1F, which illustrates that the axle seat portion 50 has a taper that decreases in width from forward of the axle seat portion 50, actually starting in the first limb 54 at vertical line 72 and continuing into to the axle seat portion 50 until the position at the vertical line 70, where the axle seat portion 50 then transitions to a constant width and extends rearward into the second limb 58.

As may be seen in FIGS. 1E-1G, the axle seat portion 50 of the first example has a greater thickness than width, and includes at least a taper that decreases in width in the forward portion of the axle seat portion 50, as the energy storing suspension component tapers to decrease in width between the positions indicated from the vertical line 72 to the vertical line 70. Thus, while the axle seat portion 50 is generally located between the positions indicated at the lateral lines 90 and 92, and has a constant thickness therebetween, there is a taper in the axle seat portion 50 that would be generally located in the forward portion of the axle seat portion 50, between the positions indicated at the lateral line 90 and the vertical line 70, and then there is a portion having constant width between the positions indicated at the vertical line 70 and the lateral line 92.

The first example energy storing suspension component 16 does not incorporate typical tapers found in prior art devices. Rather, it is apparent in FIGS. 1E-1G that the energy storing suspension component 16 has a first limb 54 that in this first example includes a first taper as the first limb 54 extends from the axle seat portion 50 toward the first end 52 and which begins at the position of the vertical line 72, wherein the first limb 54 decreases in width from the position at the vertical line 72 to the position at the vertical line 76 as the first limb 54 extends toward the first end 52. Indeed, it becomes apparent when viewing the related FIGS. 1E-1G, that the first limb 54 has a minimum width occurring along its length at a position associated with the vertical line 76. The first limb 54 includes a second taper wherein the first limb 54 decreases in thickness from the position at the lateral line 78 to the position at the lateral line 80 as the first limb 54 extends from the axle seat portion 50 toward the first end 52, as may be appreciated when comparing FIGS. 1E and 1F to FIG. 1G. Such a comparison also shows that along the first limb 54 there is at least a portion where both the first taper and second taper are present. The first limb 54 further includes a third taper that is further from the axle seat portion 50 than the first taper wherein the first limb 54 increases in width from the position at the vertical line 76 to the position at the vertical line 84 as the first limb 54 extends toward the first end 52.

The increased width at the first end 52 is beneficial to the structure of the first end 52. In this first example, the first end 52 is configured to include an upturned eye 86. This may be seen when comparing FIGS. 1E and 1G to FIG. 1F. The energy storing suspension component 16 is operatively coupled to the frame member 12 at the upturned eye 86 via the first frame member coupling assembly 28. As may be seen in FIGS. 1A and 1C, the first frame member coupling assembly 28 includes the bushing 32 that passes through the eye 86 and is connected to the mounting bracket 30 that is further connected to the frame member 12. The tapers in the first limb 54 of the energy storing suspension component 16 provide an advantageous, more compliant lateral spring rate, as well as constant vertical and lateral stress in the first limb 54, while also reducing the forces transferred to the first frame member coupling assembly 28 and to the axle coupling assembly 18. This reduction in lateral stiffness permits a reduction in roll stiffness.

As may be seen in FIGS. 1E-1G, the energy storing suspension component 16 of the first example actually includes multiple tapers both in width and thickness along its length. The use of the aforementioned combination of tapers is contrary to the normal practices within the prior art, and permits advantageous reductions in mass and improved lateral compliance, while achieving generally constant vertical and lateral stress along the first limb 54. Some of the additional tapers will be noted, such as, the first limb 54 including a further fourth taper that is further from the axle seat portion 50 than the second taper wherein the first limb 54 decreases in thickness from the position at the lateral line 80 to the position at the lateral line 88, as may be appreciated when comparing FIGS. 1E and 1F to FIG. 1G. It becomes apparent when viewing the related FIGS. 1E-1G, that the first limb 54 has a minimum thickness occurring along its length at a position associated with the lateral line 88, which is not coincident with the minimum width of the first limb 54. Yet a further taper in the first limb 54 is further from the axle seat portion than the second and fourth tapers wherein the first limb 54 increases in thickness from the position at the lateral line 88 as it extends toward the first end 52. This additional thickness is beneficial when moving into the first end 52 and in the forming of the upturned eye 86.

Another of the tapers may be seen just forward of the axle seat portion 50, as the first limb 54 extends from the axle seat portion 50 toward the first end 52, where the first limb 54 includes a further taper wherein the first limb 54 decreases in thickness from the position at the lateral line 90 to the position at the lateral line 78, as may be appreciated when comparing FIGS. 1E and 1F to FIG. 1G. This additional taper in thickness is beneficial for mass reduction, and provides a faster rate of reduction in thickness. This permits a relatively fast transition from a sufficiently thick axle seat portion 50 to an appropriate thickness that can then taper more gradually within a larger portion of the first limb 54 for managing spring rates and stresses.

The energy storing suspension component 16 of the first example is configured as a support member that includes a second limb 58 in the rear, and is in the form of a Z-beam, with a bent or kicked tail or second end. As such, the second end 56 is able to be located directly below and coupled to the air spring 36. So as to provide better viewing of the more major components of the suspension system 10, the second end 56 is shown without mounting holes or a coupling that would be clamped to the second end 56 of the second limb 58 for connection to the air spring 36. The second limb 58 also includes a taper wherein the second limb 58 decreases in thickness from the position at the lateral line 92 to the position at the lateral line 94 as it extends toward the second end 56. This may be appreciated when comparing FIGS. 1E and 1F to FIG. 1G. This further taper in thickness is beneficial in mass reduction and permits the second limb 58 to be appropriately sized for supporting the air spring 36. It should be noted that from the vertical line 70 within the axle seat portion 50 extending toward the vertical line 96 in the second limb 58, there is a constant thickness, and the vertical line 96 introduces the lateral bending within the second limb 58 while the lateral line 94 also introduces the vertical bending within the second limb 58.

It will be appreciated that the use of the above described multiple tapers in width and thickness provides a highly advantageous energy storing suspension component 16, in the form of a support member that is usable in a suspension for a chassis of a wheeled vehicle or trailer. While linear tapers are shown in this first example, this disclosure is not intended to be limited to linear tapers and it will be appreciated that other forms of tapers, such as parabolic, and the like, also could be utilized. Such an energy storing suspension component 16 can be constructed of various materials, and preferably is made of metal, such as steel. The energy storing suspension component 16 also preferably will be produced by multiple rolling processes to affect the width and thickness of the various portions along its length, but there is no intention of limiting the method of manufacture, which could include other processes to achieve a finished product, such as, for example, casting, forging or other suitable techniques or combinations of techniques.

It also will be appreciated that the tapers may be present in the first and/or second limbs, depending on the configuration of an energy absorbing suspension component desired. Also, while the transitions for tapers in width and thickness need not necessarily occur at the same position along an energy storing suspension component, in this first example energy storing suspension component 16, as may be seen in FIG. 1E, there are tapers in width and thickness in the first limb 54 that occur at the same position along the first limb 54, as indicated by vertical line 76 and lateral line 80. Similarly, there is a change in the taper with respect to both width and thickness at the same position within the first limb 54, as indicated by the vertical line 72 and the lateral line 78. A coincident change in taper affecting width and thickness also occurs within the second limb 58 at a position along its length, as indicated by the vertical line 96 and the lateral line 94. As stated, such transitions need not be coincident along the length of the respective limb. However, in an effort to produce an energy storing suspension component 16 having constant vertical and lateral stress along its length, it has been observed that it is beneficial when making a taper to change in one of width or thickness, that there also be a taper to change in the other aspect.

Turning to FIGS. 2A-2D, a second example suspension system 110 is illustrated for coupling a longitudinally extending frame member 112 on one side of a chassis of a wheeled vehicle or trailer to a laterally extending axle 114 that is disposed below the frame member 112. The second example suspension system 110 includes an energy storing suspension component 116, which in this second example is shown in a configuration of a Z-beam support member, but having a second limb that is in longitudinal alignment with a first limb, as opposed to the bent or kicked rear tail or second end of the first example energy suspension component 16.

The axle 114 is operatively coupled to the energy storing suspension component 116 by an axle coupling assembly 118 that is configured to connect the axle 114 to the energy storing suspension component 116. Similar to the first example, the second example uses an overslung configuration, with the axle coupling assembly 118 including a first mounting pad 120, which rests on the energy storing suspension component 116, an optional caster wedge 122 is disposed between the energy storing suspension component 116 and the axle 114, a second mounting pad 124 is located below the axle 114, and a pair of U-shaped bolts 126 are used to clamp together the aforementioned components between the first and second mounting pads 120 and 124.

The energy storing suspension component 116 is operatively coupled to the frame member 112 by a first frame member coupling assembly 128, which is in the form of a mounting bracket 130, and which in this example includes a bushing 132 connected thereto. The mounting bracket may be of various configurations, and may accommodate mounting of numerous types of bushings, including bushings of the particularly advantageous types shown in FIGS. 11A-11F, 12A-12B, 13 and 14. This example also has the energy storing suspension component 116 operatively coupled to the frame member 112 by a second framer member coupling assembly 134, which in this example is in the form of an upper air spring mounting bracket, because this suspension system 110 includes an air spring 136 disposed between the energy storing suspension component 116 and the frame member 112.

To provide damping, the suspension system 110 includes a shock absorber 138 that is operatively coupled at an upper end 140 to a frame member shock coupling 142, which is shown in the form of a mounting bracket, and at a lower end 144 to the second mounting pad 124, in a conventional manner, such as by a suitable fastener. It will be appreciated that, as was discussed with the first example, some components, for example, fasteners for fastening together various components are not shown for better viewing of the more major components, but various fastening components and methods of fastening may be utilized without departing from the scope of the present disclosure.

Figure 2A:
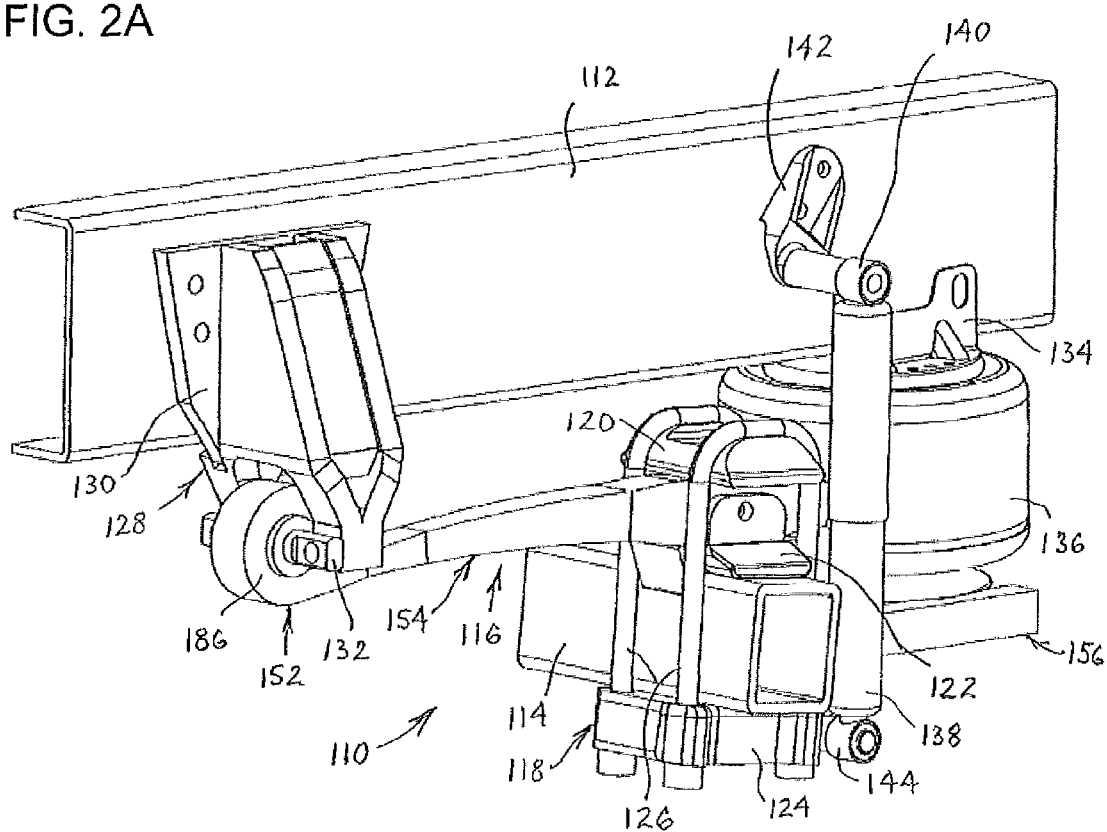
FIGS. 2A-2D are front perspective, top, side and end views, respectively, of a second example of a portion of a suspension system utilizing an energy storing suspension component and bushing that is located along a frame member of a wheeled vehicle or trailer.
Figure 2B:
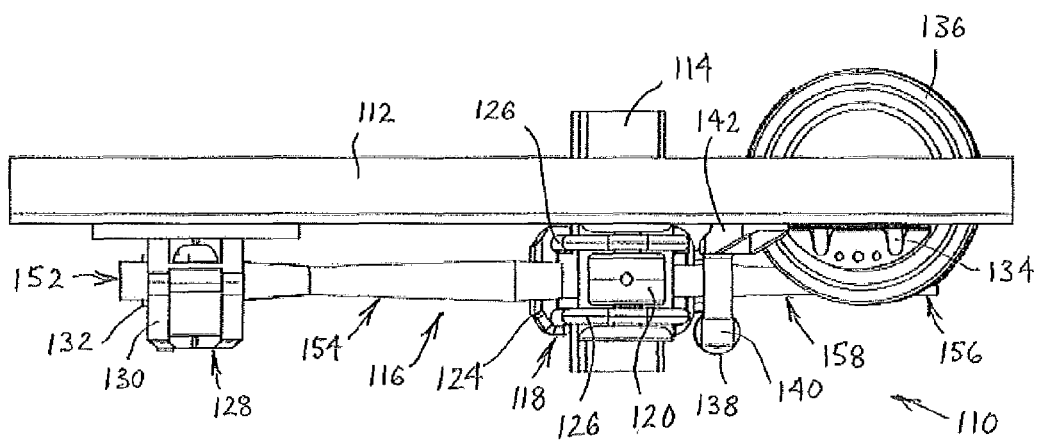
Figure 2C:
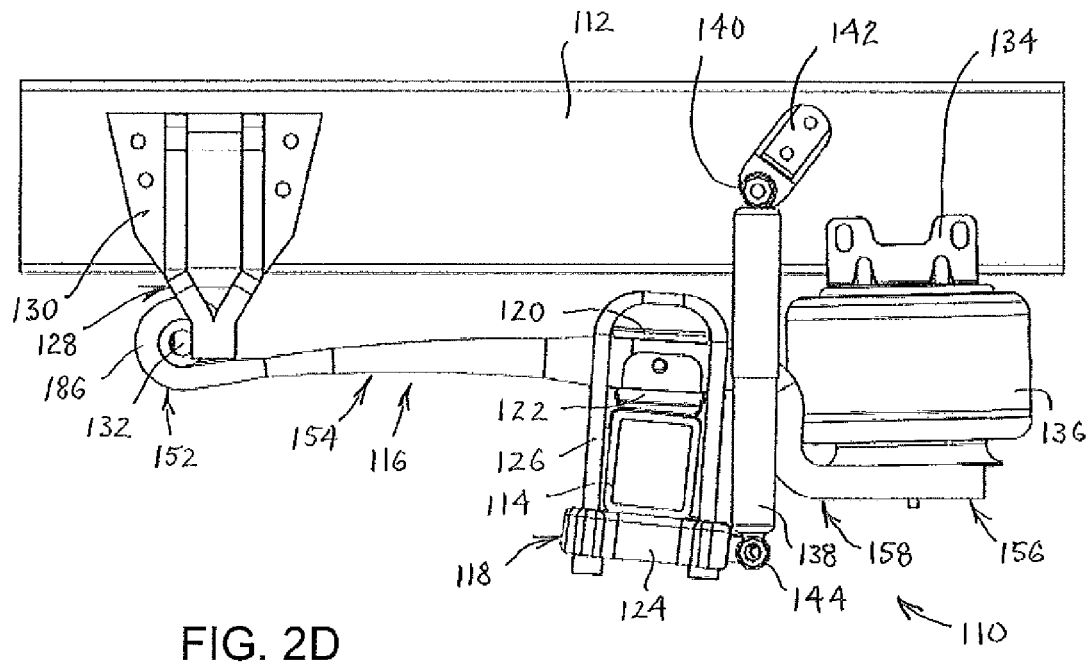
Figure 2D:
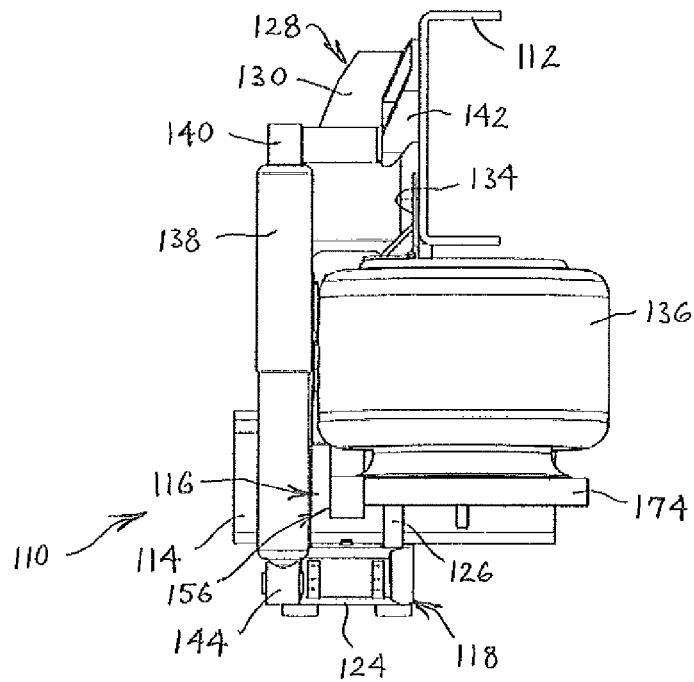
Figure 2E:
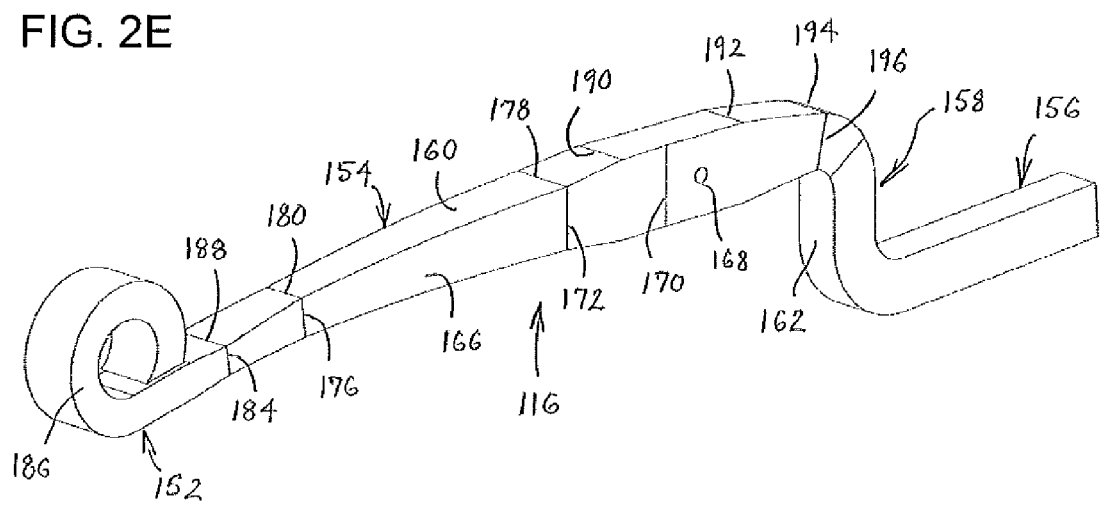
FIGS. 2E-2G are front perspective, top and side views, respectively, of the second example energy storing suspension component that is shown in FIGS. 2A-2D.
Figure 2F:
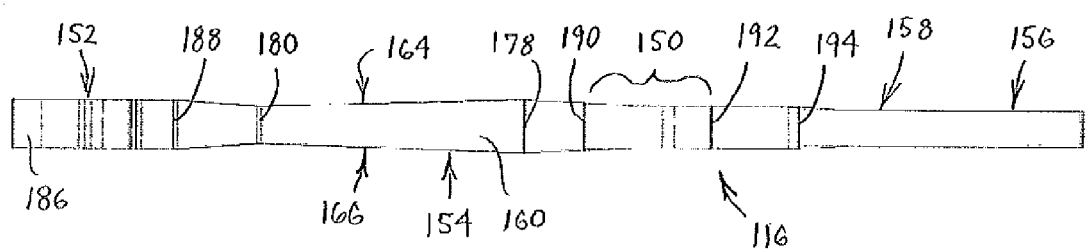
Figure 2G:
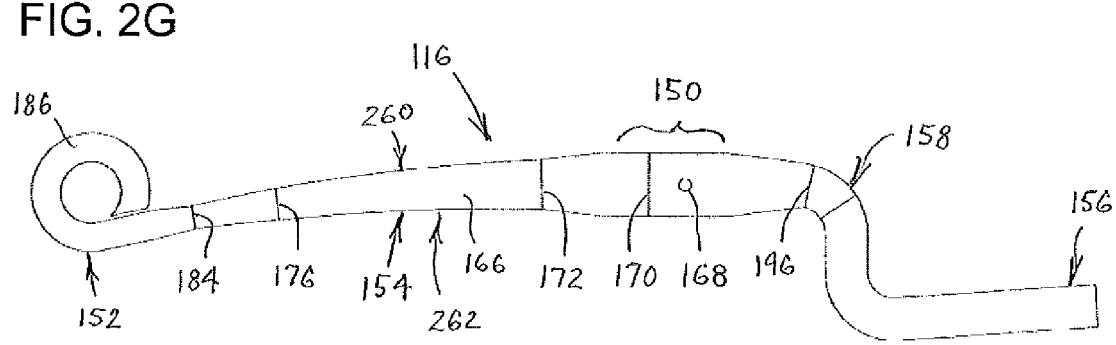

As may be seen in the isolated views in FIGS. 2E-2G, the energy storing suspension component 116 includes an axle seat portion 150, a first end 152 that in this example is forward of the axle seat portion 150, and a first limb 154 that extends between the axle seat portion 150 and the first end 152 and includes a slight reverse arch. Also included in this example is a second end 156 that is rearward of the axle seat portion 150, and a second limb 158 that extends between the axle seat portion 150 and the second end 156. As with the first example, the axle seat portion 150 of the second example is not defined with exactness, but is a portion along the energy storing suspension component 116 where the axle is coupled thereto. The first end 152 and second end 156 are intended to be considered those regions that are near to and including the distal ends of the energy storing suspension component 116. In the second example, the axle seat portion 150 is shown with a lateral hole 168 therethrough, which can be used with the axle coupling assembly 118 for connection and/or locating purposes, but it will be appreciated that alternative configurations may be utilized, as desired, such as having more than one such lateral hole therethrough, or one or more vertical holes therethrough, or no holes at all.

The energy storing suspension component 116 generally has an upper surface 160 and a lower surface 162, and a thickness can be determined at any selected position along the length of the energy storing suspension component 116 by measuring the distance between the upper surface 160 and lower surface 162 at the selected position. Similarly, the energy storing suspension component 116 has a right side surface 164 and a left side surface 166, as viewed from above and looking in a forward direction of the component. Accordingly, a width can be determined at any selected position along the length of the energy storing suspension component 116 by measuring the distance between the right side surface 164 and the left side surface 166 at the selected position.

FIGS. 2A-2G include lines on the upper, lower, right side and left side surfaces, 160, 162, 164, 166, respectively, that are intended to indicate where a dimensional change occurs, which assists in locating where tapers in thickness and width are occurring in the second example energy storing suspension component 116 which may be appreciated by comparing FIGS. 2E-2G. For instance, the significance of the vertical line 170 that is shown in FIGS. 2E and 2G on the left side surface 166 of the axle seat portion 150, is apparent in FIG. 2F, which illustrates that the axle seat portion 150 has a taper that decreases in width from forward of the axle seat portion 150, actually starting in the first limb 154 at vertical line 172 and continuing into to the axle seat portion 150 until the position at the vertical line 170, where the axle seat portion 150 then transitions to a constant width and extends rearward into the second limb 158. As may be seen in FIGS. 2E-2G, the axle seat portion 150 of the second example has a greater thickness than width, and includes at least a taper that decreases in width in the forward portion of the axle seat portion 150, as the energy storing suspension component tapers to decrease in width between the positions indicated from the vertical line 172 to the vertical line 170. Thus, there is a taper in the axle seat portion 150 that would be generally located in the forward portion of the axle seat portion 150, between the positions indicated at the lateral line 190 and the vertical line 170, and then there is a portion having constant width between the positions indicated at the vertical line 170 and the lateral line 192.

The second example energy storing suspension component 116 incorporates tapers that are similar to the above described first example, which are not like typical tapers found in prior art devices. FIGS. 2E-2G illustrate that the energy storing suspension component 116 has a first limb 154 that is configured to include a first taper as the first limb 154 extends from the axle seat portion 150 toward the first end 152, which begins at the position of the vertical line 172, wherein the first limb 154 decreases in width from the position at the vertical line 172 to the position at the vertical line 176 as the first limb 154 extends toward the first end 152. A minimum width of the first limb 154 occurs along its length at a position associated with the vertical line 176. The first limb 154 includes a second taper wherein the first limb 154 decreases in thickness from the position at the lateral line 178 to the position at the lateral line 180 as the first limb 154 extends toward the first end 152, as may be appreciated when comparing FIGS. 2E and 2F to FIG. 2G. Such a comparison also shows that along the first limb 154 there is at least a portion where both the first taper and second taper are present. The first limb 154 further includes a third taper that is further from the axle seat portion 150 than the first taper wherein the first limb 154 increases in width from the position at the vertical line 176 to the position at the vertical line 184 as the first limb 154 extends toward the first end 152.

The increased width at the first end 152 is beneficial to the structure of the first end 152. As with the first example, the first end 152 of the second example is configured to include an upturned eye 186. This may be seen when comparing FIGS. 2E and 2G to FIG. 2F. The energy storing suspension component 116 is operatively coupled to the frame member 112 at the upturned eye 186 via the first frame member coupling assembly 128. As may be seen in FIGS. 2A and 2C, the first frame member coupling assembly 128 includes the bushing 132 that passes through the eye 186 and is connected to the mounting bracket 130 that is further connected to the frame member 112. The tapers in the first limb 154 of the energy storing suspension component 116 provide an advantageous, more compliant lateral spring rate, as well as constant vertical and lateral stress in the first limb 154, while also reducing the forces transferred to the first frame member coupling assembly 128 and to the axle coupling assembly 118.

As may be seen in FIGS. 2E-2G, the energy storing suspension component 116 of the second example actually includes multiple tapers both in width and thickness along its length. The use of the aforementioned combination of tapers is contrary to the normal practices within the prior art, and permits advantageous reductions in mass and improved lateral compliance, while achieving generally constant vertical and lateral stress along the first limb 154. Additional tapers occur in the first limb 154, such as a further fourth taper that is further from the axle seat portion 150 than the second taper wherein the first limb 154 decreases in thickness from the position at the lateral line 180 to the position at the lateral line 188, as may be appreciated when comparing FIGS. 2E and 2F to FIG. 2G. It becomes apparent when viewing the related FIGS. 2E-2G, that the first limb 154 has a minimum thickness occurring along its length at a position associated with the lateral line 188. Yet a further taper in the first limb 154 is further from the axle seat portion 150 than the second and fourth tapers wherein the first limb 154 increases in thickness from the position at the lateral line 188 as it extends toward the first end 152. This additional thickness is beneficial when moving into the first end 152 and in the forming of the upturned eye 186.

Another of the tapers may be seen just forward of the axle seat portion 150, where the first limb 154 includes a further taper wherein the first limb 154 decreases in thickness from the position at the lateral line 190 to the position at the lateral line 178, as may be appreciated when comparing FIGS. 2E and 2F to FIG. 2G. This additional taper in thickness is beneficial for mass reduction, and provides a faster rate of reduction in thickness. This permits a relatively fast transition from a sufficiently thick axle seat portion 150 to an appropriate thickness that can then taper more gradually within a larger portion of the first limb 154 for managing spring rates and stresses.

With the Z-beam configuration of the energy storing suspension component 116 of the second example, the second end 156 is not located directly below the air spring 136. Instead, the air spring 136 sits atop and is connected to an air spring lower support 174, which is coupled to the second end 156, such as by welding, or by vertical and/or lateral holes therethrough, with fasteners in the form of bolts or the like, or by any other suitable fastening means. The air spring lower support 174 may be connected to a similar support on the opposite side of the full suspension system, such as by a cross member (not shown), and the air springs may alternatively be connected to such as cross member. The second limb 158 also includes a taper wherein the second limb 158 decreases in thickness from the position at the lateral line 192 to the position at the lateral line 194 as it extends toward the second end 156. This may be appreciated when comparing FIGS. 2E and 2F to FIG. 2G. This further taper in thickness is beneficial in mass reduction and permits the second limb 158 to be appropriately sized for supporting the air spring lower support 174 and the air spring 136. It should be noted that from the vertical line 170 within the axle seat portion 150 extending rearward to the vertical line 196 in the second limb 158, there is a constant thickness, and the lateral line 194 also introduces the vertical bending within the second limb 158.

Use of the above described multiple tapers in width and thickness provides a highly advantageous energy storing suspension component 116, in the form of a support member that is usable in a suspension for a chassis of a wheeled vehicle or trailer. While linear tapers are shown in this second example, this disclosure is not intended to be limited to linear tapers and other forms of tapers could be utilized. The materials and methods of manufacture for components of this second example suspension system are similar to those noted for the first example. It also will be appreciated that the transitions for tapers in width and thickness need not necessarily, but may occur at the same position along an energy storing suspension component, and in this second example energy storing suspension component 116, as seen in FIGS. 2E-2G, the minimum width and thickness in the first limb 154 do not occur at the same position. The minimum width occurs at the position indicated by the vertical line 176 and the minimum thickness occurs at the position indicated by the lateral line 188. There is a change in the taper with respect to both width and thickness at the same position within the first limb 154, as indicated along its length at the position of the vertical line 172 and the lateral line 178. A coincident change in taper affecting width and thickness at a position also occurs within the second limb 158, as indicated by the vertical line 196 and the lateral line 194. As stated, such transitions need not be coincident, but as previously noted, it is beneficial when making a taper to change in one of width or thickness, that there also be a taper to change in the other aspect.

Turning to FIGS. 3A-3D, a third example suspension system 210 is illustrated for coupling a longitudinally extending frame member 212 on one side of a chassis of a wheeled vehicle or trailer to a laterally extending axle 214 that in this example is disposed below the frame member 212. The third example suspension system 210 includes an energy storing suspension component 216, which is shown in a configuration commonly referred to as a hockey stick-shaped support member having a bent or kicked tail or rear or second limb.

The axle 214 is operatively coupled to the energy storing suspension component 216 by an axle coupling assembly 218 that is configured to connect the axle 214 to the energy storing suspension component 216 using an underslung configuration, with the energy storing suspension component 216 extending under the axle 214. The axle coupling assembly 218 includes a first mounting pad 220, which in this example rests on top of the axle 214, an optional caster wedge 222 is disposed between the axle 214 and the energy storing suspension component 216, a second mounting pad 224 is located below the energy storing suspension component 216, and a pair of U-shaped bolts 226 are used to clamp together the aforementioned components, between the first and second mounting pads 220 and 224.

The energy storing suspension component 216 is operatively coupled to the frame member 212 by a first frame member coupling assembly 228, which is in the form of a mounting bracket 230, and which in this example includes a bushing 232 connected thereto. The bushing 232 is shown in simplified form, but the mounting bracket may be of various configurations and may accommodate a bushing of various constructions, including any of the particularly advantageous low axial rate bushings shown in FIGS. 11A-11F, 12A-12B, 13 and 14. This example also has the energy storing suspension component 216 operatively coupled to the frame member 212 by a second frame member coupling assembly 234, which in this example is in the rear and is in the form of an upper air spring mounting bracket, because this suspension system 210 includes an air spring 236 disposed between the energy storing suspension component 216 and the frame member 212.

To provide damping, the suspension system 210 includes a shock absorber 238 that is operatively coupled at an upper end 240 to a frame member shock coupling 242, which is shown in the form of a mounting bracket, and at a lower end 244 to a bracket extension of the caster wedge 222, in a conventional manner, such as by a suitable fastener. It will be appreciated that, as was discussed with the first example, some components, for example, fasteners for fastening together various components are not shown for better viewing of the more major components, but various fastening components and methods of fastening may be utilized without departing from the scope of the present disclosure.

Figure 3A:
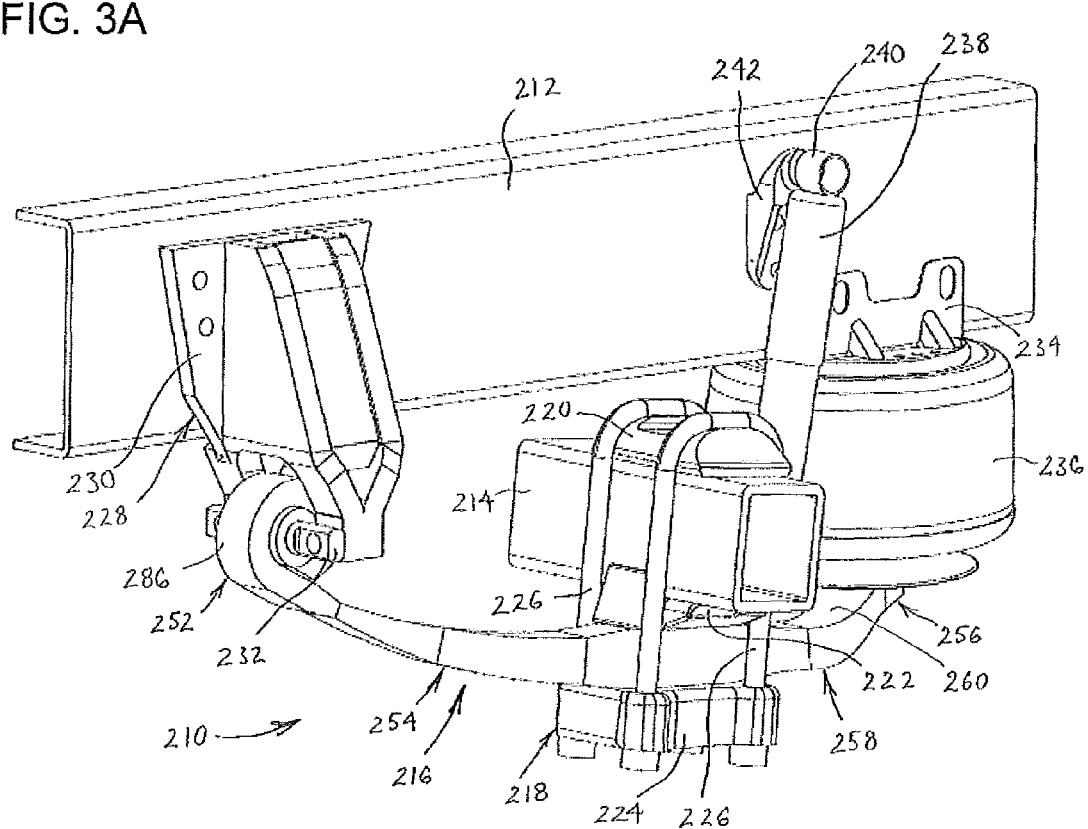
FIGS. 3A-3D are front perspective, top, side and end views, respectively, of a third example of a portion of a suspension system utilizing an energy storing suspension component and bushing that is located along a frame member of a wheeled vehicle or trailer.
Figure 3B:
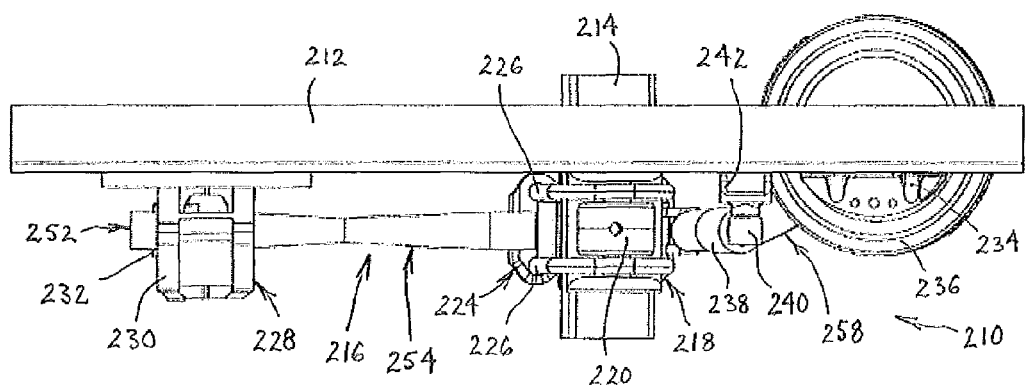
Figure 3C:
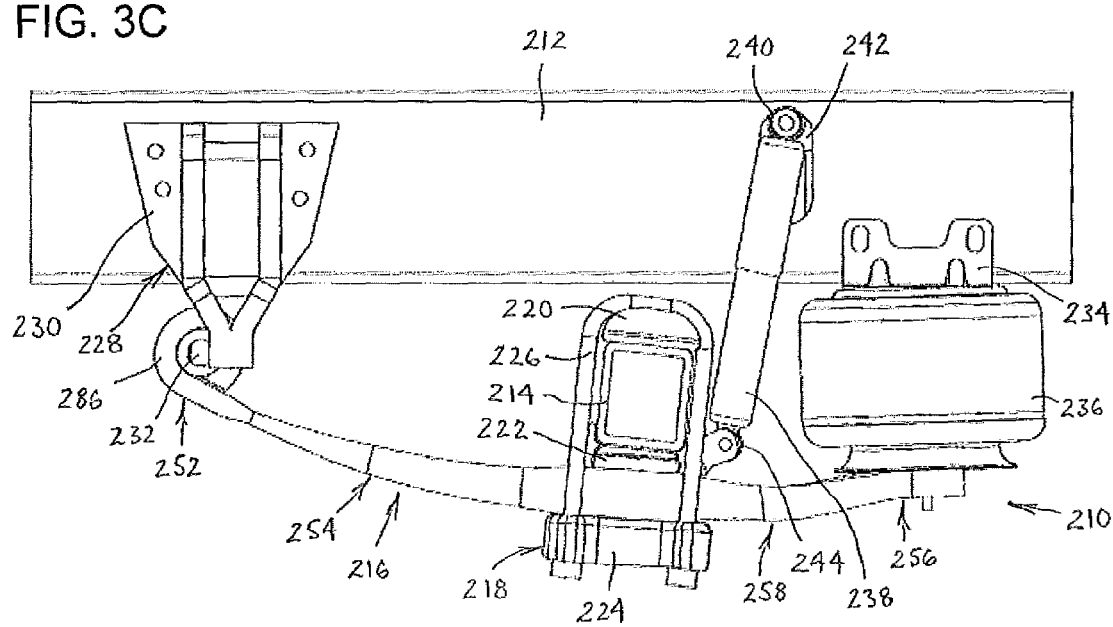
Figure 3D:
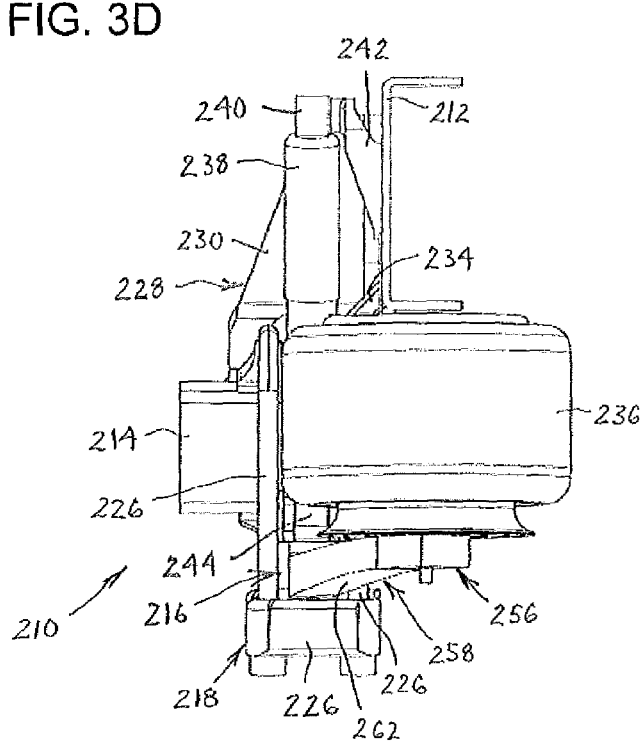
Figure 3E:
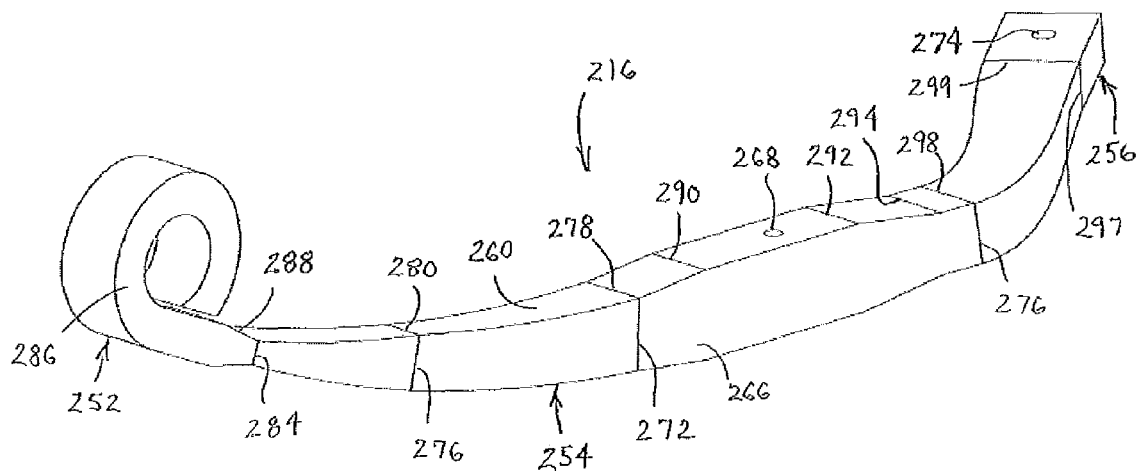
FIGS. 3E-3G are front perspective, top and side views, respectively, of the third example energy storing suspension component that is shown in FIGS. 3A-3D.
Figure 3F:
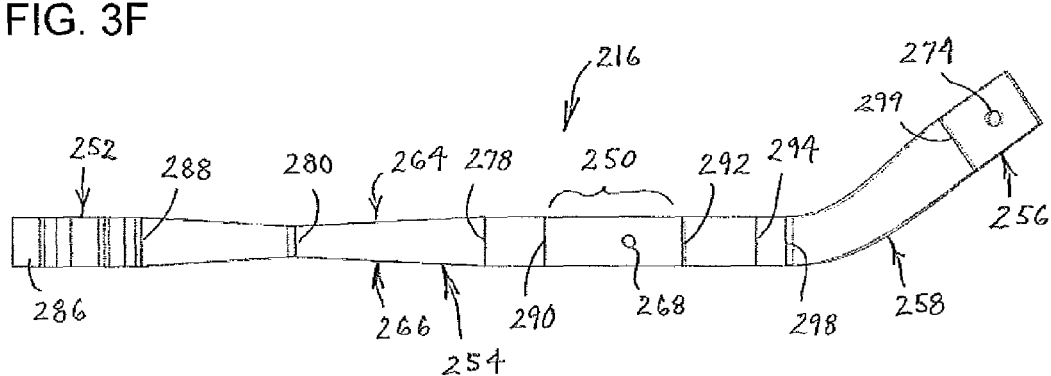
Figure 3G:
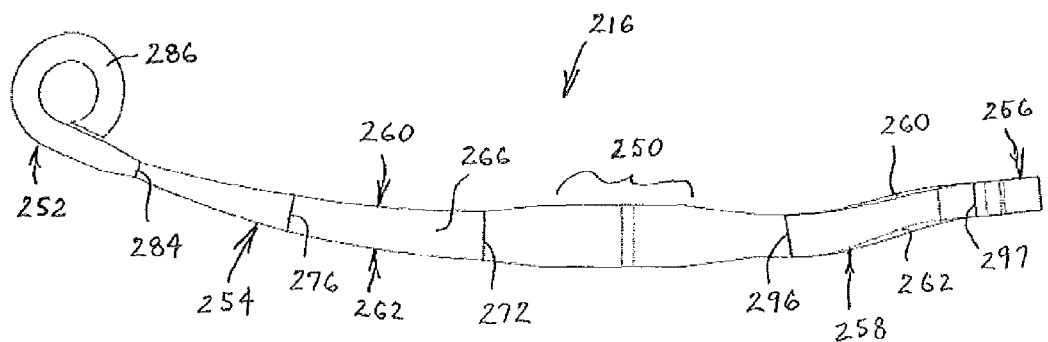

As may be seen in the isolated views in FIGS. 3E-3G, the energy storing suspension component 216 includes an axle seat portion 250, a first end 252 that in this example is forward of the axle seat portion 250, and a first limb 254 that extends between the axle seat portion 250 and the first end 252 and has a bit of camber. Also included in this example is a second end 256 that in this example is rearward of the axle seat portion 250, and a second limb 258 that extends between the axle seat portion 250 and the second end 256. As with the first example, the axle seat portion 250 of the third example is not defined with exactness, but is a portion along the energy storing suspension component 216 where the axle is coupled thereto. The first end 252 and second end 256 are intended to be considered those regions that are near to and including the distal ends of the energy storing suspension component 216. In the third example, the axle seat portion 250 is shown with a vertical hole 268 therethrough, which can be used with the axle coupling assembly 218 for connection and/or locating purposes, but it will be appreciated that alternative configurations may be utilized, as desired, such as having more than one such vertical hole therethrough, or one or more lateral holes therethrough, or no holes at all.

The energy storing suspension component 216 generally has an upper surface 260 and a lower surface 262, and a thickness can be determined at any selected position along the length of the energy storing suspension component 216 by measuring the distance between the upper surface 260 and lower surface 262 at the selected position. Similarly, the energy storing suspension component 216 has a right side surface 264 and a left side surface 266, as viewed from above and looking in a forward direction of the component. Accordingly, a width can be determined at any selected position along the length of the energy storing suspension component 216 by measuring the distance between the right side surface 264 and the left side surface 266 at the selected position.

FIGS. 3A-3G include lines on the upper, lower, right side and left side surfaces, 260, 262, 264, 266, respectively, that are intended to indicate where a dimensional change occurs, which assists in locating where tapers in thickness and width are occurring in the third example energy storing suspension component 216 which may be appreciated by comparing FIGS. 3E-3G. The axle seat portion 250 of the third example is generally located between the positions indicated at the lateral lines 290 and 292, has a greater thickness than width, and is of constant thickness and width, with no tapers.

The third example energy storing suspension component 216 incorporates tapers that are not like typical tapers found in prior art devices. FIGS. 3E-3G illustrate that the energy storing suspension component 216 has a first limb 254 that is configured to include a first taper in this example that is forward of the axle seat portion 250 and which begins at the position of the vertical line 272, wherein the first limb 254 decreases in width from the position at the vertical line 272 to the position at the vertical line 276 as the first limb 254 extends toward the first end 252. A minimum width of the first limb 254 occurs along its length at a position associated with the vertical line 276. The first limb 254 includes a second taper wherein the first limb 254 decreases in thickness from the position at the lateral line 278 to the position at the lateral line 280 as the first limb 254 extends toward the first end 252, as may be appreciated when comparing FIGS. 3E and 3F to FIG. 3G. Such a comparison also shows that along the first limb there is at least a portion where both the first taper and second taper are present. The first limb 254 further includes a third taper that is further from the axle seat portion 250 than the first taper wherein the first limb 254 increases in width from the position at the vertical line 276 to the position at the vertical line 284 as the first limb 254 extends toward the first end 252.

The increased width at the first end 252 is beneficial to its structure. As with the earlier examples, the first end 252 of the third example is configured to include an upturned eye 286. This may be seen when comparing FIGS. 3E and 3G to FIG. 3F. The energy storing suspension component 216 is operatively coupled to the frame member 212 at the upturned eye 286 via the first frame member coupling assembly 228. As may be seen in FIGS. 3A and 3C, the first frame member coupling assembly 228 includes the bushing 232 that passes through the eye 286 and is connected to the mounting bracket 230 that is further connected to the frame member 212. The tapers in the first limb 254 of the energy storing suspension component 216 provide an advantageous, more compliant lateral spring rate, as well as constant vertical and lateral stress in the first limb 254, while also reducing the forces transferred to the first frame member coupling assembly 228 and to the axle coupling assembly 218.

As may be seen in FIGS. 3E-3G, the energy storing suspension component 216 of the third example actually includes multiple tapers both in width and thickness along its length. The use of the aforementioned combination of tapers is contrary to the normal practices within the prior art, and permits advantageous reductions in mass and improved lateral compliance, while achieving generally constant vertical and lateral stress along the first limb 254. Additional tapers occur in the first limb 254, such as a further fourth taper that is further from the axle seat portion 250 than the second taper wherein the first limb 254 decreases in thickness from the position at the lateral line 280 to the position at the lateral line 288, as may be appreciated when comparing FIGS. 3E and 3F to FIG. 3G. It becomes apparent when viewing the related FIGS. 3E-3G, that the first limb 254 has a minimum thickness occurring along its length at a position associated with the lateral line 288. Yet a further taper in the first limb 254 is further from the axle seat portion 250 than the second and fourth tapers wherein the first limb 254 increases in thickness from the position at the lateral line 288 as it extends toward the first end 252. This additional thickness is beneficial when moving into the first end 252 and in the forming of the upturned eye 286.

Another of the tapers may be seen in this example just forward of the axle seat portion 250, where the first limb 254 includes a further taper wherein the first limb 254 decreases in thickness from the position at the lateral line 290 to the position at the lateral line 278, as may be appreciated when comparing FIGS. 3E and 3F to FIG. 3G. This additional taper in thickness is beneficial for mass reduction, and provides a faster rate of reduction in thickness. This permits a relatively fast transition from a sufficiently thick axle seat portion 250 to an appropriate thickness that can then taper more gradually within a larger portion of the first limb 254 for managing spring rates and stresses. As can be appreciated when comparing FIGS. 3E-3G, a similar taper is present in the second limb 258 for like advantages, wherein the second limb 258 decreases in thickness from the position at the lateral line 292 to the position at the lateral line 294. This is followed by a further taper wherein the second limb 258 decreases in thickness from the position at the lateral line 294 to the position at the lateral line 298 as the second limb 258 extends toward the second end 256. A still further taper is present wherein the second limb 258 decreases in thickness from the position at the lateral line 298 to the position at the lateral line 299 as the second limb 258 further extends toward the second end 256. The second limb 258 begins with a constant width coming out of the axle seat portion 250 as it extends toward the second end 256 and a taper in width occurs in the second limb 258 wherein the second limb 258 increases in width from the position at the vertical line 294 to the position at the vertical line 297 as the second limb 258 further extends toward the second end 256.

With the hockey stick-shaped configuration of the energy storing suspension component 216 of the third example, the second end 256 is wider than the axle seat portion 250 and provides a broader support that is located directly below the air spring 236. In this example, the air spring 236 sits atop and is coupled to second end 256 via a vertical hole 274 through the second end 256, such as by a fastener in the form of a bolt, a nut on a threaded post, or the like.

Use of the above described multiple tapers in width and thickness provides a highly advantageous energy storing suspension component 216, in the form of a support member that is usable in a suspension for a chassis of a wheeled vehicle or trailer. While linear tapers are shown in this third example, this disclosure is not intended to be limited to linear tapers and other forms of tapers could be utilized. The materials and methods of manufacture for components of this third example suspension system are similar to those noted for the prior examples. It also will be appreciated that while the transitions for tapers in width and thickness may occur at the same position along an energy storing suspension component, in this third example energy storing suspension component 216, as may be seen in FIGS. 3E-3G, the minimum width in the first limb 254 occurs at the position of the vertical line 276, while the minimum thickness in the first limb 254 occurs at the position of the lateral line 288. There is a change in the taper with respect to both width and thickness at the same position within the first limb 254, as indicated by the vertical line 276 and the lateral line 280. A coincident change in taper affecting width and thickness also occurs within the second limb 258, as indicated by the vertical line 296 and the lateral line 298. A further coincident change in taper affecting width and thickness also occurs within the second limb 258, as indicated by the vertical line 297 and the lateral line 299. As stated, such transitions need not be coincident, but as previously noted, it is beneficial when making a taper to change in one of width or thickness, that there also be a taper to change in the other aspect.

Turning to FIGS. 4A-4D, a fourth example suspension system 310 is illustrated for coupling a longitudinally extending frame member 312 on one side of a chassis of a wheeled vehicle or trailer to a laterally extending axle 314 that is disposed below the frame member 312. The fourth example suspension system 310 includes an energy storing suspension component 316, which is shown in a configuration of a support member.

The axle 314 is operatively coupled to the energy storing suspension component 316 by an axle coupling assembly 318 that is configured to connect the axle 314 to the energy storing suspension component 316 using an underslung configuration, with the energy storing suspension component 316 extending under the axle 314. The axle coupling assembly 318 includes a first mounting pad 320, which rests on top of the axle 314, a caster wedge 322 is disposed between the axle 314 and the energy storing suspension component 316, a second mounting pad 324 is located below the energy storing suspension component 316, and a pair of U-shaped bolts 326 are used to clamp together the aforementioned components.

The energy storing suspension component 316 is operatively coupled to the frame member 312 by a first frame member coupling assembly 328, which is in the form of a mounting bracket 330, and which in this example includes a bushing 332 connected thereto. As with the prior examples, the mounting bracket may be of various configurations, and may accommodate mounting of numerous types of bushings, including bushings of the particularly advantageous types shown in FIGS. 11A-11F, 12A-12B, 13 and 14. This example also has the energy storing suspension component 316 operatively coupled to the frame member 312 by a second frame member coupling assembly 334, which in this example is in the form of an upper air spring mounting bracket, because this suspension system 310 includes an air spring 336 disposed between a lower air spring support 346, which is coupled to the energy storing suspension component 316 at upper and lower extensions 347, and the frame member 312.

To provide damping, the suspension system 310 includes a shock absorber 338 that is operatively coupled at an upper end 340 to a frame member shock coupling 342, which is shown in the form of a mounting bracket, and at a lower end 344 to a bracket extension of the caster wedge 322, in a conventional manner, such as by a suitable fastener. It will be appreciated that, as was discussed with the first example, some components, for example, fasteners for fastening together various components are not shown for better viewing of the more major components, but various fastening components and methods of fastening may be utilized without departing from the scope of the present disclosure.

Figure 4A:
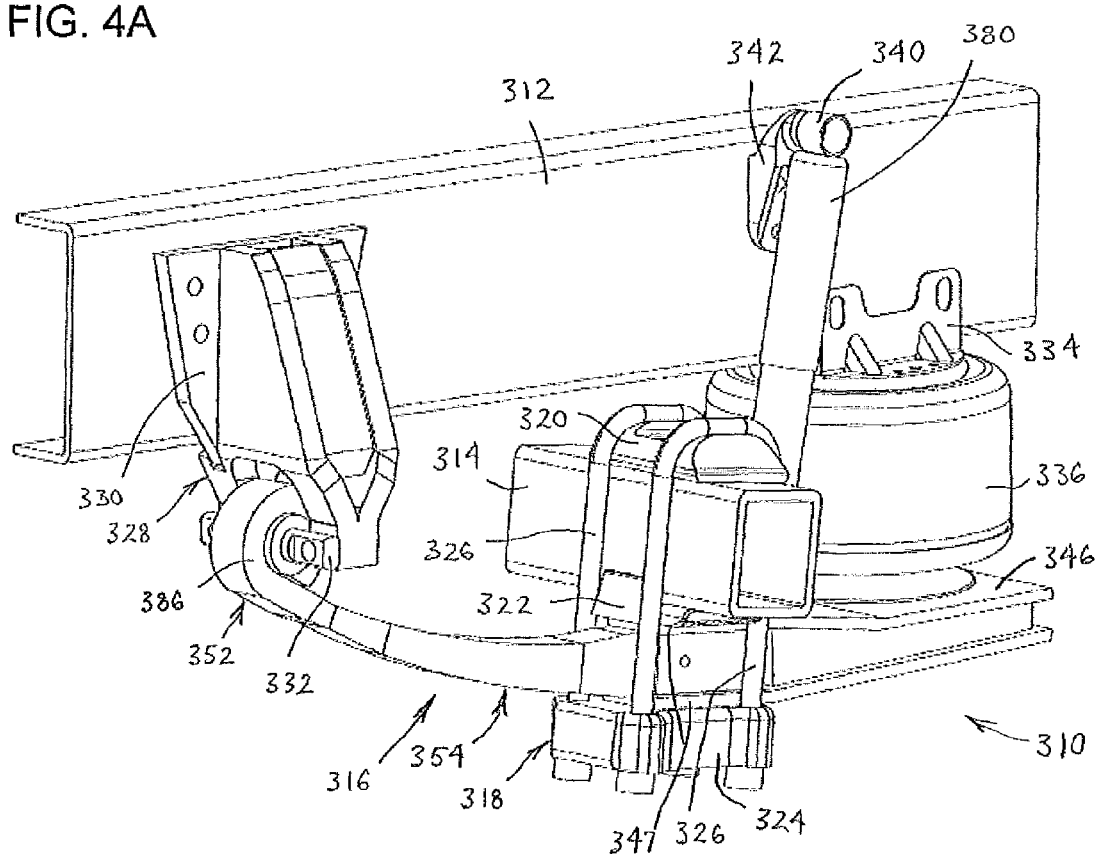
FIGS. 4A-4D are front perspective, top, side and end views, respectively, of a fourth example of a portion of a suspension system utilizing an energy storing suspension component and bushing that is located along a frame member of a wheeled vehicle or trailer.
Figure 4B:
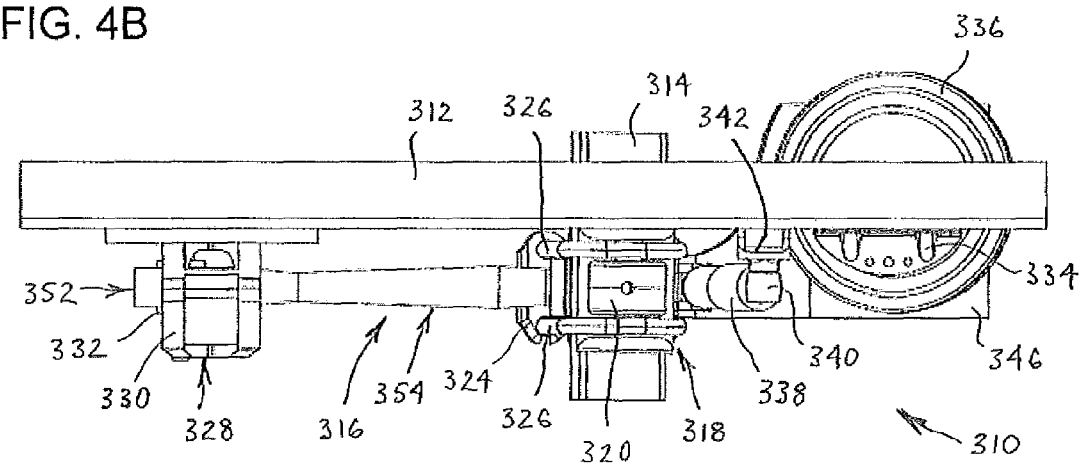
Figure 4C:
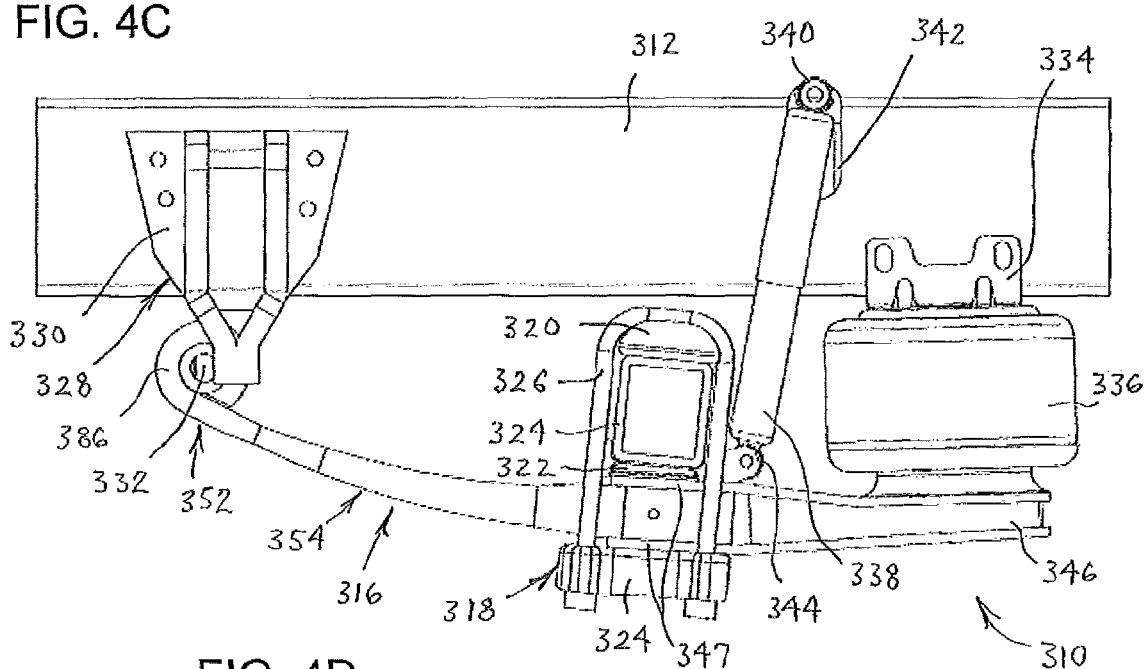
Figure 4D:
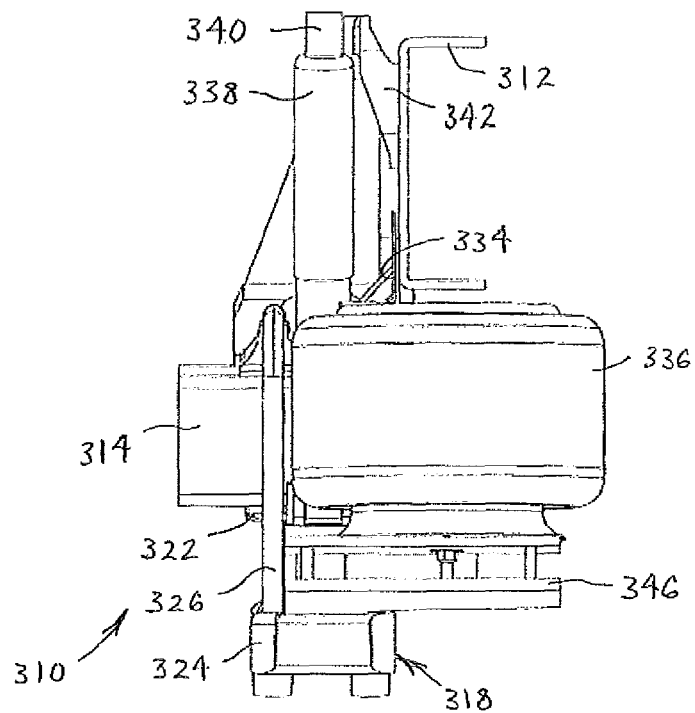
Figure 4E:
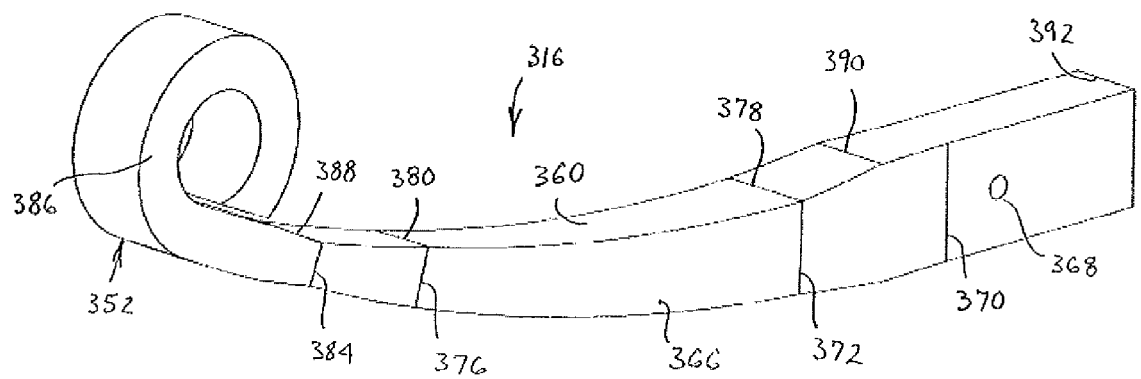
FIGS. 4E-4G are front perspective, top and side views, respectively, of a fourth example energy storing suspension component that is shown in FIGS. 4A-4D.
Figure 4F:
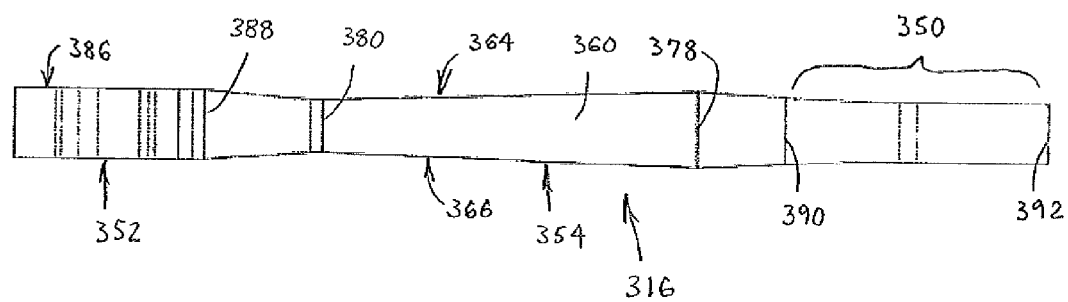
Figure 4G:
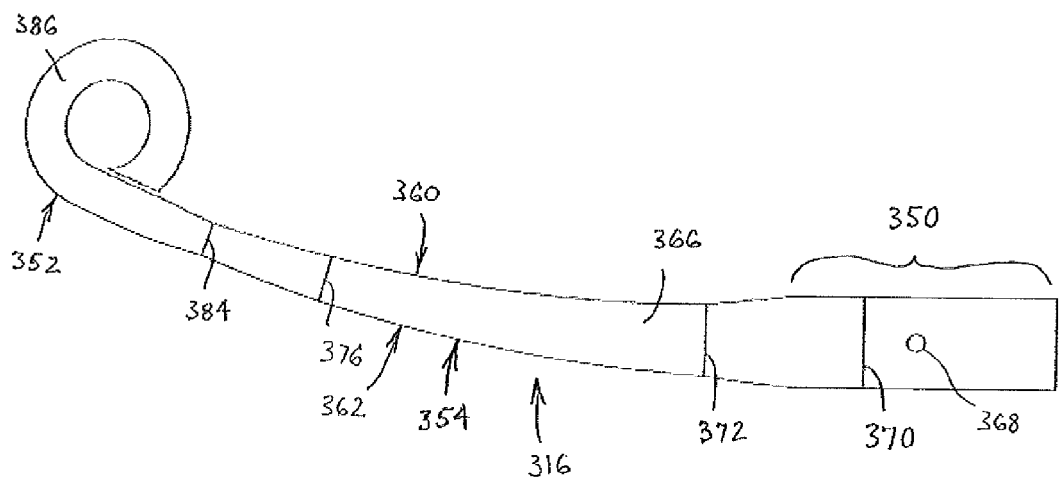

As may be seen in the isolated views in FIGS. 4E-4G, the energy storing suspension component 316 includes an axle seat portion 350, a first end 352 that is forward of the axle seat portion 350, and a first limb 354 that extends between the axle seat portion 350 and the first end 352 and has a bit of camber. In this fourth example, the lower air spring support 346 includes upper and lower extensions 347 that receive a rear portion of the axle seat portion 350 therebetween, and which are connected thereto such as by welding or other suitable fastening methods. The rear portion of the axle seat portion 350 has a constant width and thickness that is received between the upper and lower extensions of the lower air spring support 346. The axle seat portion 350 of the fourth example is not defined with exactness, but is a portion along the energy storing suspension component 316 where the axle is coupled thereto. The first end 352 is intended to be considered a region that is near to and including the distal end of the energy storing suspension component 316. In the fourth example, the axle seat portion 350 is shown with a lateral hole 368 therethrough, which can be used with the axle coupling assembly 318 for connection and/or locating purposes, and it will be appreciated that alternative configurations may be utilized, as desired, such as having more than one such vertical hole therethrough, or one or more lateral holes therethrough, or no holes at all.

The energy storing suspension component 316 generally has an upper surface 360 and a lower surface 362, and a thickness can be determined at any selected position along the length of the energy storing suspension component 316 by measuring the distance between the upper surface 360 and lower surface 362 at the selected position. Similarly, the energy storing suspension component 316 has a right side surface 364 and a left side surface 366, as viewed from above and looking in a forward direction of the component. Accordingly, a width can be determined at any selected position along the length of the energy storing suspension component 316 by measuring the distance between the right side surface 364 and the left side surface 366 at the selected position.

FIGS. 4A-4G include lines on the upper, lower, right side and left side surfaces, 360, 362, 364, 366, respectively, that are intended to indicate where a dimensional change occurs, which assists in locating where tapers in thickness and width are occurring in the fourth example energy storing suspension component 316 which may be appreciated by comparing FIGS. 4E-4G. The axle seat portion 350 of the fourth example is generally located between the positions indicated at the lateral lines 390 and 392. The significance of the vertical line 370 that is shown in FIGS. 4E and 4G on the left side surface 366 of the axle seat portion 350, is apparent in FIG. 4F, which illustrates that the axle seat portion 350 has a taper that decreases in width from forward of the axle seat portion 350, actually starting in the first limb 354 at vertical line 372 and continuing into to the axle seat portion 350 until the position at the vertical line 370, where the axle seat portion 350 then transitions to a constant width and extends rearward to the rear of the axle seat portion 350.

As may be seen in FIGS. 4E-4G, the axle seat portion 350 of the fourth example has a greater thickness than width, and includes at least a taper that decreases in width in the forward portion of the axle seat portion 350, as the energy storing suspension component tapers to decrease in width between the positions indicated from the vertical line 372 to the vertical line 370. Thus, there is a taper in the axle seat portion 350 that would be generally located in the forward portion of the axle seat portion 350, between the positions indicated at the lateral line 390 and the vertical line 370, and then there is a portion having constant width between the positions indicated at the vertical line 370 and the lateral line 392.

The fourth example energy storing suspension component 316 incorporates tapers that are not like typical tapers found in prior art devices. FIGS. 4E-4G illustrate that the energy storing suspension component 316 has a first limb 354 that is configured to include a first taper forward of the axle seat portion 350 and which begins at the position of the vertical line 372, wherein the first limb 354 decreases in width from the position at the vertical line 372 to the position at the vertical line 376 as the first limb 354 extends toward the first end 352. A minimum width of the first limb 354 occurs along its length at a position associated with the vertical line 376. The first limb 354 includes a second taper wherein the first limb 354 decreases in thickness from the position at the lateral line 378 to the position at the lateral line 380 as the first limb 354 extends toward the first end 352, as may be appreciated when comparing FIGS. 4E-4G. Such a comparison also shows that along the first limb 354 there is at least a portion where both the first taper and second taper are present. The first limb 354 further includes a third taper that is forward of the first taper wherein the first limb 354 increases in width from the position at the vertical line 376 to the position at the vertical line 384 as the first limb 354 extends toward the first end 352.

The increased width at the first end 352 is beneficial to the structure of the first end 352. As with the earlier examples, the first end 352 of the fourth example is configured to include an upturned eye 386. This may be seen when comparing FIGS. 4E-4G. The energy storing suspension component 316 is operatively coupled to the frame member 312 at the upturned eye 386 via the first frame member coupling assembly 328. As may be seen in FIGS. 4A and 4C, the first frame member coupling assembly 328 includes the bushing 332 that passes through the eye 386 and is connected to the mounting bracket 330 that is further connected to the frame member 312. The tapers in the first limb 354 of the energy storing suspension component 316 provide an advantageous, more compliant lateral spring rate, as well as constant vertical and lateral stress in the first limb 354, while also reducing the forces transferred to the first frame member coupling assembly 328 and to the axle coupling assembly 318.

As may be seen in FIGS. 4E-4G, the energy storing suspension component 316 of the fourth example actually includes multiple tapers both in width and thickness along its length. As with the earlier examples, the use of the aforementioned combination of tapers is contrary to the normal practices within the prior art, and permits advantageous reductions in mass and improved lateral compliance, while achieving generally constant vertical and lateral stress along the first limb 354. Additional tapers occur in the first limb 354, such as a further fourth taper that is forward of the second taper wherein the first limb 354 decreases in thickness from the position at the lateral line 380 to the position at the lateral line 388, as may be appreciated when comparing FIGS. 4E-4G. A minimum thickness occurs within the first limb 354 along its length at a position associated with the lateral line 388. Yet a further taper in the first limb 354 is forward of the second and fourth tapers wherein the first limb 354 increases in thickness from the position at the lateral line 388 as it extends toward the first end 352. This additional thickness is beneficial when moving into the first end 352 and in the forming of the upturned eye 386.

Another of the tapers may be seen just forward of the axle seat portion 350, where the first limb 354 includes a further taper wherein the first limb 354 decreases in thickness from the position at the lateral line 390 to the position at the lateral line 378, as may be appreciated when comparing FIGS. 4E-4G. This additional taper in thickness is beneficial for mass reduction, and provides a faster rate of reduction in thickness. This permits a relatively fast transition from a sufficiently thick axle seat portion 350 to an appropriate thickness that can then taper more gradually within a larger portion of the first limb 354 for managing spring rates and stresses.

With the longitudinal configuration of the energy storing suspension component 316 of the fourth example, the lower air spring support 346 coupled to the rear of the axle seat portion 350 provides a broader support that is located below the air spring 336. The air spring 336 sits atop and is coupled to rear air spring support 346 at a vertical hole through the lower air spring support 346, such as by a fastener in the form of a bolt, a nut on a threaded post or the like.

Use of the above described multiple tapers in width and thickness provides a highly advantageous energy storing suspension component 316, in the form of a support member that is usable in a suspension for a chassis of a wheeled vehicle or trailer. While linear tapers are shown in this fourth example, this disclosure is not intended to be limited to linear tapers and other forms of tapers could be utilized. The materials and methods of manufacture for components of this fourth example suspension system are similar to those noted for the prior examples. It also will be appreciated that while the transitions for tapers in width and thickness may occur at the same position along an energy storing suspension component, in this fourth example energy storing suspension component 316, as seen in FIGS. 4E-4G, the minimum width in the first limb 354 occurs at the position of the vertical line 376, while the minimum thickness in the first limb 354 occurs at the position of the lateral line 388. There is a change in the taper with respect to both width and thickness at the same position within the first limb 354, as indicated by the vertical line 376 and the lateral line 380. As stated, such transitions need not be coincident, but as previously noted, it is beneficial when making a taper to change in one of width or thickness, that there also be a taper to change in the other aspect.

Turning to FIGS. 5A-5D, a fifth example suspension system 410 is illustrated for coupling a longitudinally extending frame member 412 on one side of a chassis of a wheeled vehicle or trailer to a laterally extending axle 414 that is disposed below the frame member 412. The fifth example suspension system 410 includes an energy storing suspension component 416, which is shown in a configuration commonly referred to as a support member having a second limb that is in longitudinal alignment with a first limb.

The axle 414 is operatively coupled to the energy storing suspension component 416 by an axle coupling assembly 418 that is configured to connect the axle 414 to the energy storing suspension component 416 using an underslung configuration, with the energy storing suspension component 416 extending under the axle 414. The axle coupling assembly 418 includes a first mounting pad 420, which rests on top of the axle 414, a caster wedge 422 is disposed between the axle 414 and the energy storing suspension component 416, a second mounting pad 424 is located below the energy storing suspension component 416, and a pair of U-shaped bolts 426 are used to clamp together the aforementioned components.

The energy storing suspension component 416 is operatively coupled to the frame member 412 by a first frame member coupling assembly 428, which is in the form of a mounting bracket 430, and which in this example includes a bushing 432 connected thereto. As discussed with some of the preceding examples herein, the mounting bracket and bushing may be of various configurations, including bushings of the particularly advantageous types shown in FIGS. 11A-11F, 12A-12B, 13 and 14. The present example also has the energy storing suspension component 416 operatively coupled to the frame member 412 by a second frame member coupling assembly 434, which in this example is in the form of an upper air spring mounting bracket, because this suspension system 410 includes an air spring 436 disposed between the energy storing suspension component 416 and the frame member 412.

To provide damping, the suspension system 410 includes a shock absorber 438 that is operatively coupled at an upper end 440 to a frame member shock coupling 442, which is shown in the form of a mounting bracket, and at a lower end 444 to a bracket extension of the caster wedge 422, in a conventional manner, such as by a suitable fastener. It will be appreciated that, as was discussed with the first example, some components, such as fasteners, are not shown for better viewing of the more major components, but various fastening components and methods of fastening may be utilized without departing from the scope of the present disclosure.

Figure 5A:
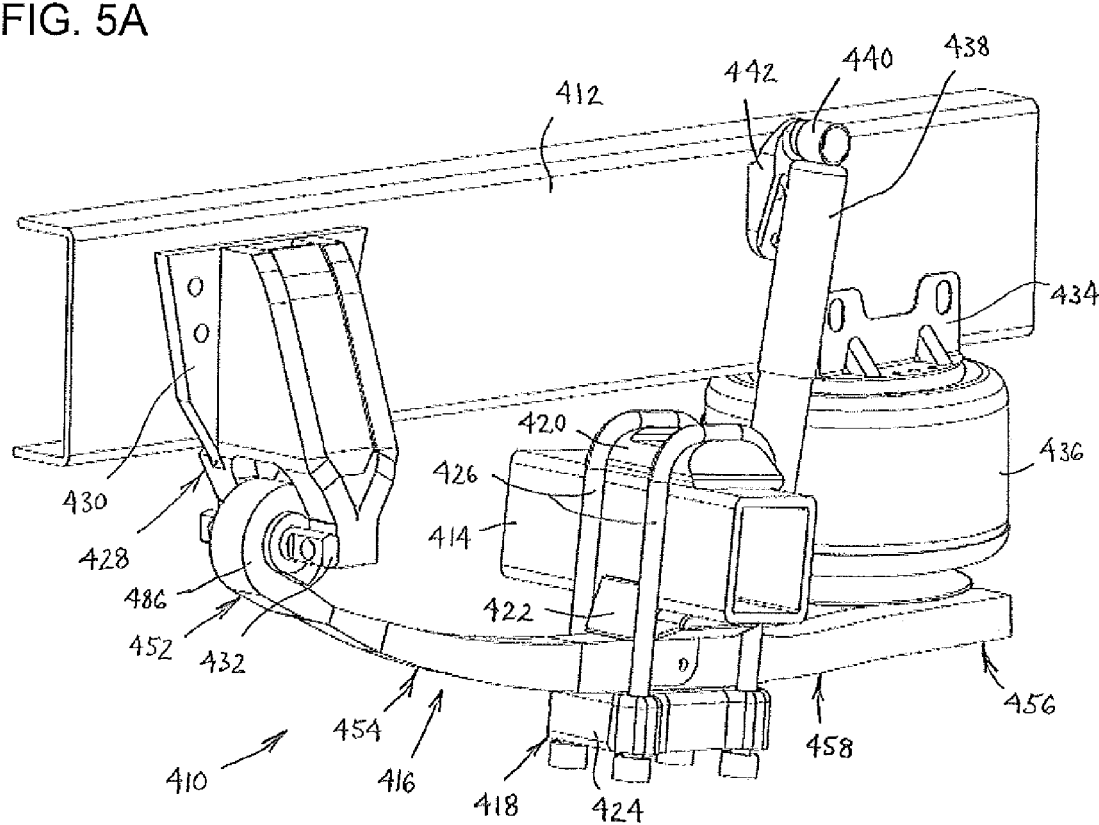
FIGS. 5A-5D are front perspective, top, side and end views, respectively, of a fifth example of a portion of a suspension system utilizing an energy storing suspension component and bushing that is located along a frame member of a wheeled vehicle or trailer.
Figure 5B:
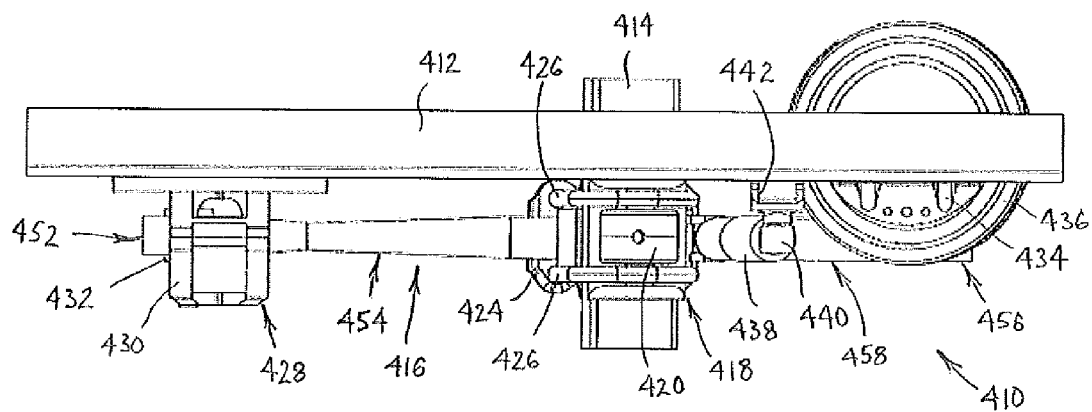
Figure 5C:
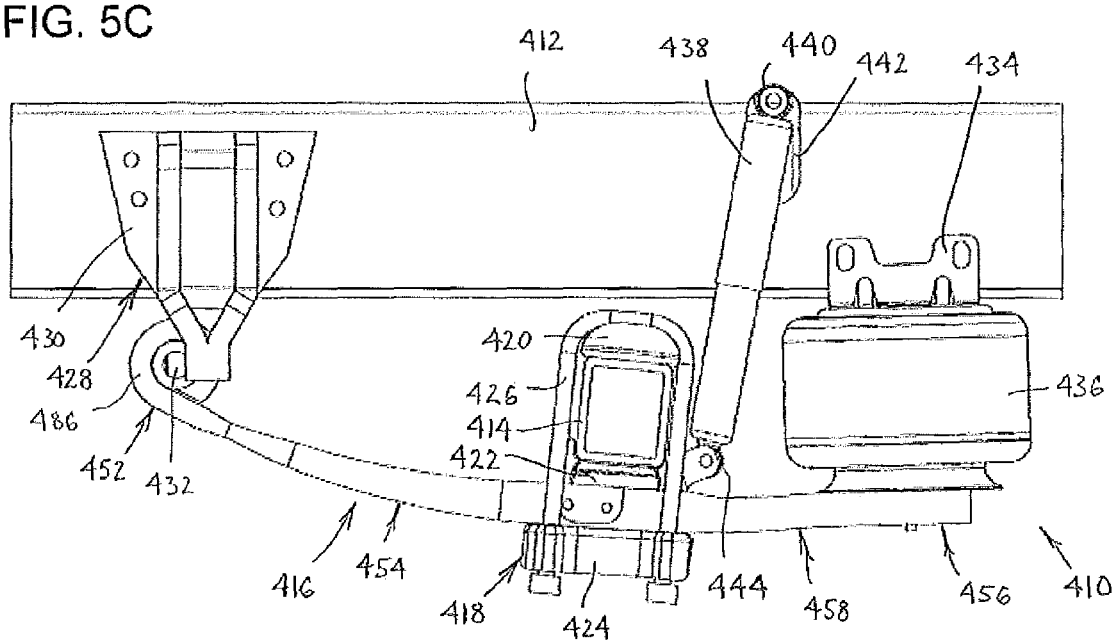
Figure 5D:
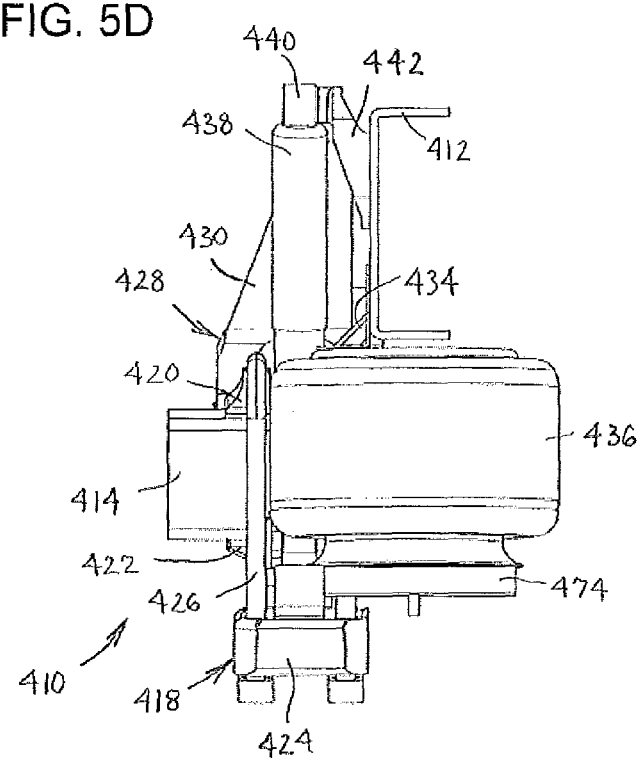
Figure 5E:
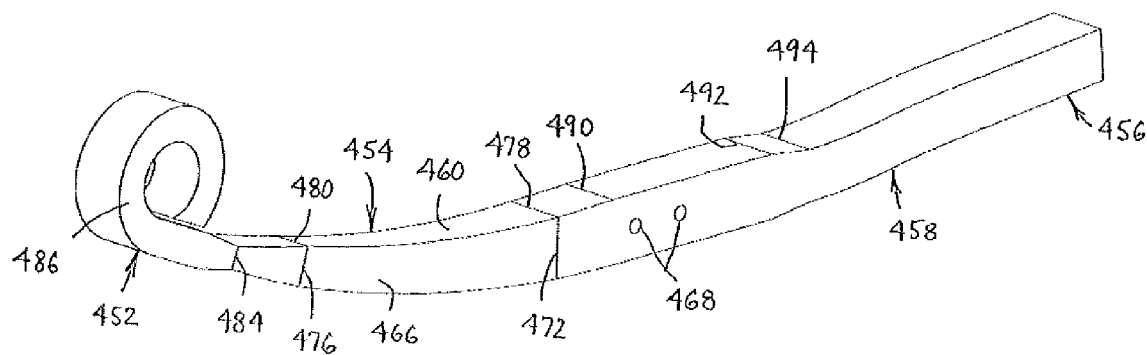
FIGS. 5E-5G are front perspective, top and side views, respectively, of a fifth example energy storing suspension component that is shown in FIGS. 5A-5D.
Figure 5F:
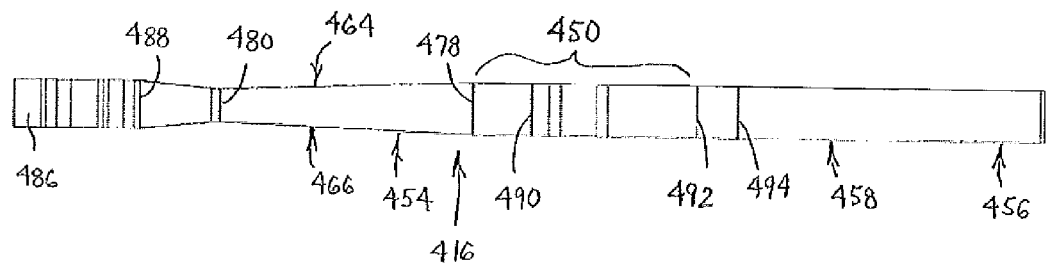
Figure 5G:
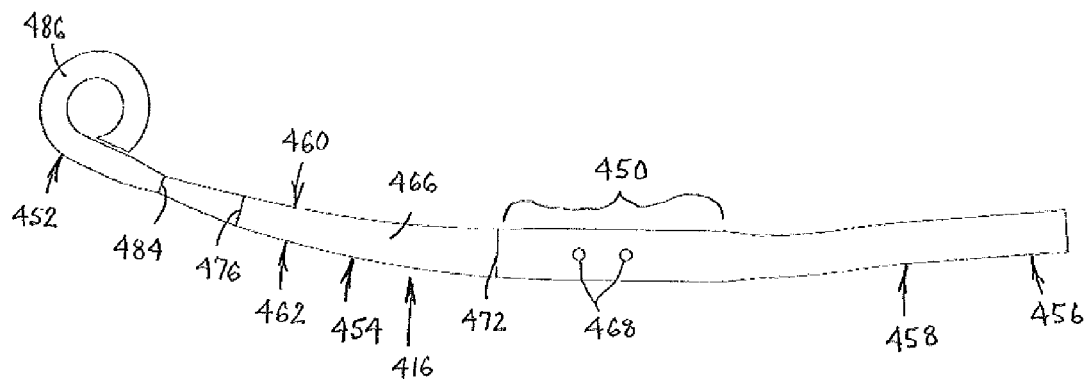

As may be seen in the isolated views in FIGS. 5E-5G, the energy storing suspension component 416 includes an axle seat portion 450, a first end 452 that is forward of the axle seat portion 450, and a first limb 454 that extends between the axle seat portion 450 and the first end 452 and has a bit of camber. Also included in this example is a second end 456 that is rearward of the axle seat portion 450, and a second limb 458 that extends between the axle seat portion 450 and the second end 456 and is relatively flat. As with the first example, the axle seat portion 450 of the fifth example is not defined with exactness, but is a portion along the energy storing suspension component 416 where the axle is coupled thereto. The first end 452 and second end 456 are intended to be considered those regions that are near to and including the distal ends of the energy storing suspension component 416. In the fifth example, the axle seat portion 450 is shown with a pair of lateral holes 468 therethrough, which can be used with the axle coupling assembly 418 for connection and/or locating purposes, but it will be appreciated that alternative configurations may be utilized, as desired, such as having one or more such lateral holes therethrough, or one or more vertical holes therethrough, or no holes at all.

The energy storing suspension component 416 generally has an upper surface 460 and a lower surface 462, and a thickness can be determined at any selected position along the length of the energy storing suspension component 416 by measuring the distance between the upper surface 460 and lower surface 462 at the selected position. Similarly, the energy storing suspension component 416 has a right side surface 464 and a left side surface 466, as viewed from above and looking in a forward direction of the component. Accordingly, a width can be determined at any selected position along the length of the energy storing suspension component 416 by measuring the distance between the right side surface 464 and the left side surface 466 at the selected position.

FIGS. 5A-5G include lines on the upper, lower, right side and left side surfaces, 460, 462, 464, 466, respectively, that are intended to indicate where a dimensional change occurs, which assists in locating where tapers in thickness and width are occurring in the fifth example energy storing suspension component 416 which may be appreciated by comparing FIGS. 5E-5G. The axle seat portion 450 of the fifth example is generally located between the positions indicated at the lateral lines 478 and 492. The axle seat portion 450 has a maximum thickness that is equal to the maximum width, and a taper wherein the first limb 454 decreases in thickness from the position of the lateral line 490 to the position of the lateral line 478 as the first limb 454 extends toward the first end 452.

The fifth example energy storing suspension component 416 incorporates tapers that are not like typical tapers found in prior art devices. FIGS. 5E-5G illustrate that the energy storing suspension component 416 has a first limb 454 that is configured to include a first taper which begins at the position of the vertical line 472, wherein the first limb 454 decreases in width from the position at the vertical line 472 to the position at the vertical line 476 as the first limb 454 extends toward the first end 452. A minimum width of the first limb 454 occurs along its length at a position associated with the vertical line 476. The first limb 454 includes a second taper wherein the first limb 454 decreases in thickness from the position at the lateral line 478 to the position at the lateral line 480 as the first limb 454 extends toward the first end 452, as may be appreciated when comparing FIGS. 5E-5G. Such a comparison also shows that along the first limb 454 there is at least a portion where both the first taper and second taper are present. The first limb 454 further includes a third taper that is forward of the first taper wherein the first limb 454 increases in width from the position at the vertical line 476 to the position at the vertical line 484 as the first limb 454 extends toward the first end 452.

The increased width at the first end 452 is beneficial to the structure of the first end 452. As with the earlier examples, the first end 452 of the third example is configured to include an upturned eye 486. This may be seen when comparing FIGS. 5E-5G. The energy storing suspension component 416 is operatively coupled to the frame member 412 at the upturned eye 486 via the first frame member coupling assembly 428. As may be seen in FIGS. 5A and 5C, the first frame member coupling assembly 428 includes the bushing 432 that passes through the eye 486 and is connected to the mounting bracket 430 that is further connected to the frame member 412. The tapers in the first limb 454 of the energy storing suspension component 416 provide an advantageous, more compliant lateral spring rate, as well as constant vertical and lateral stress in the first limb 454, while also reducing the forces transferred to the first frame member coupling assembly 428 and to the axle coupling assembly 418.

As may be seen in FIGS. 5E-5G, the energy storing suspension component 416 of the fifth example actually includes multiple tapers both in width and thickness along its length. The use of the aforementioned combination of tapers is contrary to the normal practices within the prior art, and permits advantageous reductions in mass and improved lateral compliance, while achieving generally constant vertical and lateral stress along the first limb 454. Additional tapers occur in the first limb 454, such as a further fourth taper that is forward of the second taper wherein the first limb 454 decreases in thickness from the position at the lateral line 480 to the position at the lateral line 488, as may be appreciated when comparing FIGS. 5E-5G. It becomes apparent when viewing the related FIGS. 5E-5G, that the first limb 454 has a minimum thickness occurring along its length at a position associated with the lateral line 488. Yet a further taper in the first limb 454 is forward of the second and fourth tapers wherein the first limb 454 increases in thickness from the position at the lateral line 488 as it extends toward the first end 452. This additional thickness is beneficial when moving into the first end 452 and in the forming of the upturned eye 486.

The taper within the forward portion of the axle seat portion 450 is beneficial for mass reduction, and provides an initial rate of reduction in thickness. This permits a relatively fast transition from a sufficiently thick middle of the axle seat portion 450 to an appropriate thickness that can then taper more gradually within a larger portion of the first limb 454 for managing spring rates and stresses. As may be appreciated when comparing FIGS. 5E-5G, a similar taper is present in the axle seat portion 450 for like advantages, wherein it decreases in thickness from the position at the lateral line 492 to the position at the lateral line 494. This is followed by a constant thickness and width in the second limb 458 as it extends to the second end 456.

With the longitudinal configuration of the energy storing suspension component 416 of the fifth example, the second end 456 is not directly below the air spring 436. Instead, the air spring 436 sits atop and is connected to an air spring lower support 474, which is coupled to the second end 456, such as by welding or other suitable fastening means. The air spring lower support 474 may be connected to a similar support on the opposite side of the full suspension system, or may be connected to a cross member that is connected to the respective energy storing suspension components.

Use of the above described multiple tapers in width and thickness provides a highly advantageous energy storing suspension component 416, in the form of a support member that is usable in a suspension for a chassis of a wheeled vehicle or trailer. While linear tapers are shown in this fifth example, this disclosure is not intended to be limited to linear tapers and other forms of tapers could be utilized. The materials and methods of manufacture for components of this third example suspension system are similar to those noted for the prior examples.

It also will be appreciated that while the transitions for tapers in width and thickness may occur at the same position along an energy storing suspension component, in this fifth example energy storing suspension component 416, as seen in FIGS. 5E-5G, the minimum width in the first limb 454 occurs at the position of the vertical line 476, while the minimum thickness in the first limb 454 occurs at the position of the lateral line 488. There is a change in the taper with respect to both width and thickness at the same position within the first limb 454, as indicated by the vertical line 472 and the lateral line 478. A coincident change in taper affecting width and thickness also occurs within the first limb 454 at the same position, as indicated by the vertical line 476 and the lateral line 480. A still further coincident change in taper affecting width and thickness also occurs within the first limb 454 at the same position, as indicated by the vertical line 484 and the lateral line 488. As stated, such transitions need not be coincident, but as previously noted, it is beneficial when making a taper to change in one of width or thickness, that there also be a taper to change in the other aspect.

Turning to FIGS. 6A-6D, a sixth example suspension system 510 is illustrated for coupling a longitudinally extending frame member 512 on one side of a chassis of a wheeled vehicle or trailer to a laterally extending axle 514 that is disposed below the frame member 512. The sixth example suspension system 510 includes an energy storing suspension component 516, which in this sixth example is shown in a configuration of a spring member, such as a leaf spring.

The axle 514 is operatively coupled to the energy storing suspension component 516 by an axle coupling assembly 518 that is configured to connect the axle 514 to the energy storing suspension component 516. The sixth example uses an overslung configuration, with the axle coupling assembly 518 including a first mounting pad 520, which rests on top of the energy storing suspension component 516, a caster wedge 522 is disposed between the energy storing suspension component 516 and the axle 514, a second mounting pad 524 is located below the axle 514, and a pair of U-shaped bolts 526 are used to clamp together the aforementioned components.

The energy storing suspension component 516 is operatively coupled to the frame member 512 by a first frame member coupling assembly 528, which is in the form of a mounting bracket 530, and which in this example includes a bushing 532 connected thereto. The mounting bracket may be of various configurations, and may accommodate mounting of numerous types of bushings, including bushings of the particularly advantageous types shown in FIGS. 11A-11F, 12A-12B, 13 and 14. This example also has the energy storing suspension component 516 operatively coupled to the frame member 512 by a second frame member coupling assembly 534, which in this example is in the form of a rear mounting bracket 546 having a cam 548 for engagement with a second end of the energy storing suspension component 516 that includes a slipper end 556. It will be appreciated that, while not shown, such as suspension system 510 also could incorporate a damper, such as a shock absorber and/or an air spring, if desired. Also, as noted with earlier examples, some components, such as fasteners, are not shown so as to permit better viewing of the more major components, but various fastening components and methods of fastening may be utilized without departing from the scope of the present disclosure.

Figures 6A, 6B:
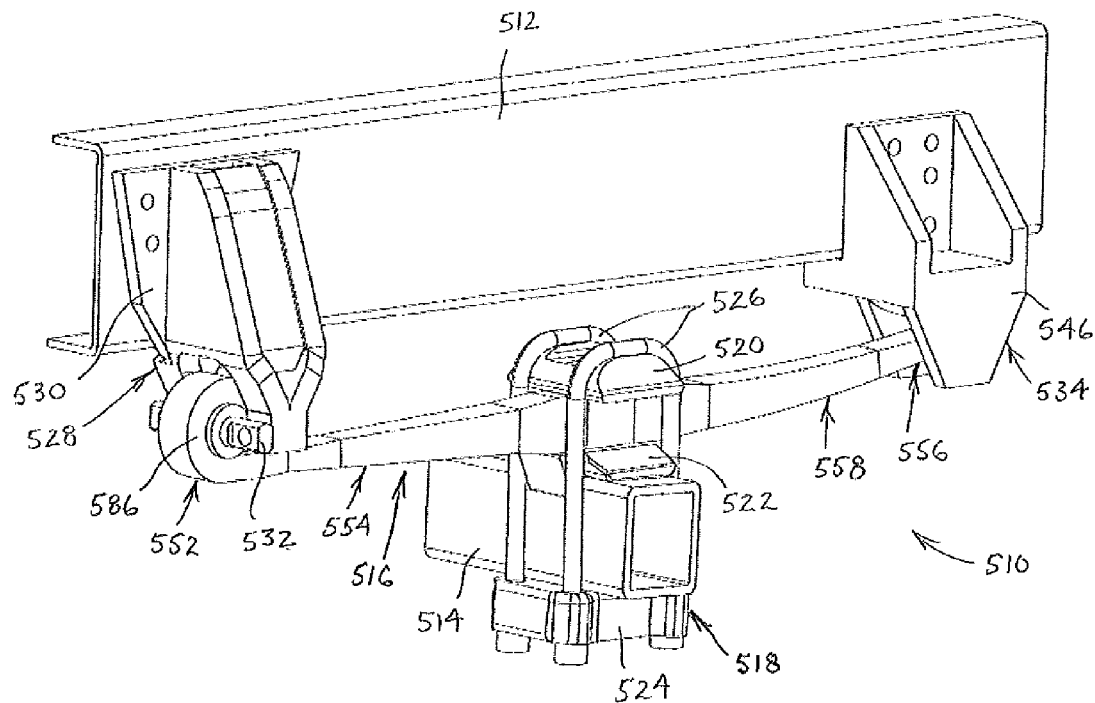
FIGS. 6A-6D are front perspective, top, side and end views, respectively, of a sixth example of a portion of a suspension system utilizing an energy storing suspension component and bushing that is located along a frame member of a wheeled vehicle or trailer.
Figure 6C:
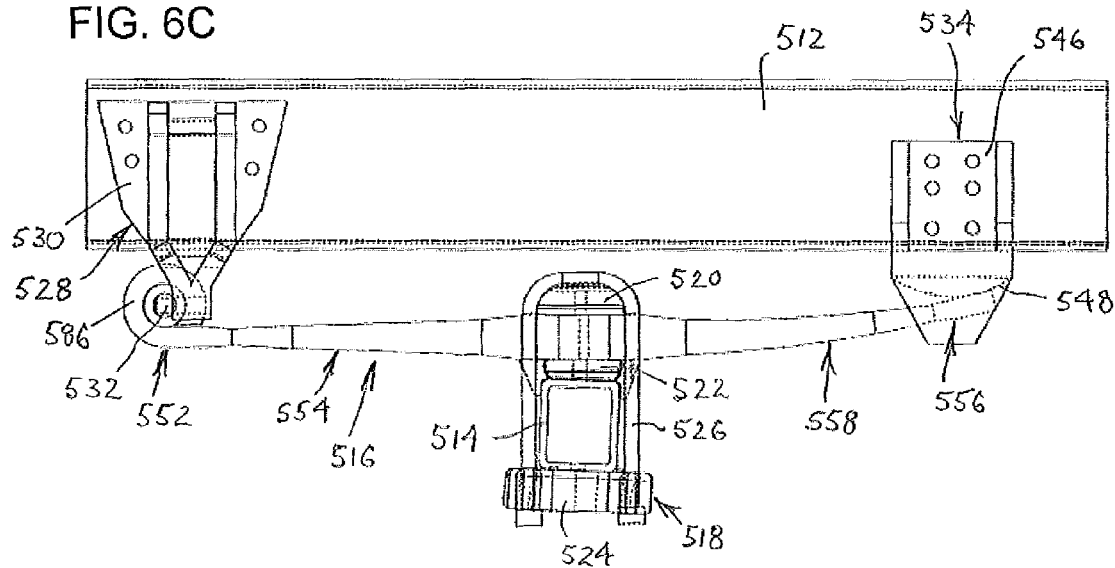
Figure 6D:
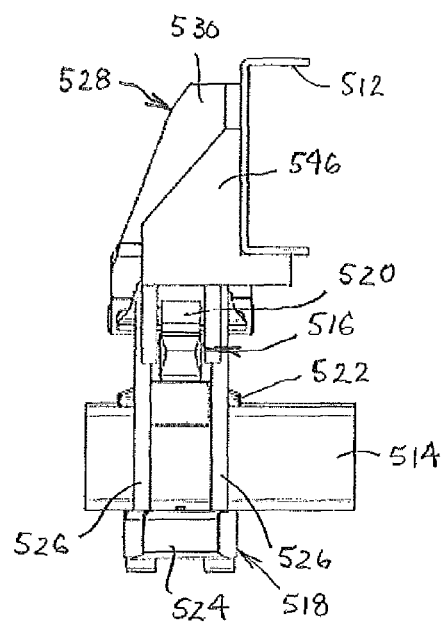
Figure 6E:
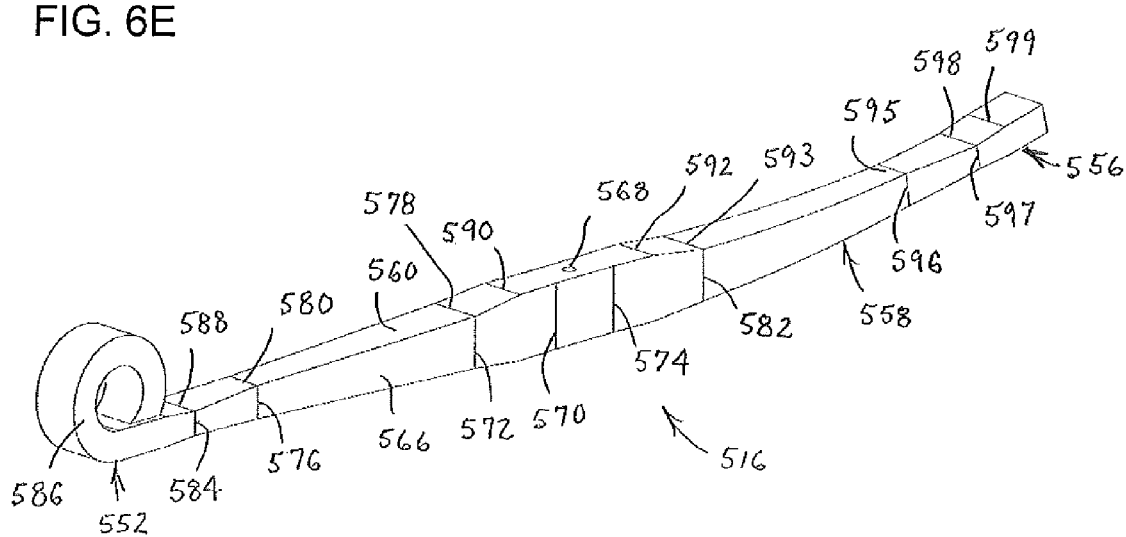
FIGS. 6E-6G are front perspective, top and side views, respectively, of a sixth example energy storing suspension component that is shown in FIGS. 6A-6D.
Figure 6F:
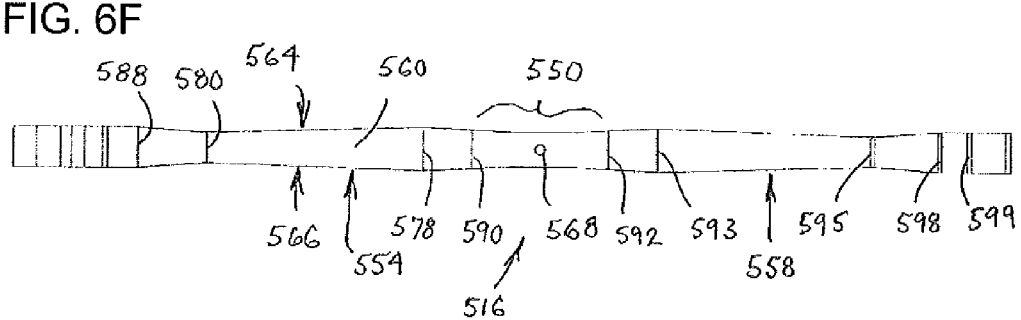
Figure 6G:
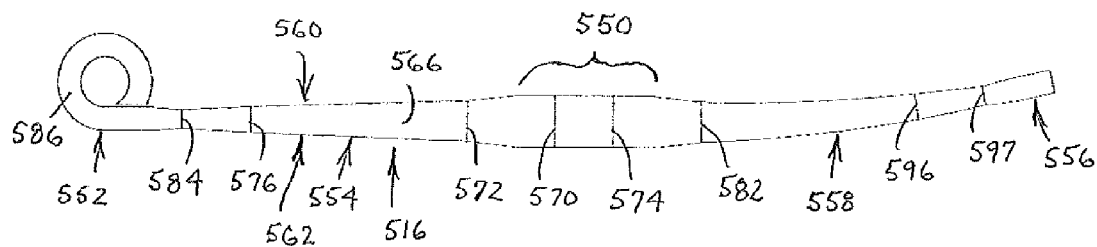

As may be seen in the isolated views in FIGS. 6E-6G, the energy storing suspension component 516 includes an axle seat portion 550, a first end 552 that is forward of the axle seat portion 550, and a first limb 554 that extends between the axle seat portion 550 and the first end 552 and is relatively flat. Also included in this example is a second end 556 that is rearward of the axle seat portion 550, and a second limb 558 that extends between the axle seat portion 550 and the second end 556 and has a slight amount of camber. As with the earlier examples, the axle seat portion 550 of the sixth example is not defined with exactness, but is a portion along the energy storing suspension component 516 where the axle is coupled thereto. The first end 552 and second end 556 are intended to be considered those regions that are near to and including the distal ends of the energy storing suspension component 516. In the sixth example, the axle seat portion 550 is shown with a vertical hole 568 therethrough, which can be used with the axle coupling assembly 518 for connection and/or locating purposes, but it will be appreciated that alternative configurations may be utilized, as desired, such as having more than one such vertical hole therethrough, or one or more horizontal holes therethrough, or no holes at all.

The energy storing suspension component 516 generally has an upper surface 560 and a lower surface 562, and a thickness can be determined at any selected position along the length of the energy storing suspension component 516 by measuring the distance between the upper surface 560 and lower surface 562 at the selected position. Similarly, the energy storing suspension component 516 has a right side surface 564 and a left side surface 566, as viewed from above and looking in a forward direction of the component. Accordingly, a width can be determined at any selected position along the length of the energy storing suspension component 516 by measuring the distance between the right side surface 564 and the left side surface 566 at the selected position.

FIGS. 6A-6G include lines on the upper, lower, right side and left side surfaces, 560, 562, 564, 566, respectively, that are intended to indicate where a dimensional change occurs, which assists in locating where tapers in thickness and width are occurring in the sixth example energy storing suspension component 516 which may be appreciated by comparing FIGS. 6E-6G. For instance, the significance of the vertical line 570 that is shown in FIGS. 6E and 6G on the left side surface 566 of the axle seat portion 550, is apparent in FIG. 6F, which illustrates that the axle seat portion 550 has a taper that decreases in width from forward of the axle seat portion 550, actually starting in the first limb 554 at vertical line 572 and continuing into to the axle seat portion 550 until the position at the vertical line 570, where the axle seat portion 550 then transitions to a short portion having a constant width and then at the position indicated at vertical line 574 increases in width as it extends rearward into the second limb 558. As may be seen in FIGS. 6E-6G, the axle seat portion 550 of the sixth example has a greater thickness than width, and includes at least a portion having a constant width and then tapers to increase in width as it extends forward and rearward.

The sixth example energy storing suspension component 516 incorporates tapers that are similar to the above described first example, which are not like typical tapers found in prior art devices. FIGS. 6E-6G illustrate that the energy storing suspension component 516 has a first limb 554 that is configured to include a first taper forward of the axle seat portion 550 and which begins at the position of the vertical line 572, wherein the first limb 554 decreases in width from the position at the vertical line 572 to the position at the vertical line 576 as the first limb 554 extends toward the first end 552. A minimum width of the first limb 554 occurs along its length at a position associated with the vertical line 576. The first limb 554 includes a second taper wherein the first limb 554 decreases in thickness from the position at the lateral line 578 to the position at the lateral line 580 as the first limb 554 extends toward the first end 552, as may be appreciated when comparing FIGS. 6E-6G. Such a comparison also shows that along the first limb 554 there is at least a portion where both the first taper and second taper are present. The first limb 554 further includes a third taper that is forward of the first taper wherein the first limb 554 increases in width from the position at the vertical line 576 to the position at the vertical line 584 as the first limb 554 extends toward the first end 552.

The increased width at the first end 552 is beneficial to the structure of the first end 552. As with the first example, the first end 552 of the sixth example is configured to include an upturned eye 586. This may be appreciated when comparing FIGS. 6E-6G. The energy storing suspension component 516 is operatively coupled to the frame member 512 at the upturned eye 586 via the first frame member coupling assembly 528. As may be seen in FIGS. 6A and 6C, the first frame member coupling assembly 528 includes the bushing 532 that passes through the eye 586 and is connected to the mounting bracket 530 that is further connected to the frame member 512. The tapers in the first limb 554 of the energy storing suspension component 516 provide an advantageous, more compliant lateral spring rate, as well as constant vertical and lateral stress in the first limb 554, while also reducing the forces transferred to the first frame member coupling assembly 528 and to the axle coupling assembly 518.

As may be seen in FIGS. 6E-6G, the energy storing suspension component 516 of the sixth example actually includes multiple tapers both in width and thickness along its length. The use of the aforementioned combination of tapers is contrary to the normal practices within the prior art, and permits advantageous reductions in mass and improved lateral compliance, while achieving generally constant vertical and lateral stress along the first limb 554. Additional tapers occur in the first limb 554, such as a further fourth taper that is forward of the second taper wherein the first limb 554 decreases in thickness from the position at the lateral line 580 to the position at the lateral line 588, as may be appreciated when comparing FIGS. 6E-6G. It becomes apparent when viewing the related FIGS. 6E-6G, that the first limb 554 has a minimum thickness occurring along its length at a position associated with the lateral line 588. Yet a further taper in the first limb 554 is forward of the second and fourth tapers wherein the first limb 554 increases in thickness from the position at the lateral line 588 as it extends toward the first end 552. This additional thickness is beneficial when moving into the first end 552 and in the forming of the upturned eye 586.

Another of the tapers may be seen just forward of the axle seat portion 550, where the first limb 554 includes a further taper wherein the first limb 554 decreases in thickness from the position at the lateral line 590 to the position at the lateral line 578, as may be appreciated when comparing FIGS. 6E-6G. This additional taper in thickness is beneficial for mass reduction, and provides a faster rate of reduction in thickness. This permits a relatively fast transition from a sufficiently thick axle seat portion 550 to an appropriate thickness that can then taper more gradually within a larger portion of the first limb 554 for managing spring rates and stresses.

With the spring member configuration of the energy storing suspension component 516 of the sixth example, the tapers in the second limb 558 are quite similar to the tapers in the first limb 554. FIGS. 6E-6G illustrate that the energy storing suspension component 516 has a second limb 558 that is configured to include a first taper rearward of the axle seat portion 550 and which begins at the position of the vertical line 582, wherein the second limb 558 decreases in width from the position at the vertical line 582 to the position at the vertical line 596 as the second limb 558 extends toward the second end 556. A minimum width of the second limb 554 occurs along its length at a position associated with the vertical line 596.

The second limb 558 includes a second taper wherein the second limb 558 decreases in thickness from the position at the lateral line 593 to the position at the lateral line 595 as the second limb 558 extends toward the second end 556, as may be appreciated when comparing FIGS. 6E-6G. Such a comparison also shows that along the second limb 558 there is at least a portion where both the first taper and second taper are present. The second limb 558 further includes a third taper that is rearward of the first taper wherein the second limb 558 increases in width from the position at the vertical line 596 to the position at the vertical line 597 as the second limb 558 extends toward the second end 556.

Additional tapers occur in the second limb 558, such as a further fourth taper that is rearward of the second taper wherein the second limb 558 decreases in thickness from the position at the lateral line 595 to the position at the lateral line 598, as may be appreciated when comparing FIGS. 6E-6G. It becomes apparent when viewing the related FIGS. 6E-6G, that the second limb 558 has a minimum thickness occurring along its length at a position associated with the lateral line 598. Yet a further taper in the second limb 558 is rearward of the second and fourth tapers wherein the second limb 558 increases in thickness from the position at the lateral line 598 to the position at the lateral line 599 as it extends toward the second end 556. This additional thickness is beneficial when moving into the second end 556 and in the forming of the slipper end that will engage the cam 548 or an alternative structure, such as a slipper pad.

Another of the tapers may be seen just rearward of the axle seat portion 550, where the second limb 558 includes a further taper wherein the second limb 558 decreases in thickness from the position at the lateral line 592 to the position at the lateral line 593, as may be appreciated when comparing FIGS. 6E-6G. This additional taper in thickness is beneficial for mass reduction, and provides a faster rate of reduction in thickness. This permits a relatively fast transition from a sufficiently thick axle seat portion 550 to an appropriate thickness that can then taper more gradually within a larger portion of the second limb 558 for managing spring rates and stresses.

Use of the above described multiple tapers in width and thickness provides a highly advantageous energy storing suspension component 516, in the form of a spring member that is usable in a suspension for a chassis of a wheeled vehicle or trailer. While linear tapers are shown in this sixth example, this disclosure is not intended to be limited to linear tapers and other forms of tapers could be utilized. The materials and methods of manufacture for components of this sixth example suspension system are similar to those noted for the first example.

It also will be appreciated that the transitions for tapers in width and thickness need not necessarily occur at the same position along an energy storing suspension component, and in this sixth example energy storing suspension component 516, as seen in FIGS. 6E-6G, the minimum width and thickness in the first limb 554 do not occur at the same position. The minimum width occurs at the position indicated by the vertical line 576 and the minimum thickness occurs at the position indicated by the lateral line 588. There is a change in the taper with respect to both width and thickness at the same position within the first limb 554, as indicated by the vertical line 572 and the lateral line 578. A coincident change in taper affecting width and thickness also occurs within the second limb 558, as indicated by the vertical line 582 and the lateral line 593. Other coincident changes in taper could be noted within this sixth example. However, such transitions need not be coincident, but as previously noted, it is beneficial when making a taper to change in one of width or thickness, that there also be a taper to change in the other aspect.

Turning to FIGS. 7A-7H, a seventh example suspension system 610 is illustrated for coupling a longitudinally extending frame members 612 of a chassis of a wheeled vehicle or trailer to a laterally extending axle 614 that is disposed below the frame members 612. Each side of the seventh example suspension system 610 includes an energy storing suspension component 616, which in this seventh example is shown as a support member that is connected at its rear end to a rear support 646 having upper and lower extensions 647, thereby forming a longitudinally aligned two-piece Z-beam support member. A lower air spring support member 674 is coupled to each rear support 646 and, if desired, a lateral control link may be utilized but it has been removed to permit more convenient viewing of the other components within the suspension system 610.

An axle 614 is shown operatively coupled to the energy storing suspension component 616 by an axle coupling assembly 618 that is configured to connect the axle 614 to the energy storing suspension component 616. Similar to the second example, the seventh example uses an overslung configuration, with the axle coupling assembly 618 including a first mounting pad 620, which rests on the energy storing suspension component 616 at the upper extension 647, a coupling bracket 622 is disposed along the side of the energy storing suspension component 616 where it extends over the axle 614, a second mounting pad 624 is located below the axle 614, and a pair of U-shaped bolts 626 are used to clamp together the aforementioned components between the first and second mounting pads 620 and 624.

Each of the energy storing suspension components 616 is operatively coupled to a frame member 612 by a first frame member coupling assembly 628, which is in the form of a mounting bracket 630, and which in this example includes a bushing 632 connected thereto. As noted with the prior examples, the mounting bracket and bushing may be of various configurations, including bushings of the particularly advantageous types shown in FIGS. 11A-11F, 12A-12B, 13 and 14. This example also has the energy storing suspension component 616 operatively coupled to the frame member 612 by a second frame member coupling assembly 634, which in this example is in the form of an upper air spring mounting bracket, because this suspension system 610 includes an air spring 636 disposed between the lower air spring support member 674 and the frame member 612.

To provide damping, the suspension system 610 includes a shock absorber 638 that is operatively coupled at an upper end 640 to a frame member shock coupling 642, which is shown in the form of a mounting bracket, and at a lower end 644 to the second mounting pad 624, in a conventional manner, such as by a suitable fastener. It will be appreciated that, as was discussed with prior examples, some components, for example, fasteners for fastening together various components are not shown for better viewing of the more major components, but various fastening components and methods of fastening may be utilized without departing from the scope of the present disclosure.

Figure 7A:
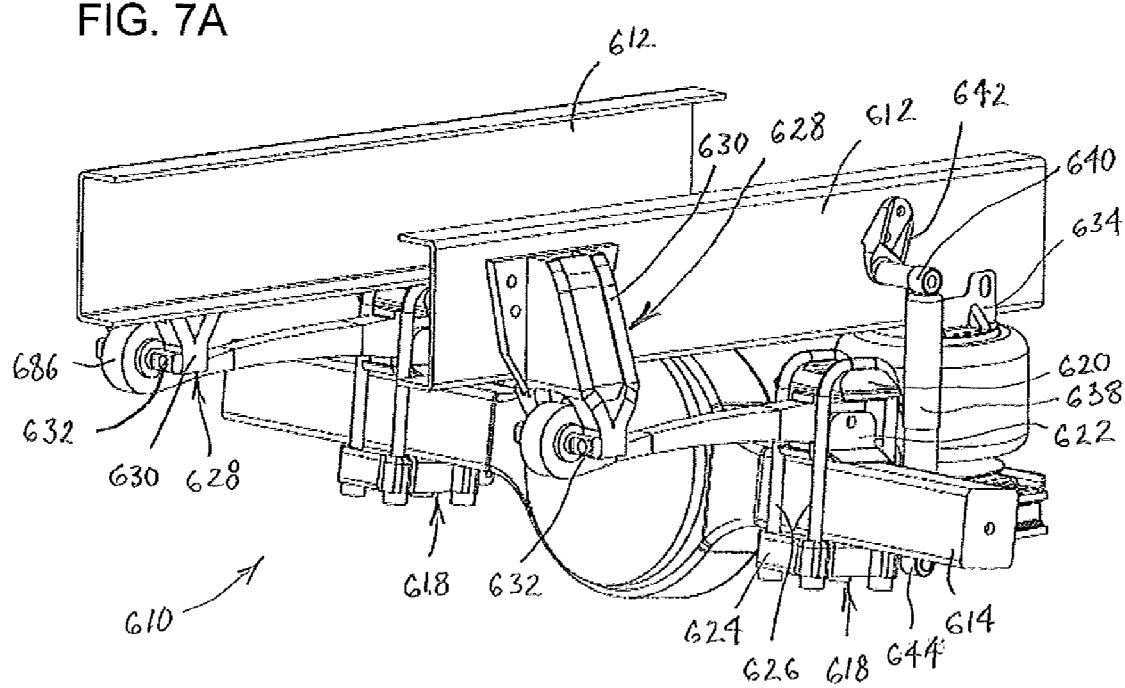
FIGS. 7A-7D are front perspective, side, top, and rear views, respectively, of a seventh example of portions of a suspension system utilizing an energy storing suspension component and bushing that is located along frame members of a wheeled vehicle or trailer.
Figure 7B:
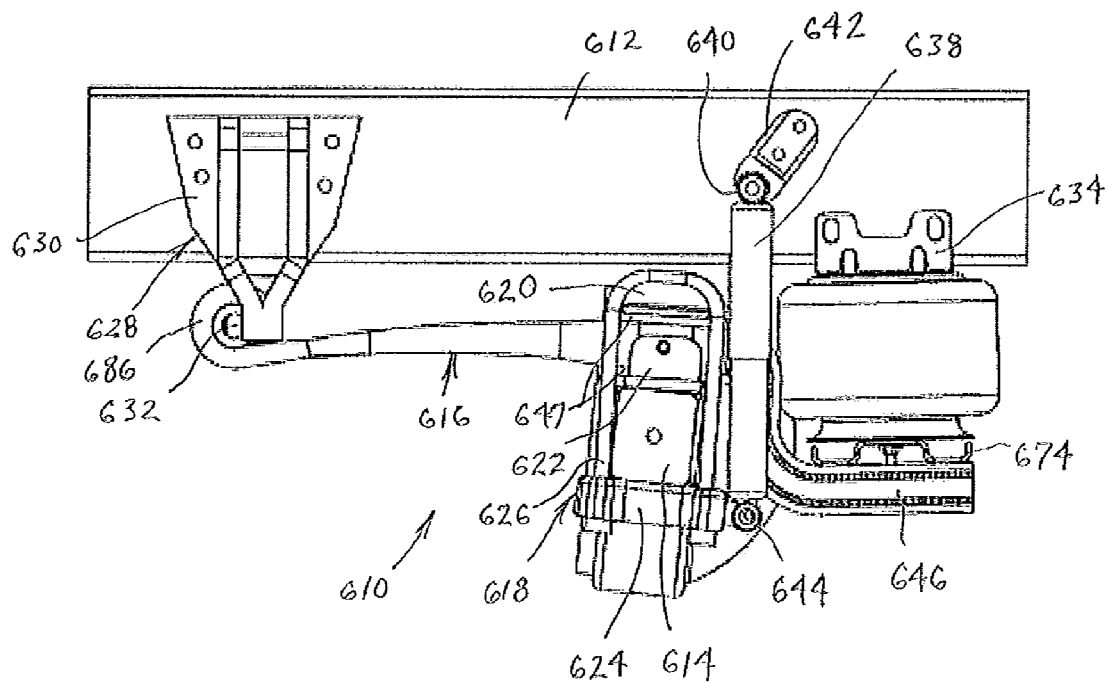
Figure 7C:
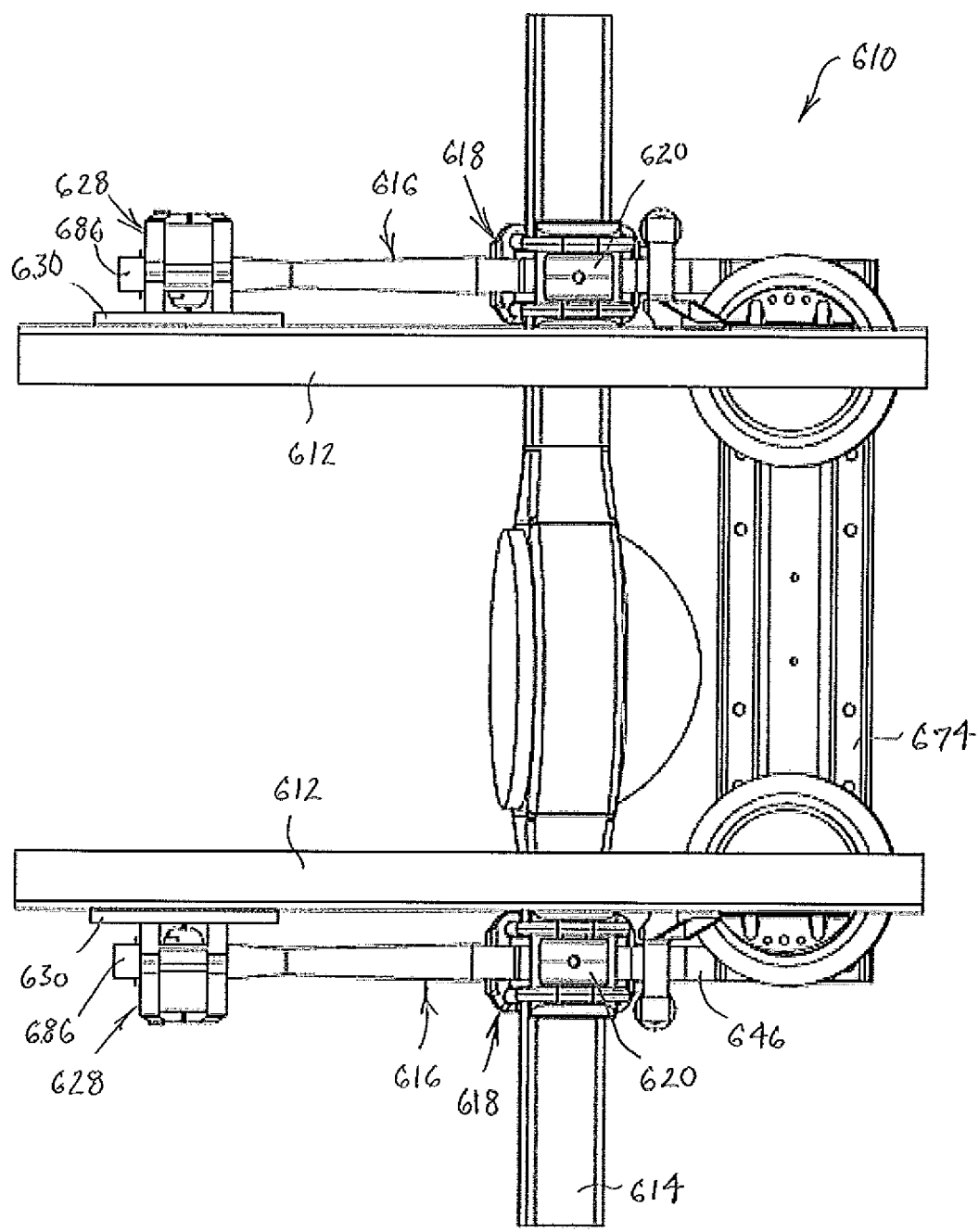
Figure 7D:
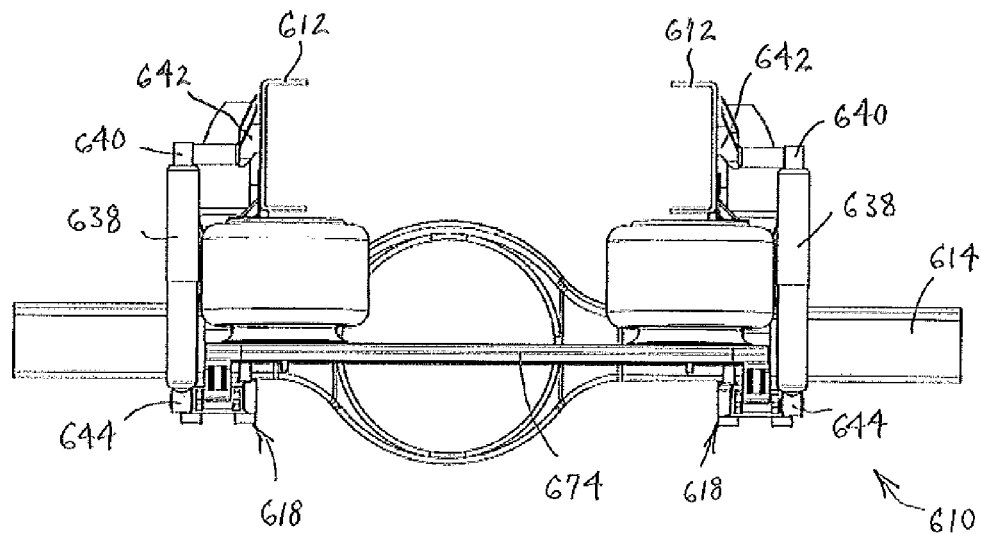
Figure 7E:
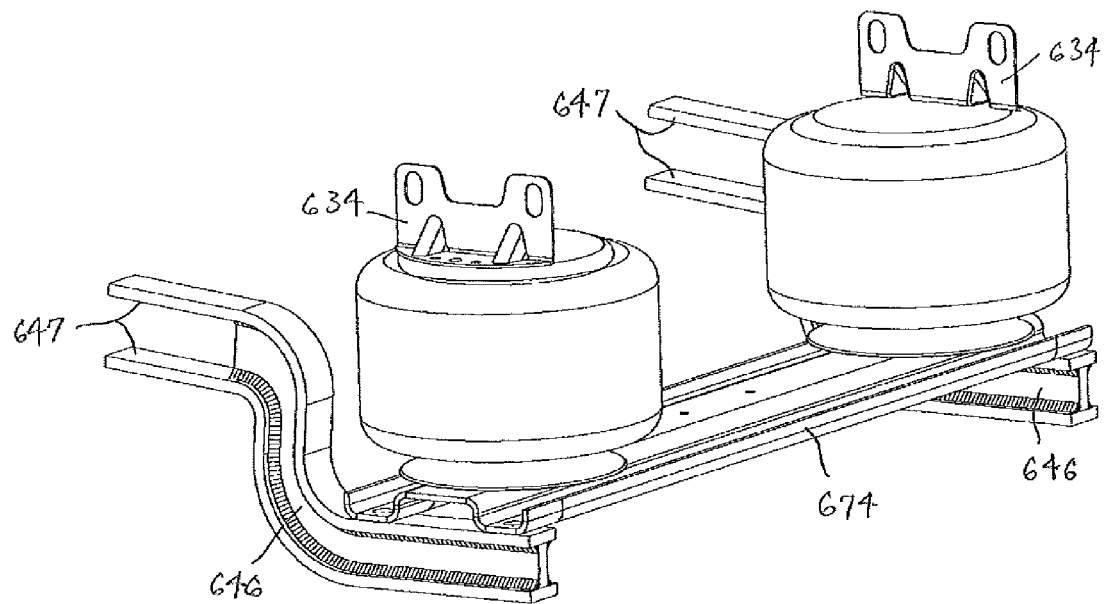
FIG. 7E is a front perspective view of a fabricated second limb and cross-channel for the seventh example energy storing suspension components that are shown in FIGS. 7A-7D.
Figure 7F:
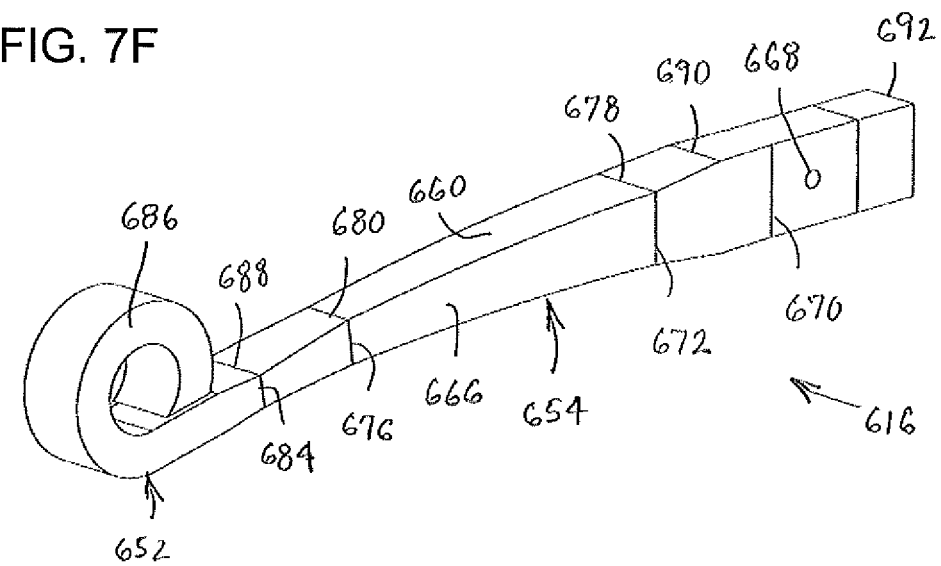
FIGS. 7F-7H are front perspective, top and side views, respectively, of the seventh example energy storing suspension component that is shown in FIGS. 7A-7E.
Figure 7G:
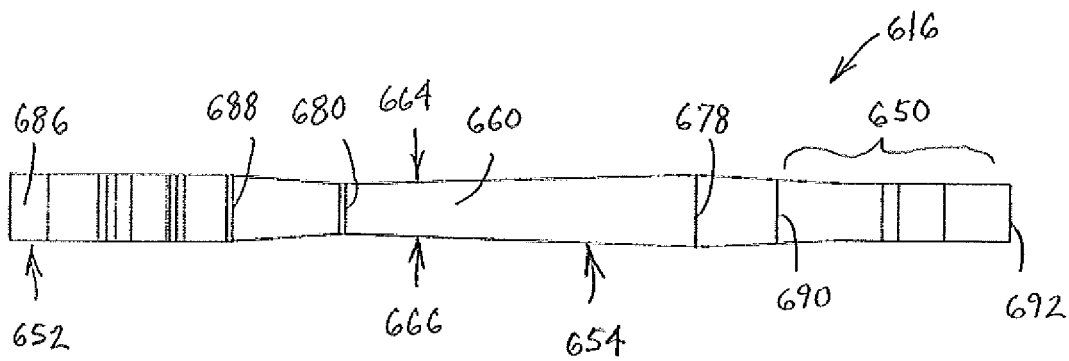
Figure 7H:
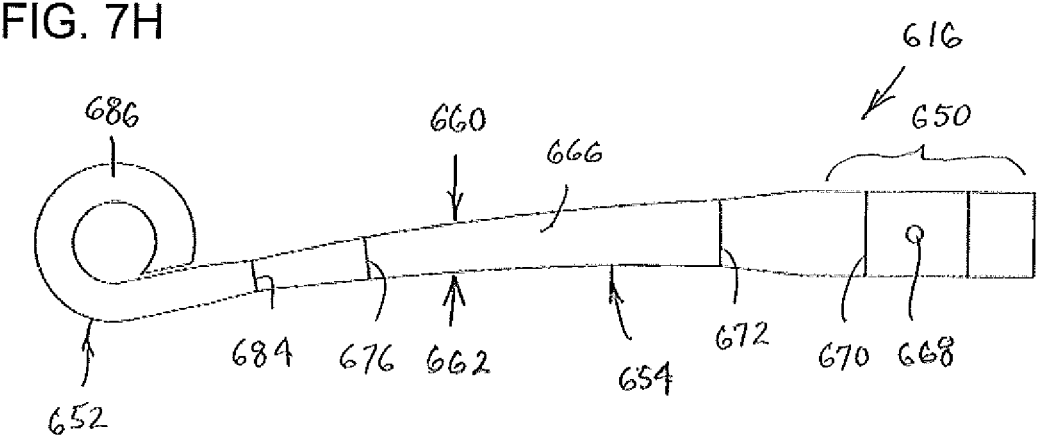

As may be seen in the isolated views in FIGS. 7F-7H, the energy storing suspension component 616 includes an axle seat portion 650, a first end 652 that in this example is forward of the axle seat portion 650, and a first limb 654 that extends between the axle seat portion 650 and the first end 652 and includes a slight reverse arch. The axle seat portion 650 of the seventh example is generally located between the positions indicated at the lateral lines 690 and 692. As with the prior examples, the axle seat portion 650 of the seventh example is not defined with exactness, but is a portion along the energy storing suspension component 616 where the axle is coupled thereto. The first end 652 and second end 692 are intended to be considered those regions that are near to and including the distal ends of the energy storing suspension component 616. In the seventh example, the axle seat portion 650 is shown with a lateral hole 668 therethrough, which can be used with the axle coupling assembly 618, such as for connection to the coupling bracket 622, and/or for locating purposes, but it will be appreciated that alternative configurations may be utilized, as desired, such as having more than one such lateral hole therethrough, or one or more vertical holes therethrough, or no holes at all.

The energy storing suspension component 616 generally has an upper surface 660 and a lower surface 662, and a thickness can be determined at any selected position along the length of the energy storing suspension component 616 by measuring the distance between the upper surface 660 and lower surface 662 at the selected position. Similarly, the energy storing suspension component 616 has a right side surface 664 and a left side surface 666, as viewed from above and looking in a forward direction of the component. Accordingly, a width can be determined at any selected position along the length of the energy storing suspension component 616 by measuring the distance between the right side surface 664 and the left side surface 666 at the selected position.

FIGS. 7F-7H include lines on the upper, lower, right side and left side surfaces, 660, 662, 664, 666, respectively, that are intended to indicate where a dimensional change occurs, which assists in locating where tapers in thickness and width are occurring in the seventh example energy storing suspension component 616. Such changes in taper may be appreciated by comparing FIGS. 7F-7H. For instance, the significance of the vertical line 670 that is shown in FIGS. 7F and 7H on the left side surface 666 of the axle seat portion 650, illustrates that the axle seat portion 650 includes a taper that increases in width forward of the vertical line 670 and extending into the first limb 654 to the vertical line 672, with the axle seat portion 650 extending rearward of the vertical line 670 in a constant width.

As may be seen in FIGS. 7F-7H, the axle seat portion 650 of the seventh example has a greater thickness than width. Also, there is a taper in the axle seat portion 650 that would be generally located in the forward portion of the axle seat portion 650, between the positions indicated at the lateral line 690 and the vertical line 670, and then there is a portion having constant width between the positions indicated at the vertical line 670 and the lateral line 692.

The seventh example energy storing suspension component 616 incorporates tapers that are similar to the above described fourth example, which are not like typical tapers found in prior art devices. FIGS. 7F-7H illustrate that the energy storing suspension component 616 has a first limb 654 that is configured to include a first taper as the first limb 654 extends from the axle seat portion 650 toward the first end 652, which begins at the position of the vertical line 672, wherein the first limb 654 decreases in width from the position at the vertical line 672 to the position at the vertical line 676 as the first limb 654 extends toward the first end 652. A minimum width of the first limb 654 occurs along its length at a position associated with the vertical line 676. The first limb 654 includes a second taper wherein the first limb 654 decreases in thickness from the position at the lateral line 678 to the position at the lateral line 680 as the first limb 654 extends toward the first end 652, as may be appreciated when comparing FIGS. 7F-7H. Such a comparison also shows that along the first limb 654 there is at least a portion where both the first taper and second taper are present. The first limb 654 further includes a third taper that is further from the axle seat portion 650 than the first taper wherein the first limb 654 increases in width from the position at the vertical line 676 to the position at the vertical line 684 as the first limb 654 extends toward the first end 652.

The increased width at the first end 652 is beneficial to the structure of the first end 652. As with prior examples, the first end 652 of the seventh example is configured to include an upturned eye 686, which may be seen in FIGS. 6F and 6H. The energy storing suspension component 616 is operatively coupled to the frame member 612 at the upturned eye 686 via the first frame member coupling assembly 628. As may be seen in FIGS. 7A and 7B, the first frame member coupling assembly 628 includes the bushing 632 that passes through the eye 686 and is connected to the mounting bracket 630 that is further connected to the frame member 612. It will be appreciated that the mounting bracket and bushing may be of various configurations, including mounting brackets that will accommodate bushings of the particularly advantageous types shown in FIGS. 11A-11F, 12A-12B, 13 and 14. The tapers in the first limb 654 of the energy storing suspension component 616 provide an advantageous, more compliant lateral spring rate, as well as constant vertical and lateral stress in the first limb 654, while also reducing the forces transferred to the first frame member coupling assembly 628 and to the axle coupling assembly 618.

As may be seen in FIGS. 7F-7H, the energy storing suspension component 616 of the seventh example actually includes multiple tapers both in width and thickness along its length. The use of the aforementioned combination of tapers is contrary to the normal practices within the prior art, and permits advantageous reductions in mass and improved lateral compliance, while achieving generally constant vertical and lateral stress along the first limb 654. Additional tapers occur in the first limb 654, such as a further fourth taper that is further from the axle seat portion 650 than the second taper wherein the first limb 654 decreases in thickness from the position at the lateral line 680 to the position at the lateral line 688, as may be appreciated in FIGS. 7F-7H. It becomes apparent when viewing these related figures that the first limb 654 has a minimum thickness occurring along its length at a position associated with the lateral line 688. Yet a further taper in the first limb 654 is further from the axle seat portion 650 than the second and fourth tapers wherein the first limb 654 increases in thickness from the position at the lateral line 688 as it extends toward the first end 652. This additional thickness is beneficial when moving into the first end 652 and in the forming of the upturned eye 686.

With the two-piece Z-beam configuration on each side of the suspension system 610, the rear support 646 is not located directly below the air spring 636. Instead, each air spring 636 sits atop and is connected to a lower air spring support member 674, which is coupled to the rear supports 646, such as by welding, or by vertical and/or lateral holes therethrough, with fasteners in the form of bolts or the like, or by any other suitable fastening means. The lower air spring support member 674 in this example may be seen as providing an example of the cross member that was mentioned as an alternative construction that could be used with the second example in FIGS. 2A-2E.

Use of the above described multiple tapers in width and thickness provides a highly advantageous energy storing suspension component 616, in the form of a support member that is usable in a suspension for a chassis of a wheeled vehicle or trailer. While linear tapers are shown in this second example, this disclosure is not intended to be limited to linear tapers and other forms of tapers could be utilized. The materials and methods of manufacture for components of this seventh example suspension system may be similar to those noted for the prior examples. It also will be appreciated that the transitions for tapers in width and thickness need not necessarily, but may occur at the same position along an energy storing suspension component, and in this seventh example energy storing suspension component 616, as seen in FIGS. 7F-7H, the minimum width and thickness in the first limb 654 do not occur at the same position. The minimum width occurs at the position indicated by the vertical line 676 and the minimum thickness occurs at the position indicated by the lateral line 688. There is a change in the taper with respect to both width and thickness at the same position within the first limb 654, as indicated along its length at the position of the vertical line 672 and the lateral line 678. A coincident change in taper affecting width and thickness at a position also occurs within the first limb 654, as indicated by the vertical line 676 and the lateral line 680. As stated, such transitions need not be coincident, but as previously noted, it is beneficial when making a taper to change in one of width or thickness, that there also be a taper to change in the other aspect.

Figure 8A:
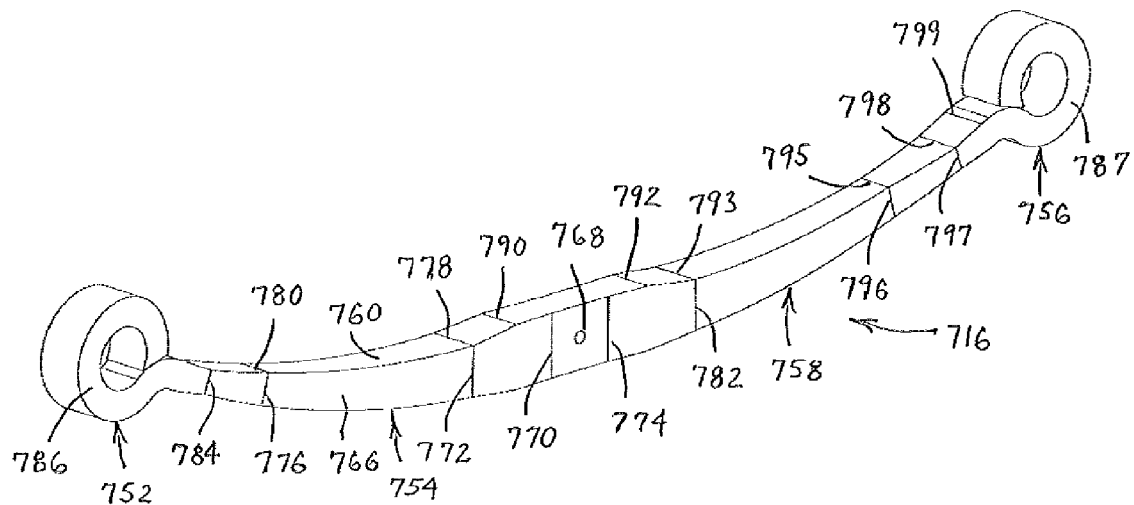
FIGS. 8A-8C are front perspective, top and side views, respectively, of an eighth example energy storing suspension component for use in combination with bushings in a suspension system.
Figure 8B:
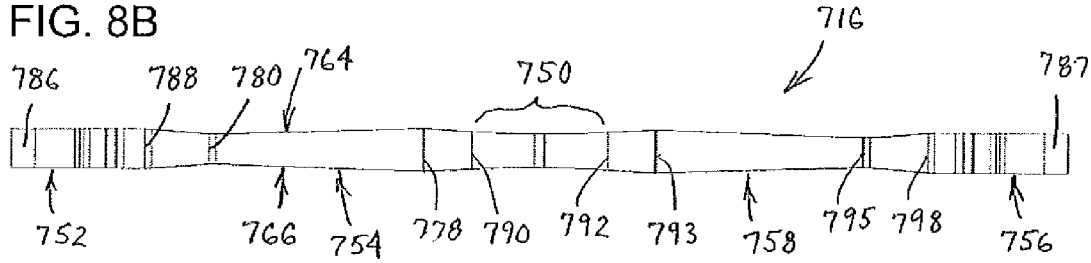
Figure 8C:
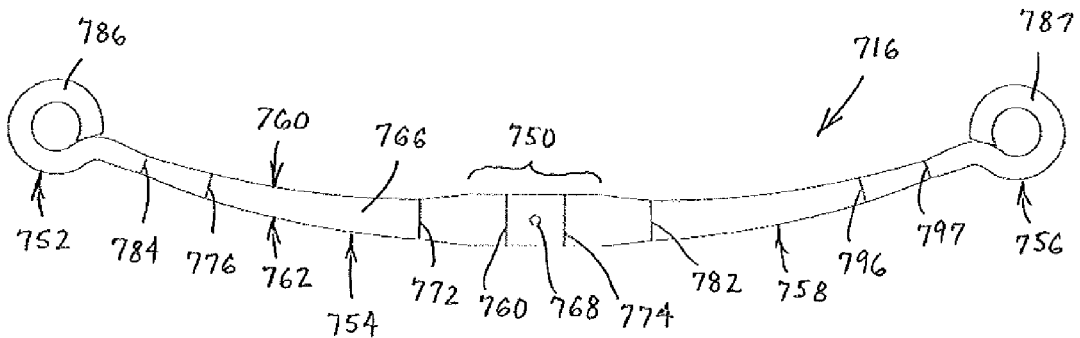

An eighth example of an energy storing suspension component 716 is illustrated in FIGS. 8A-8C. The eighth example of an energy storing suspension component 716 is illustrated as a spring member in a configuration of a leaf spring having a Berlin eye at each end. It will be appreciated that this example may be used in a suspension system somewhat like that shown in FIGS. 6A-6D, but there may be changes to accommodate the Berlin eye in coupling to a first frame member coupling and a different second frame member coupling would be required and may include a conventional structure, such as a shackle or other bracketing and the like. Each eye may receive a bushing, such as for example, one of the low axial rate bushing configurations shown in FIGS. 11A-11F, 12A-12B, 13 and 14.

As may be appreciated from viewing FIGS. 8A-8C, the energy storing suspension component 716 includes an axle seat portion 750, a first end 752 that is forward of the axle seat portion 750, and a first limb 754 that extends between the axle seat portion 750 and the first end 752 and includes camber. Also included in this example is a second end 756 that is rearward of the axle seat portion 750, and a second limb 758 that extends between the axle seat portion 750 and the second end 756 and includes camber. As with the earlier examples, the axle seat portion 750 of the eighth example is not defined with exactness, but is a portion along the energy storing suspension component 716 where the axle is coupled thereto. The first end 752 and second end 756 are intended to be considered those regions that are near to and including the distal ends of the energy storing suspension component 716. In the eighth example, the axle seat portion 750 is shown with a horizontal hole 768 therethrough, which can be used with the axle coupling assembly 718 for connection and/or locating purposes, but it will be appreciated that alternative configurations may be utilized, as desired, such as having more than one such horizontal hole therethrough, or one or more vertical holes therethrough, or no holes at all.

The energy storing suspension component 716 generally has an upper surface 760 and a lower surface 762, and a thickness can be determined at any selected position along the length of the energy storing suspension component 716 by measuring the distance between the upper surface 760 and lower surface 762 at the selected position. Similarly, the energy storing suspension component 716 has a right side surface 764 and a left side surface 766, as viewed from above and looking in a forward direction of the component. Accordingly, a width can be determined at any selected position along the length of the energy storing suspension component 716 by measuring the distance between the right side surface 764 and the left side surface 766 at the selected position.

FIGS. 8A-8C include lines on the upper, lower, right side and left side surfaces, 760, 762, 764, 766, respectively, that are intended to indicate where a dimensional change occurs, which assists in locating where tapers in thickness and width are occurring in the eighth example energy storing suspension component 716 which may be appreciated by comparing FIGS. 8A-8C. For instance, the significance of the vertical line 770 that is shown in FIGS. 8A and 8C on the left side surface 766 of the axle seat portion 750, is apparent in FIG. 8B, which illustrates that the axle seat portion 750 has a taper that decreases in width from forward of the axle seat portion 750, actually starting in the first limb 754 at vertical line 772 and continuing into to the axle seat portion 750 until the position at the vertical line 770, where the axle seat portion 750 then transitions to a short portion having a constant width and then at the position indicated at vertical line 774 increases in width as it extends rearward into the second limb 758. As may be seen in FIGS. 8A-8C, the axle seat portion 750 of the eighth example has a greater thickness than width, and includes at least a portion having a constant width and then tapers to increase in width as it extends forward and rearward.

The eighth example energy storing suspension component 716 incorporates tapers that are similar to the above described sixth example, which are not like typical tapers found in prior art devices. FIGS. 8A-8C illustrate that the energy storing suspension component 716 has a first limb 754 that is configured to include a first taper forward of the axle seat portion 750 and which begins at the position of the vertical line 772, wherein the first limb 754 decreases in width from the position at the vertical line 772 to the position at the vertical line 776 as the first limb 754 extends toward the first end 752. A minimum width of the first limb 754 occurs along its length at a position associated with the vertical line 776. The first limb 754 includes a second taper wherein the first limb 754 decreases in thickness from the position at the lateral line 778 to the position at the lateral line 780 as the first limb 754 extends toward the first end 752, as may be appreciated when comparing FIGS. 8A-8C. Such a comparison also shows that along the first limb 754 there is at least a portion where both the first taper and second taper are present. The first limb 754 further includes a third taper that is forward of the first taper wherein the first limb 754 increases in width from the position at the vertical line 776 to the position at the vertical line 784 as the first limb 754 extends toward the first end 752.

The increased width at the first end 752 is beneficial to the structure of the first end 752. As with the first example, the first end 752 of the eighth example is configured to include an upturned eye 786. This may be appreciated when comparing FIGS. 8A-8C. The energy storing suspension component 716 may be operatively coupled to a frame member or unibody structure of a wheeled vehicle or trailer at the upturned eye 786 via a suitable first coupling assembly, such as were described in the earlier examples. The tapers in the first limb 754 of the energy storing suspension component 716 provide an advantageous, more compliant lateral spring rate, as well as constant vertical and lateral stress in the first limb 754, while also reducing the forces transferred to a first frame member coupling assembly and to an axle coupling assembly.

As may be seen in FIGS. 8A-8C, the energy storing suspension component 716 of the eighth example actually includes multiple tapers both in width and thickness along its length. The use of the aforementioned combination of tapers is contrary to the normal practices within the prior art, and permits advantageous reductions in mass and improved lateral compliance, while achieving generally constant vertical and lateral stress along the first limb 754. Additional tapers occur in the first limb 754, such as a further fourth taper that is forward of the second taper wherein the first limb 754 decreases in thickness from the position at the lateral line 780 to the position at the lateral line 788, as may be appreciated when comparing FIGS. 8A-8C. It becomes apparent when viewing the related FIGS. 8A-8C, that the first limb 754 has a minimum thickness occurring along its length at a position associated with the lateral line 788. Yet a further taper in the first limb 754 is forward of the second and fourth tapers wherein the first limb 754 increases in thickness from the position at the lateral line 788 as it extends toward the first end 752. This additional thickness is beneficial when moving into the first end 752 and in the forming of the upturned eye 786.

Another of the tapers may be seen just forward of the axle seat portion 750, where the first limb 754 includes a further taper wherein the first limb 754 decreases in thickness from the position at the lateral line 790 to the position at the lateral line 788, as may be appreciated when comparing FIGS. 8A-8C. This additional taper in thickness is beneficial for mass reduction, and provides a faster rate of reduction in thickness. This permits a relatively fast transition from a sufficiently thick axle seat portion 750 to an appropriate thickness that can then taper more gradually within a larger portion of the first limb 754 for managing spring rates and stresses.

With the spring member configuration of the energy storing suspension component 716 of the eighth example, the tapers in the second limb 758 are quite similar to the tapers in the first limb 754. FIGS. 8A-8C illustrate that the energy storing suspension component 716 has a second limb 758 that is configured to include a first taper rearward of the axle seat portion 750 and which begins at the position of the vertical line 782, wherein the second limb 758 decreases in width from the position at the vertical line 782 to the position at the vertical line 796 as the second limb 758 extends toward the second end 756. A minimum width of the second limb 754 occurs along its length at a position associated with the vertical line 796. The second limb 758 includes a second taper wherein the second limb 758 decreases in thickness from the position at the lateral line 793 to the position at the lateral line 795 as the second limb 758 extends toward the second end 756, as may be appreciated when comparing FIGS. 8A-8C. Such a comparison also shows that along the second limb 758 there is at least a portion where both the first taper and second taper are present. The second limb 758 further includes a third taper that is rearward of the first taper wherein the second limb 758 increases in width from the position at the vertical line 796 to the position at the vertical line 797 as the second limb 758 extends toward the second end 756, which is formed in a similar manner to the first end 752 so as to include a Berlin eye 787.

Additional tapers occur in the second limb 758, such as a further fourth taper that is rearward of the second taper wherein the second limb 758 decreases in thickness from the position at the lateral line 795 to the position at the lateral line 798, as may be appreciated when comparing FIGS. 8A-8C. It becomes apparent when viewing the related FIGS. 8A-8C, that the second limb 758 has a minimum thickness occurring along its length at a position associated with the lateral line 798. Yet a further taper in the second limb 758 is rearward of the second and fourth tapers wherein the second limb 758 increases in thickness from the position at the lateral line 798 to the position at the lateral line 799 as it extends toward the second end 756. This additional thickness is beneficial when moving into the second end 756 and in the forming of the Berlin eye 787.

Another of the tapers may be seen just rearward of the axle seat portion 750, where the second limb 758 includes a further taper wherein the second limb 758 decreases in thickness from the position at the lateral line 792 to the position at the lateral line 793, as may be appreciated when comparing FIGS. 8A-8C. This additional taper in thickness is beneficial for mass reduction, and provides a faster rate of reduction in thickness. This permits a relatively fast transition from a sufficiently thick axle seat portion 750 to an appropriate thickness that can then taper more gradually within a larger portion of the second limb 758 for managing spring rates and stresses.

Use of the above described multiple tapers in width and thickness provides a highly advantageous energy storing suspension component 716, in the form of a spring member that is usable in a suspension for a chassis of a wheeled vehicle or trailer. While linear tapers are shown in this seventh example, this disclosure is not intended to be limited to linear tapers and other forms of tapers could be utilized. The materials and methods of manufacture for components of this eighth example suspension system are similar to those noted for the first example. It also will be appreciated that the transitions for tapers in width and thickness need not necessarily occur at the same position along an energy storing suspension component, and in this eighth example energy storing suspension component 716, as seen in FIGS. 8A-8C, the minimum width and thickness in the first limb 754 do not occur at the same position. The minimum width occurs at the position indicated by the vertical line 776 and the minimum thickness occurs at the position indicated by the lateral line 788. There is a change in the taper with respect to both width and thickness at the same position within the first limb 754, as indicated by the vertical line 772 and the lateral line 778. A coincident change in taper affecting width and thickness also occurs within the second limb 758, as indicated by the vertical line 782 and the lateral line 793. Other coincident changes in taper could be noted within this eighth example. However, such transitions need not be coincident, but as previously noted, it is beneficial when making a taper to change in one of width or thickness, that there also be a taper to change in the other aspect.

Figure 9A:
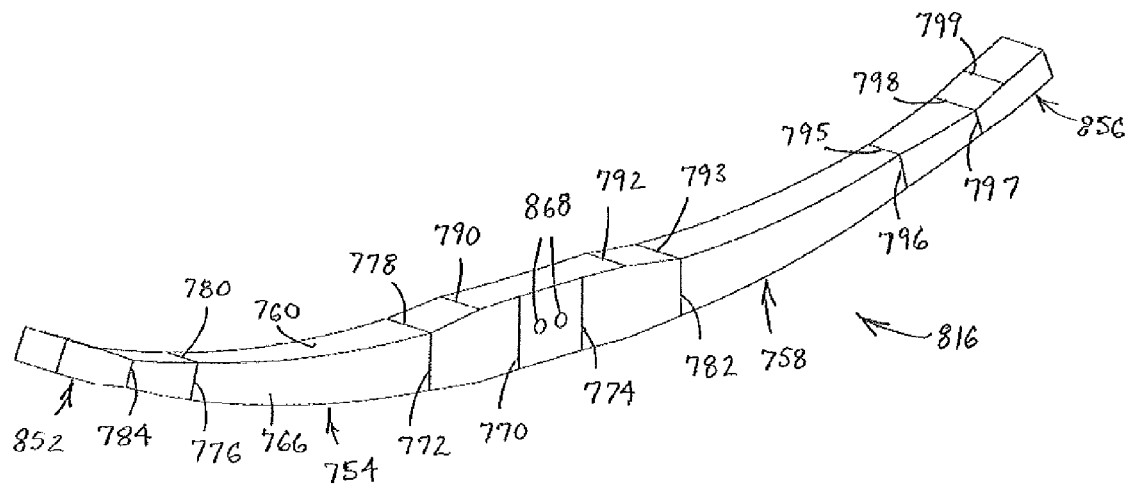
FIGS. 9A-9C are front perspective, top and side views, respectively, of a ninth example energy storing suspension component for use in a suspension system.
Figure 9B:
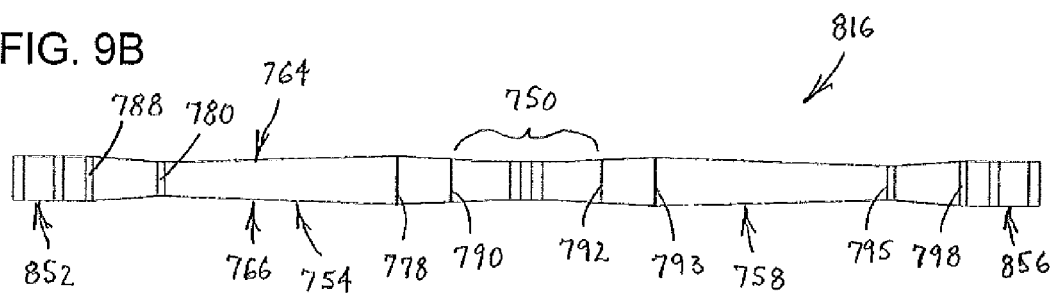
Figure 9C:
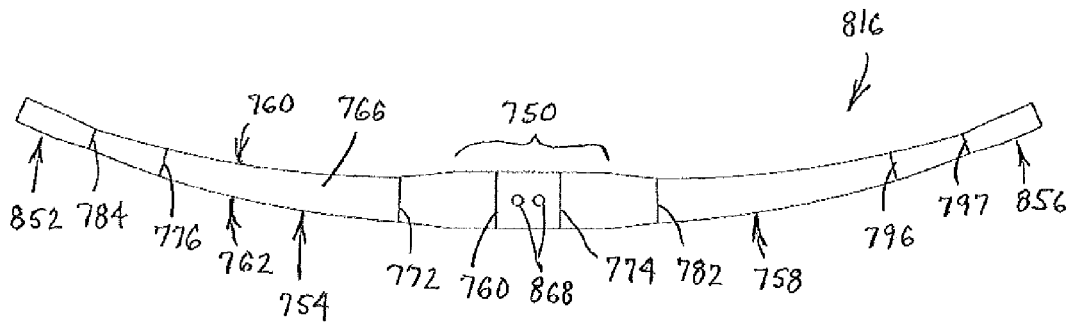

A ninth example of an energy storing suspension component 816 is illustrated in FIGS. 9A-9C. The ninth example of an energy storing suspension component 816 is illustrated as a spring member in a configuration of a leaf spring having a similar taper profile to that of the eighth example in FIGS. 8A-8C, but having a first slipper end 852 in the front and a second slipper end 856 in the rear. The slipper ends may be configured to operatively coupled to a frame member by such as by use of frame member coupling assemblies, which may be similar to the coupling assembly 534 described above and shown in FIGS. 6A-6C, where a slipper end engages a cam of a mounting bracket, but there may be changes to accommodate the slipper ends, as needed. In the ninth example, there are two horizontal holes 868 through an axle seat portion, which can be used with an axle coupling assembly for connection and/or locating purposes, but it will be appreciated that alternative configurations may be utilized, as desired, such as having one such horizontal hole therethrough, or one or more vertical holes therethrough, or no holes at all.

As may be appreciated from viewing FIGS. 9A-9C, aside from the ends 852 and 856 in place of the ends 752 and 756, and the two apertures 868 in place of the one aperture 768 through the axle seat portion, the energy storing suspension component 816 includes the aforementioned configuration of the eighth example energy storing suspension component 716 in FIGS. 8A-8C, and accordingly is shown with the same reference numerals, and is subject to the same description.

Figure 10A:
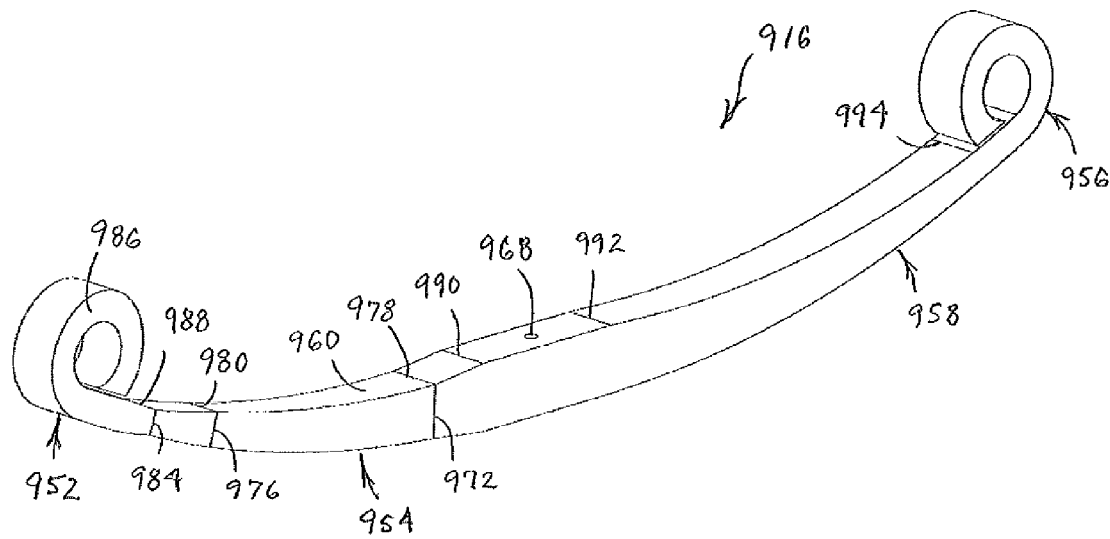
FIGS. 10A-10C are front perspective, top and side views, respectively, of a tenth example energy storing suspension component for use in combination with bushings in a suspension system.
Figure 10B:
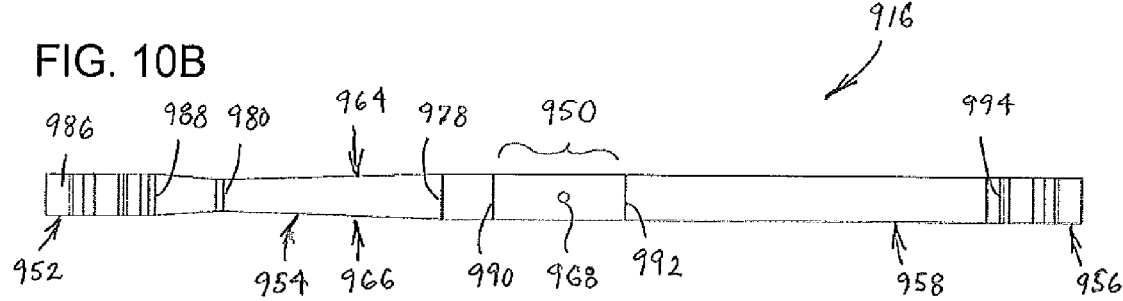
Figure 10C:
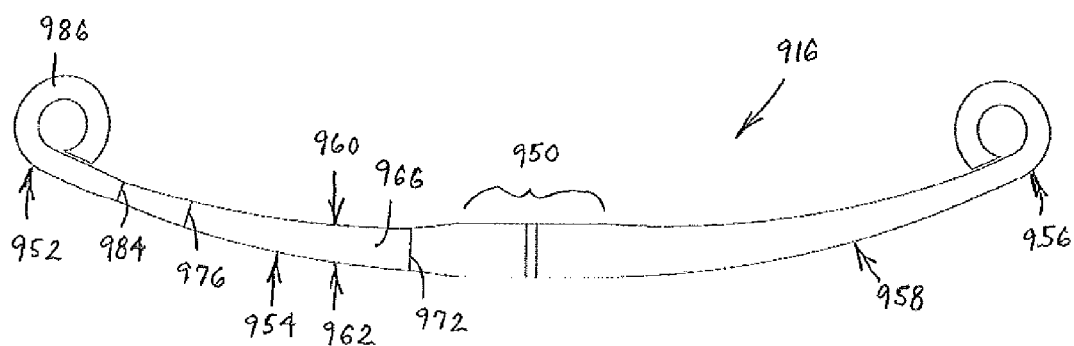

A tenth example energy storing suspension component 916 may be seen in the FIGS. 10A-10C and includes an axle seat portion 950, a first end 952 that in this example is forward of the axle seat portion 950, and a first limb 954 that extends between the axle seat portion 950 and the first end 952 and has a bit of camber. Also included in this example is a second end 956 that in this example is rearward of the axle seat portion 950, and a second limb 958 that also has a bit of camber and extends between the axle seat portion 950 and the second end 956. As with the earlier examples, the axle seat portion 950 of the tenth example is not defined with exactness, but is a portion along the energy storing suspension component 916 where an axle may be coupled thereto. The first end 952 and second end 956 are intended to be considered those regions that are near to and including the distal ends of the energy storing suspension component 916. In the tenth example, the axle seat portion 950 is shown with a vertical hole 968 therethrough, which can be used with the axle coupling assembly, such as described with prior examples, for connection and/or locating purposes, but it will be appreciated that alternative configurations may be utilized, as desired, such as having more than one such vertical hole therethrough, or one or more lateral holes therethrough, or no holes at all.

The energy storing suspension component 916 generally has an upper surface 960 and a lower surface 962, and a thickness can be determined at any selected position along the length of the energy storing suspension component 916 by measuring the distance between the upper surface 960 and lower surface 962 at the selected position. Similarly, the energy storing suspension component 916 has a right side surface 964 and a left side surface 966, as viewed from above and looking in a forward direction of the component. Accordingly, a width can be determined at any selected position along the length of the energy storing suspension component 916 by measuring the distance between the right side surface 964 and the left side surface 966 at the selected position.

FIGS. 10A-10C include lines on the upper, lower, right side and left side surfaces, 960, 962, 964, 966, respectively, that are intended to indicate where a dimensional change occurs, which assists in locating where tapers in thickness and width are occurring in the tenth example energy storing suspension component 916 which may be appreciated by comparing FIGS. 10A-10C. The axle seat portion 950 of the tenth example is generally located between the positions indicated at the lateral lines 990 and 992, has a greater thickness than width, and is of constant thickness and width, with no tapers.

The tenth example energy storing suspension component 916 incorporates tapers that are not like typical tapers found in prior art devices. FIGS. 10A-10C illustrate that the energy storing suspension component 916 has a first limb 954 that is configured to include a first taper in this example that is forward of the axle seat portion 950 and which begins at the position of the vertical line 972, wherein the first limb 954 decreases in width from the position at the vertical line 972 to the position at the vertical line 976 as the first limb 954 extends toward the first end 952. A minimum width of the first limb 954 occurs along its length at a position associated with the vertical line 976.

The first limb 954 includes a second taper wherein the first limb 954 decreases in thickness from the position at the lateral line 978 to the position at the lateral line 980 as the first limb 954 extends toward the first end 952, as may be appreciated when comparing FIGS. 10A-10C. Such a comparison also shows that along the first limb 954 there is at least a portion where both the first taper and second taper are present. The first limb 954 further includes a third taper that is further from the axle seat portion 950 than the first taper wherein the first limb 954 increases in width from the position at the vertical line 976 to the position at the vertical line 984 as the first limb 954 extends toward the first end 952.

The increased width at the first end 952 is beneficial to its structure. Similar to some of the prior examples, the first end 952 of the tenth example is configured to include an upturned eye 986. The energy storing suspension component 916 may be operatively coupled to a frame member at the upturned eye 986 via a frame member coupling assembly, such as those used in the prior examples. As may be seen in FIGS. 10A and 10C, the upturned eye 986 may be configured to receive a bushing that would pass therethrough. The tapers in the first limb 954 of the energy storing suspension component 916 provide an advantageous, more compliant lateral spring rate, as well as constant vertical and lateral stress in the first limb 954, while also reducing the forces transferred to a frame member coupling assembly and to an axle coupling assembly.

As may be seen in FIGS. 10A-10C, the energy storing suspension component 916 of the tenth example actually includes multiple tapers both in width and thickness along its length. The use of the aforementioned combination of tapers is contrary to the normal practices within the prior art, and permits advantageous reductions in mass and improved lateral compliance, while achieving generally constant vertical and lateral stress along the first limb 954. Additional tapers occur in the first limb 954, such as a further fourth taper that is further from the axle seat portion 950 than the second taper wherein the first limb 954 decreases in thickness from the position at the lateral line 980 to the position at the lateral line 988, as may be appreciated when comparing FIGS. 10A and 10C. It is apparent that the first limb 954 has a minimum thickness occurring along its length at a position associated with the lateral line 988. Yet a further taper in the first limb 954 is further from the axle seat portion 950 than the second and fourth tapers wherein the first limb 954 increases in thickness from the position at the lateral line 988 as it extends toward the first end 952. This additional thickness is beneficial when moving into the first end 952 and in the forming of the upturned eye 986. The eye may receive a bushing, such as for example, one of the bushing configurations shown in FIGS. 11A-11F, 12A-12B, 13 and 14.

Another of the tapers may be seen in this example just forward of the axle seat portion 950, where the first limb 954 includes a further taper as it decreases in thickness from the position at the lateral line 990 to the position at the lateral line 978, as may be appreciated when viewing FIG. 10A. This additional taper in thickness is beneficial for mass reduction, and provides a faster rate of reduction in thickness. This permits a relatively fast transition from a sufficiently thick axle seat portion 950 to an appropriate thickness that can then taper more gradually within a larger portion of the first limb 954 for managing spring rates and stresses.

As may be appreciated when comparing FIGS. 10A-10C, the second limb 958 has a constant width, but a taper is present in the second limb 958 as it decreases in thickness from the position at the lateral line 992 to the position at a lateral line 994. This is followed by an upturned eye 987 at the second end 956. As with the upturned eye 986 at the first end 952, the upturned eye 987 may be configured to receive a bushing that would pass therethrough to operatively couple the energy storing suspension component 916 to a frame member via a frame member coupling assembly, such as those used in the prior examples, with the understanding that one could utilize the particularly advantageous types shown in FIGS. 11A-11F, 12A-12B, 13 and 14.

Use of the above described multiple tapers in width and thickness provides a highly advantageous energy storing suspension component 916, in the form of a leaf spring that is usable in a suspension for a chassis of a wheeled vehicle or trailer. While linear tapers are shown in this tenth example, this disclosure is not intended to be limited to linear tapers and other forms of tapers could be utilized. The materials and methods of manufacture for components of this tenth example energy storing suspension component 916 are similar to those noted for the prior examples. It also will be appreciated that while the transitions for tapers in width and thickness may occur at the same position along an energy storing suspension component, in this tenth example energy storing suspension component 916, as may be seen in FIGS. 10A-10C, the minimum width in the first limb 954 occurs at the position of the vertical line 976, while the minimum thickness in the first limb 954 occurs at the position of the lateral line 988. There is a change in the taper with respect to both width and thickness at the same position within the first limb 954, as indicated by the vertical line 976 and the lateral line 980. As stated, such transitions need not be coincident, but as previously noted, it is beneficial when making a taper to change in one of width or thickness, that there also be a taper to change in the other aspect.

Turning to FIGS. 11A-11F, 12A-12B, 13 and 14, several examples of advantageous bushings are illustrated. Each of the respective bushings 1000A, 1000B, 1000C and 1000D may be used with or without an outer can and in combination with an energy storing suspension component via being received by the eye of the energy storing suspension component, such as in any of the above first through eighth, or tenth example energy storing suspension components. These example bushings provide a low axial rate, such as 15,000 lbs/inch or less, and may provide a particularly advantageous high radial to axial rate ratio.

Each of the example bushings includes a different central body 1002A, 1002B, 1002C, 1002D at the center of the bushing that permits mounting to a bracket. Each bushing also may be used with or without an outer can member 1004, which is shown as being of a similar configuration throughout the examples. The central body and can components generally may be constructed of various metals that would be suitable for use in a suspension system.

It will be appreciated that the central body of the example bushings differ in configuration depending on how they will be coupled to the suspension system, such as via a mounting bracket. More particularly, in the example shown in FIGS. 11A-11F, the central body 1002A is shown as a bar pin having a cylindrical center portion with extensions having flattened surfaces that include a passage 1006A therethrough for receipt of a fastener, such as a bolt, for connection to a mounting bracket, such as is shown in the preceding example suspension systems. In the examples shown in FIGS. 12A-12B, the central body 1002B is shown as a bar pin having a cylindrical center portion with cylindrical extensions that may be coupled to a mounting bracket of a suspension system via clamps that receive the cylindrical extensions. In the example shown in FIG. 13, the central body 1002C is shown as a bar pin having a cylindrical center portion with D-shaped extensions having a flattened surface that include a passage 1006C therethrough for receipt of a fastener, such as a bolt, for connection to a mounting bracket, such as is shown in the preceding example suspension systems. In the example shown in FIG. 14, the central body 1002D is shown as a through-bolt sleeve having a cylindrical configuration with a passage 1006D therethrough for receipt of a fastener, such as a bolt, that may be coupled to a mounting bracket of a suspension system.

While other low axial rate bushing structures may be utilized, the example bushings shown happen to be of the rate ring type. Rate ring bushings include a component referred to as a rate ring portion that may be made of metal, or the like, and that is disposed between at least two elastomeric members, to add stiffness to the bushing. In each of the respective example bushings of FIGS. 11A, 11C, 12A and 14, at least a first elastomeric member 1008A, 1008B, 1008D, which generally may be constructed of various types of rubber or other suitable elastomeric materials, is bonded to the respective central body 1002A, 1002B, 1002D, and is disposed between the respective central body and an outer surface of the bushing. However, the at least first elastomeric member does not have to be bonded to the central body, and indeed it is not in FIG. 13 where the first elastomeric member 1008C is not bonded to the central body 1002C.

Given that the low axial rate bushing examples shown are of the rate ring type, each bushing also includes at least one rate ring portion. In the examples shown in FIG. 11A, with an outer can 1004, and FIG. 11C, without an outer can, the at least one rate ring portion 1010A includes two pieces that are configured substantially as halves of a cylinder. In the examples shown in FIG. 12A, with an outer can 1004, and FIG. 12B, without an outer can, the at least one rate ring portion 1010B includes a cylindrical sleeve having a passage therethrough. The example bushings shown in FIGS. 13 and 14 each include at least one rate ring portion 1010C and 1010D, respectively, that are similar to the at least one rate ring portion 1010A in that they include two pieces that are configured substantially as halves of a cylinder, and it will be appreciated that each of these examples also could be utilized without an outer can. The rate ring portions disclosed generally may be constructed of various metals that would be suitable for use in a suspension system. The first elastomeric member in each example is bonded to the respective rate ring portion, although the components may be otherwise connected.

The example bushings shown also each include at least a second elastomeric member 1012A, 1012B, 1012C and 1012D, typically of a similar material to that used in the aforementioned at least first elastomeric member, although the at least second elastomeric member could be constructed of a different material, and the at least second elastomeric member is disposed outside of the at least one rate ring portion. The at least second elastomeric member is shown as, but need not necessarily be, bonded to the at least one rate ring portion. Moreover, when using a rate ring portion that includes two or more pieces that are configured substantially as portions of a cylinder, such as with 1010A, 1010C and 1010D, the respective at least second elastomeric member 1012A, 1012C and 1012D, which also may be two or more separate pieces, may be bonded to the respective two or more pieces of the rate ring portion.

Figure 11A:
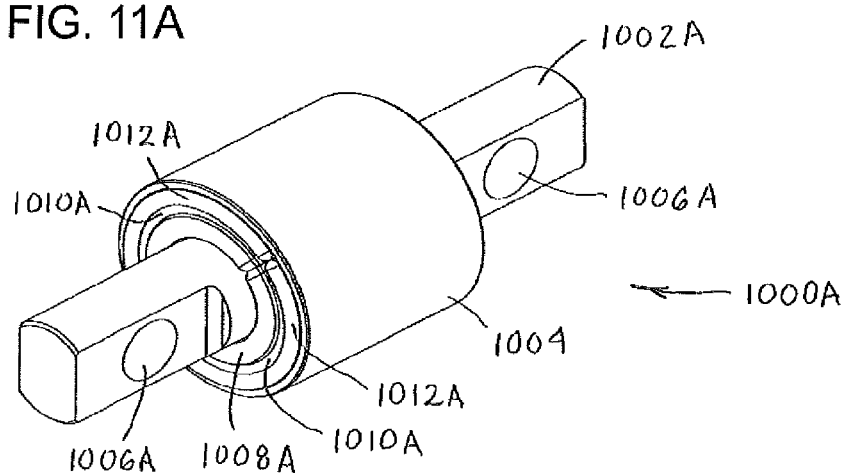
Figure 11B:
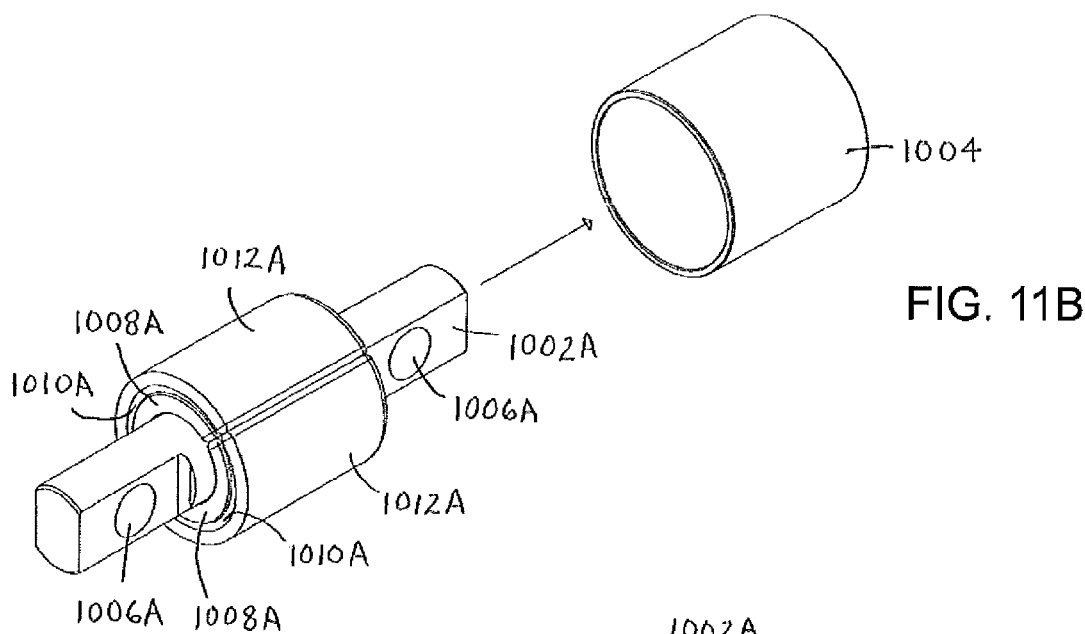
Figure 11C:
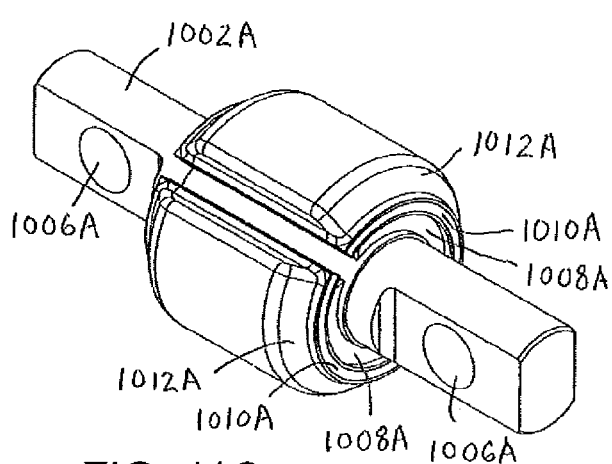
Figure 12A:
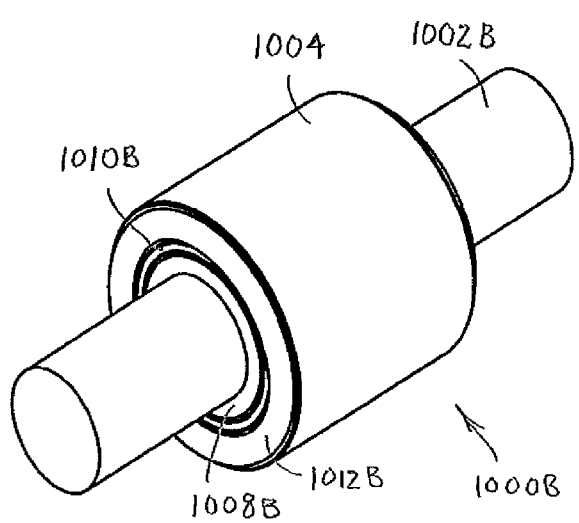
FIGS. 12A-12B are perspective and end views of further example bushings that may be used with any of the example energy storing suspension components having an end configured to include an eye, in a first configuration shown in FIG. 12A with an outer can or in a second configuration shown in FIG. 12B without an outer can.
Figure 12B:
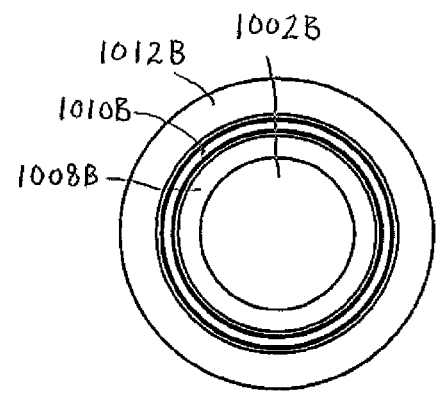
Figure 13:
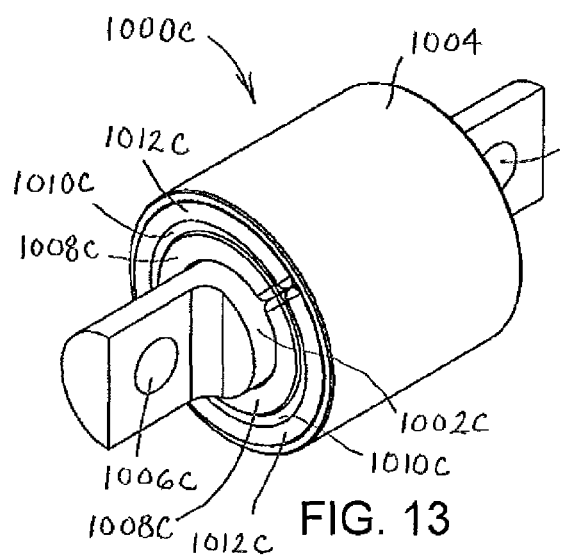
FIG. 13 is a perspective view of another example bushing that may be used with any of the example energy storing suspension components having an end configured to include an eye, and may be used with or without an outer can.
Figure 14:
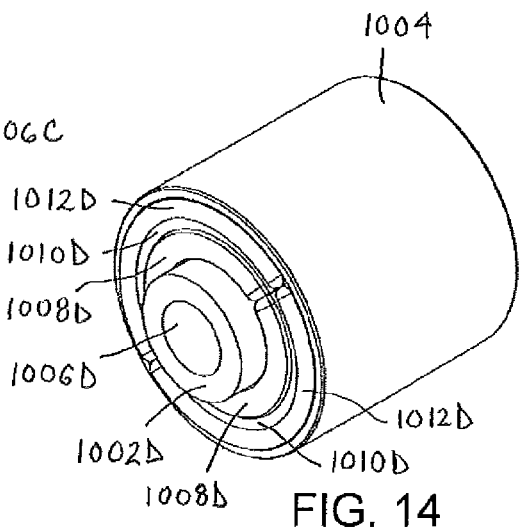
FIG. 14 is a perspective view of yet another example bushing that may be used with any of the example energy storing suspension components having an end configured to include an eye, and may be used with or without an outer can.

When using a rate ring portion having two or more pieces, such as with the rate ring portion 1010A, 1010C and 1010D, the two or more pieces may be forced toward each other, resulting in pre-compression of the inner elastomeric member 1008A, 1008C and 1008D. This may be appreciated when comparing the distance between the two pieces of the rate ring portion 1010A and slight bulging of the at least one elastomeric member 1008A in FIG. 11C versus FIG. 11A. The pre-compressed assembly then may be pressed into the outer can member 1004, such as is shown in FIG. 11B, or may be pressed directly into the eye of an energy storing suspension component. It will be appreciated that the at least second elastomeric member of the example shown in FIG. 12B may be compressed and then pressed into the outer can 1004, as shown in FIG. 12A, or may be pressed directly into the eye of an energy storing suspension component.

The relatively low axial rate of each of the example bushings shown is important because cross-articulation inputs to suspension components, such as those of a trailing beam suspension, generate vertical and lateral (axial) deflections that the spring, bushing, hanger, and clamp group need to be able to resist. When the bushing is used in combination with an energy storing suspension component that has enhanced lateral compliance, as disclosed herein, these deflections are handled better through the added compliance, which reduces the loads generated in all connecting components. Because these particular low axial rate bushings essentially are constructed as two bushings in series, the conical and the torsional rates, the directional inputs of which are shown in FIGS. 11E and 11F, are low, as well.

This keeps such rate ring bushings from building too much load under articulation events. A sample bushing of the type shown in FIG. 11A has provided a particularly advantageous high radial to axial rate ratio, exhibiting, for example, a radial rate of 185,000 lb/in and an axial rate of 7,200 lb/in, for a ratio of 25.7 to 1.

It will be appreciated that, in accordance with the present disclosure, energy storing suspension components used in suspension systems may be provided in various configurations, some of which may be in combination with particularly advantageous bushings. Any variety of suitable materials of construction, configurations, shapes and sizes for the components and methods of operatively coupling or connecting the components may be utilized to meet the particular needs and requirements of an end user. It will be apparent to those skilled in the art that various modifications can be made in the design and construction of such components and systems without departing from the scope of the attached claims, and that the claims are not limited to the preferred embodiments illustrated.

We claimed:

1. An energy storing suspension component in combination with a bushing comprising:
   an energy storing suspension component comprising: an axle seat portion, an end configured to include an eye, and a limb extending between the axle seat portion and the end, wherein the limb comprises a first taper wherein the limb decreases in width as the limb extends toward the end, a second taper wherein the limb decreases in thickness as the limb extends toward the end, wherein along the limb there is at least a portion where both the first taper and second taper are present, and a third taper that is further from the axle seat portion than the first taper and wherein the limb increases in width as the limb extends toward the end, wherein the energy storing suspension component has a lower lateral spring rate than vertical spring rate;
   a bushing having a high radial to axial rate ratio;
   the bushing further comprising a central body and at least one rate ring portion having two or more pieces, and a continuous cylindrical outer can, with at least one first elastomeric member disposed between the central body and the at least one rate ring portion, and at least one second elastomeric member disposed between the at least one rate ring portion and the outer can; and
   wherein the central body, at least one first elastomeric member, at least one rate ring portion and at least one second elastomeric member have been pre-compressed and received by the continuous cylindrical outer can prior to the bushing being received by the eye of the energy storing suspension component.

2. The energy storing suspension component in combination with a bushing of claim 1 wherein the body and the at least one first elastomeric member are bonded.

3. The energy storing suspension component in combination with a bushing of claim 2 wherein the central body includes a bar pin or a sleeve having a passage therethrough.

4. The energy storing suspension component in combination with a bushing of claim 1 wherein the at least two or more pieces of the at least one rate ring portion contact each other when the central body, at least one first elastomeric member, at least one rate ring portion and at least one second elastomeric member are pre-compressed.

5. The energy storing suspension component in combination with a bushing of claim 4 wherein when the two or more pieces of the at least one rate ring portion contact each other they form a cylindrical sleeve.

6. The energy storing suspension component in combination with a bushing of claim 1 wherein the at least one first elastomeric member has at least one radial gap, the at least one rate ring portion has at least one radial gap, and at least one second elastomeric member has at least one radial gap.

7. The energy storing suspension component in combination with a bushing of claim 6 wherein the at least one radial gap of the at least one first elastomeric member, the at least one radial gap of the at least one rate ring portion and the at least one radial gap of the at least one second elastomeric member are radially aligned.

8. The energy storing suspension component in combination with a bushing of claim 1 wherein the bushing also has an axial rate of less than about 15,000 lb/in.

9. The energy storing suspension component in combination with a bushing of claim 1 wherein the axle seat portion has a greater maximum thickness than maximum width.

10. The energy storing suspension component in combination with a bushing of claim 1 wherein the axle seat portion has a maximum thickness and a maximum width, wherein the maximum thickness is equal to the maximum width.

11. The energy storing suspension component in combination with a bushing of claim 1 wherein the axle seat portion includes at least one hole therethrough.

12. The energy storing suspension component in combination with a bushing of claim 1 wherein the end is configured to have a constant thickness and/or width.

13. The energy storing suspension component in combination with a bushing of claim 1 wherein the axle seat portion is configured to be connected to a lower air spring support.

14. The energy storing suspension component in combination with a bushing of claim 1 wherein the limb further comprises a fourth taper further from the axle seat portion than the second taper and wherein the limb increases in thickness as the limb extends toward the end.

15. The energy storing suspension component in combination with a bushing of claim 1 wherein the limb comprises multiple tapers wherein the limb decreases in thickness.

16. The energy storing suspension component in combination with a bushing of claim 1 wherein the end is a first end and the limb is a first limb, and the energy storing suspension component further comprises a second end and a second limb extending between the axle seat portion and the second end.

17. The energy storing suspension component in combination with a bushing of claim 16 wherein the second end includes at least one hole therethrough.

18. The energy storing suspension component in combination with a bushing of claim 16 wherein the second end is configured to have a constant thickness and/or a constant width.

* * * * *